United States Patent
Sambonsugi et al.

(10) Patent No.: US 6,335,985 B1
(45) Date of Patent: Jan. 1, 2002

(54) OBJECT EXTRACTION APPARATUS

(75) Inventors: Yoko Sambonsugi, Yamato; Toshiaki Watanabe, Yokohama; Takashi Ida, Kawasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/222,876

(22) Filed: Dec. 30, 1998

(30) Foreign Application Priority Data

Jan. 7, 1998 (JP) .......................................... 10-001847
Jul. 7, 1998 (JP) .......................................... 10-192061

(51) Int. Cl.[7] ................................................. G06K 9/46
(52) U.S. Cl. ....................................... 382/190; 386/109
(58) Field of Search ................................ 382/190, 191, 382/192, 189, 193, 194, 291, 220, 258; 386/109, 111, 112

(56) References Cited

U.S. PATENT DOCUMENTS

| 4,783,833 | A | * | 11/1988 | Kawabata et al. | |
|---|---|---|---|---|---|
| 5,274,466 | A | | 12/1993 | Ida et al. | |
| 5,317,397 | A | * | 5/1994 | Odaka et al. | 348/416 |
| 5,331,436 | A | | 7/1994 | Ida et al. | |
| 5,650,829 | A | * | 7/1997 | Sugimoto et al. | 348/699 |
| 5,953,488 | A | * | 9/1999 | Seto | 386/109 |
| 5,960,081 | A | * | 9/1999 | Vynne et al. | 380/10 |

FOREIGN PATENT DOCUMENTS

JP 8-241414 9/1996

OTHER PUBLICATIONS

Roland Mech, et al. "A Noise Robust Method for Segmentation of Moving Objects in Video Sequences", International Conference on Acoustics, Speech and Signal Processing (ICASSP97), vol. 4, Apr. 1997, pp. 2657–2660.

Naohiro Amamoto, et al. "Detecting Obstructions and Tracking Moving Objects by Image Processing Technique", IEICE Trans. On Fundamentals of Elec., Comm. , and Computer Sciences (A), vol. J81–A No. 4, Apr. 1998, pp. 527–535.

T. Echigo et al. "Region Segmentation of the Spatio–Temporal Image Sequence for the Video Mosaicing", IEICE Conference, D–12–81, Sep. 1997, p. 273.

Takashi Ida, et al. "Self–Affine Mapping System for Object Contour Extraction", Research and Development Center, Toshiba Corporation, pp. 1–3.

* cited by examiner

Primary Examiner—Andrew W. Johns
Assistant Examiner—Seyed Azarian
(74) Attorney, Agent, or Firm—Oblon, Spivak, McClelland, Maier & Neustadt, P.C.

(57) ABSTRACT

Rectangles $R(i-1)$, $R(i)$, and $R(i+1)$ are set to surround three temporally continuous frames $f(i-1)$, $f(i)$, and $f(i+1)$. Difference images $fd(i-1, i)$ and $fd(i, i+1)$ are obtained on the basis of the inter-frame differences between the current frame $f(i)$ and the first reference frame $f(i-1)$ and between the current frame $f(i)$ and the second reference frame $(i+1)$. Background regions are respectively determined for polygons $Rd(i-1, i)=R(i-1)$ or $R(i)$ and $Rd(i, i+1)=R(i)$ or $R(i+1)$, and the remaining regions are selected as object region candidates. By obtaining the intersection between these object region candidates, an object region $O(i)$ on the current frame $f(i)$ can be extracted.

36 Claims, 20 Drawing Sheets

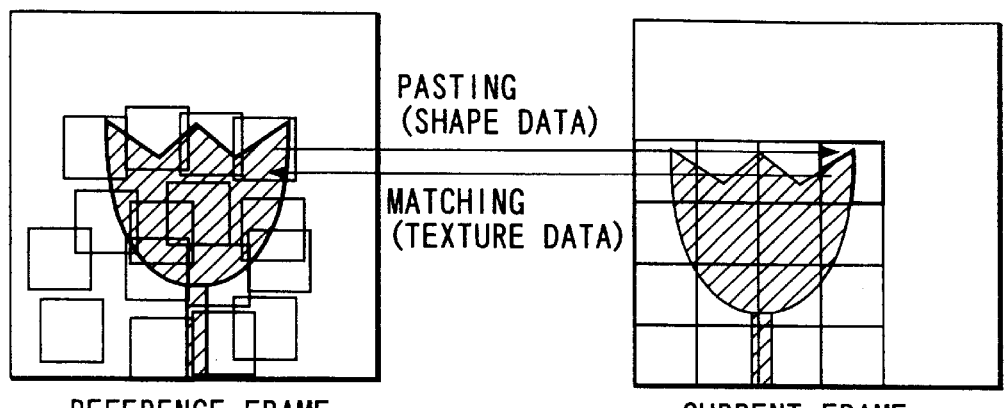
FIG. 13
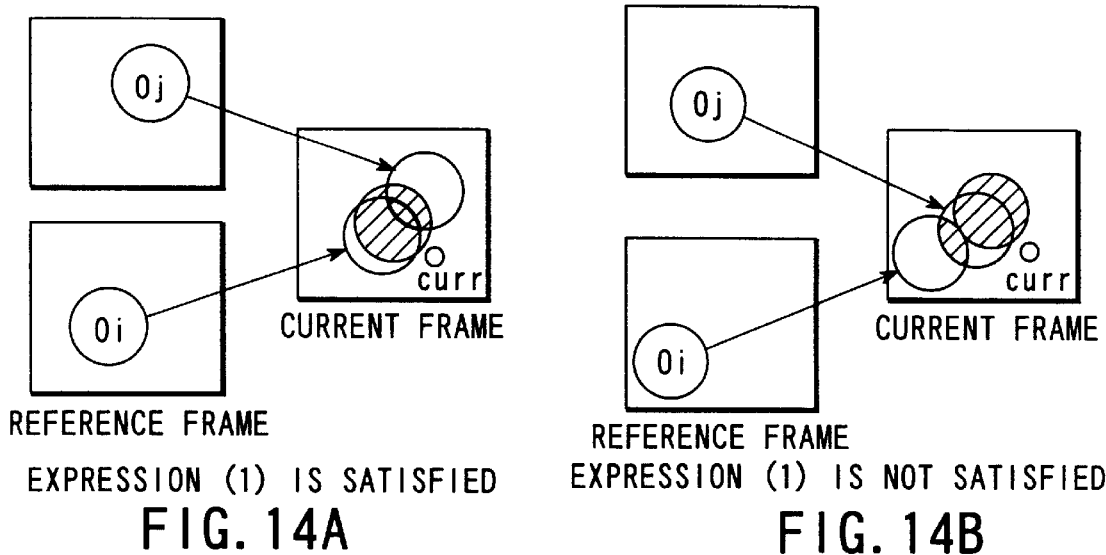
EXPRESSION (1) IS SATISFIED
FIG. 14A
EXPRESSION (1) IS NOT SATISFIED
FIG. 14B
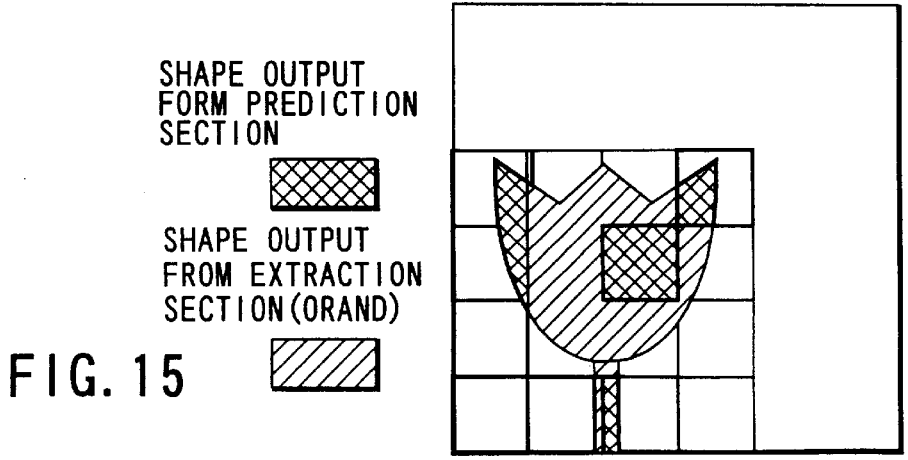
FIG. 15

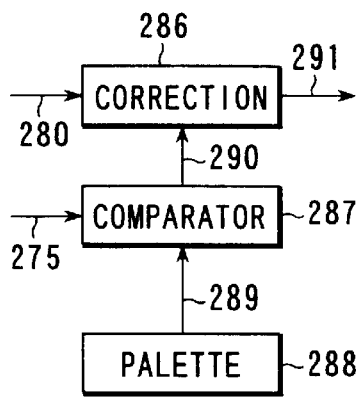
FIG. 31
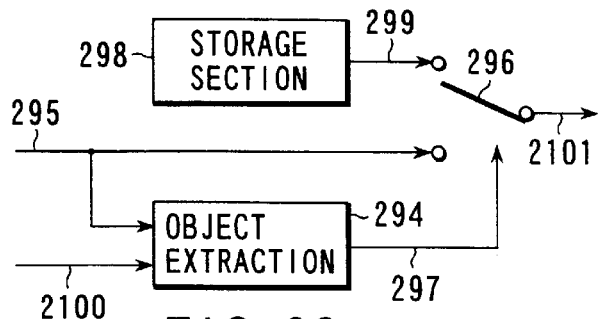
FIG. 32
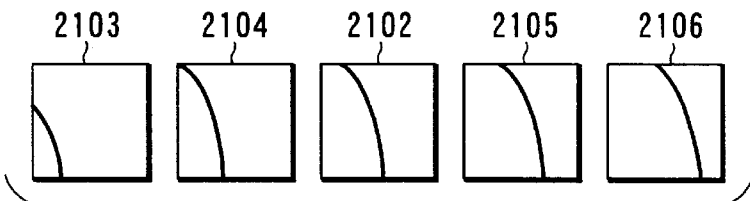
FIG. 33
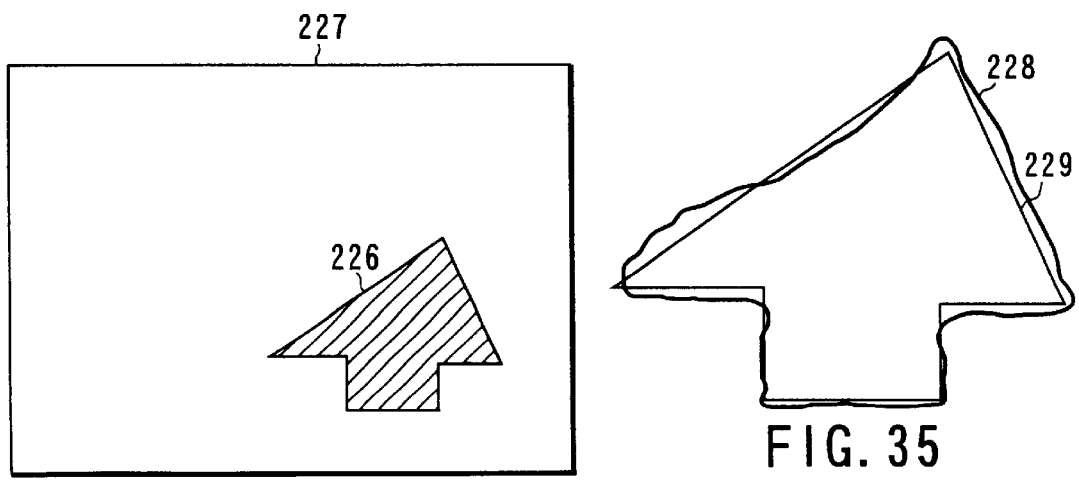
FIG. 34
FIG. 35

OBJECT EXTRACTION APPARATUS

BACKGROUND OF THE INVENTION

The present invention relates to an object extraction apparatus and, more particularly, to an object extraction apparatus for detecting the position of a target object from input moving picture and tracking/extracting a moving object.

An algorithm for tracking/extracting an object in moving picture has conventionally been proposed. This is a technique of extracting only a given object from a picture including various objects and a background. This technique is useful for a process and editing of moving picture. For example, a person extracted from moving picture can be synthesized with another background.

As a method used for object extraction, the region dividing technique using region segmentation of the spatio-temporal image sequence (Echigo and Hansaku, "region segmentation of the spatio-temporal image sequence for video mosaic", THE 1997 IEICE SYSTEM SOCIETY CONFERENCE, D-12-81, p. 273, September, 1997) is known.

In this region dividing method using region segmentation of the spatio-temporal image sequence, moving picture is divided into small regions according to the color texture in one frame of the moving picture, and the regions are integrated in accordance with the relationship between the frames. When a picture in a frame is to be divided, initial division must be performed. This greatly influences the division result. In this region dividing method using region segmentation of the spatio-temporal image sequence, initial division is changed by using this phenomenon in accordance with another frame. As a result, different division results are obtained, and the contradictory divisions are integrated in accordance with the motion between frames.

If, however, this technique is applied to tracking/extracting of an object in moving picture without any change, a motion vector is influenced by an unnecessary motion other than the motion of the moving object as a target. In many cases, therefore, the reliability is not satisfactorily high, and erroneous integration occurs.

A moving object detecting/tracking apparatus using a plurality of moving object detectors is disclosed in Jpn. Pat. Appln. KOKAI Publication No. 8-241414. For example, this conventional moving object detecting/tracking apparatus is used for a monitoring system using a monitor camera. This apparatus detects a moving object from an input moving picture and tracks it. In this moving object detecting/tracking apparatus, the input moving picture is input to a picture segmenting section, an inter-frame difference type moving object detector section, a background difference type moving object detector section, and a moving object tracking section. The picture segmenting section segments the input moving picture into blocks each having a predetermined size. The division result is sent to the inter-frame difference type moving object detector section and the background difference type moving object detector section. The inter-fame difference type moving object detection section detects the moving object in the input picture by using the inter-frame difference in units of difference results. In this case, to detect the moving object without being influenced by the moving speed of the moving object, the frame intervals at which inter-frame differences are obtained are set on the basis of the detection result obtained by the background difference type moving detector section. The background difference type moving detector section detects the moving object by obtaining the difference between the moving object and the background picture created by using the moving picture input so far in units of division results. An integration processor section integrates the detection results obtained by the inter-frame difference type moving object detector section and the background difference type moving detector section to extract the motion information about the moving object. After the object is detected from each frame, the moving object tracking section makes the correction moving objects on the respective frames correspond to each other.

In this arrangement, since a moving object is detected by using not only an inter-frame difference but also a background difference, the detection precision is higher than that in a case wherein only the inter-frame difference is used. However, owing to the mechanism of detecting an object in motion from overall input moving picture by using an inter-frame difference and background difference, the detection result of the inter-frame difference and background difference are influenced by unnecessary motions other than the motion of the target moving object. For this reason, a target moving object cannot be properly extracted/tracked from a picture with a complicated background motion.

Another object extraction technique is also known, in which a background picture is created by using a plurality of frames, and a region where the difference between the pixel values of the background picture and input picture is large is extracted as an object.

An existing technique of extracting an object by using this background picture is disclosed in "MOVING OBJECT DETECTION APPARATUS, BACKGROUND EXTRACTION APPARATUS, AND UNCONTROLLED OBJECT DETECTION APPARATUS", Jpn. Pat. Appln. KOKAI Publication No. 8-55222.

According to this technique, the moving picture signal of the currently processed frame is input to a frame memory for storing one-frame picture data, a first motion detection section, a second motion detection section, and a switch. A video signal one frame ahead of the current frame is read out from the frame memory and input to the first motion detection section. The background video signals generated up to this time are read out from the frame memory prepared to hold background pictures and is input to the second motion detection section and the switch. Each of the first and second motion detection section extracts an object region by using, for example, the difference value between the two input video signals. Each extraction result is sent to a logical operation circuit. The logical operation circuit calculates the AND of the two input video data, and outputs it as a final object region. The object region is also sent to the switch. The switch selects signals depending on an object region as follows. For a pixel belonging to the object region, the switch selects a background pixel signal. In contrast to this, for a pixel that does not belong to the object region, the switch selects the video signal on the currently processed frame, and the signal is sent as an overwrite signal to the frame memory. As a result, the corresponding pixel value in the frame memory is overwritten.

According to this technique, as disclosed in Jpn. Pat. Appln. KOKAI Publication No. 8-55222, as the processing proceeds, more accurate background pictures can be obtained. At the end, the object is properly extracted. However, since the background picture is mixed in the object in the initial part of the moving picture sequence, the object extraction precision is low. In addition, if the motion of the object is small, the object picture permanently remains in the background picture, and the extraction precision remains low.

As described above, in the conventional object extraction/ tracking method, owing to the mechanism of detecting an object in motion from the overall input moving picture, the detection result of the inter-frame difference and background difference are influenced by unnecessary motions other than the motion of the target moving object. For this reason, a target moving object cannot be properly extracted/tracked.

In the object extraction method using background pictures, the extraction precision is poor in the initial part of a moving picture sequence. In addition, if the motion of the object is small, since a background picture remains incomplete, the extraction precision remains low.

BRIEF SUMMARY OF THE INVENTION

It is an object of the present invention to provide an object extraction apparatus for moving picture which can accurately extract/track a target object without being influenced by unnecessary motions around the object.

It is another object to provide an object extraction apparatus which can accurately determine a background picture and obtain a high extraction precision not only in the late period of a moving picture sequence but also in the early period of the moving picture sequence regardless of the magnitude of the motion of an object.

According to the present invention, there is provided an object extraction apparatus comprising a background region determination section for determining a first background region common to a current frame as an object extraction target and a first reference frame that temporally differs from the current frame on the basis of a difference between the current frame and the first reference frame, and determining a second background region common to the current frame and a second reference frame that temporally differs from the current frame on the basis of a difference between the current frame and the second reference frame, an extraction section for extracting a region, in a picture on the current frame, which belongs to neither the first background region nor the second background region as an object region, and a still object detection section for detecting a still object region.

In this object extraction apparatus, two reference frames are prepared for each current frame as an object extraction target, and the first common background region commonly used for the current frame and the first reference frame is determined on the basis of the first difference image between the current frame and the first reference frame. The second common background region commonly used for the current frame and the second reference frame is determined on the basis of the second difference image between the current frame and the second reference frame. Since the object region on the current frame is commonly included in both the first and second difference images, the object region on the current frame can be extracted by detecting a region, of the regions that belong to neither the first common background region nor the second common background region, which is included in the image inside figure of the current frame. If this object region corresponds to a still object, a still object region is detected when there is no difference between the preceding object region and the current object region.

In this manner, a region that does not belong to any of the plurality of common background regions determined on the basis of the temporally different reference frames is determined as an extraction target object to track the object. This allows accurate extraction/tracking of the target object without any influences of unnecessary motions around the target object.

It is preferable that this apparatus further comprise a background correction section for correcting motion of a background on the reference frame or the current frame such that the motion of the background between each of the first and second reference frames and the current frame becomes relatively zero. With this background correction section set on the input stage of the figure setting section or background region determination section, even if background moving picture gradually changes between continuous frames as in a case wherein, for example, a camera is panned, the pseudo background moving picture can be made constant between these frames. Therefore, when the difference between the current frame and the first or second reference frame is obtained, the backgrounds of these frames can be canceled out. This allows common background region detection processing and object region extraction processing without any influences of changes in background. The background correction section can be realized by motion compensation processing.

In addition, the background region determination section preferably comprises a detector section for detecting difference values between the respective pixels, in a difference image between the current frame and the first or second reference frame, which are located near a contour of a region belonging to the image inside figure on the current frame or the image inside figure on the first or second reference frame, and a determination section for determining a difference value for determination of the common background region by using the difference values between the respective pixels near the contour, and determines the common background region from the difference image by using the determined difference value as a threshold value for background/object region determination. By paying attention to the difference values between the respective pixels near the contour in this manner, a threshold value can be easily determined without checking the entire difference image.

The figure setting section preferably comprises a segment section for segmenting the image inside figure of the reference frame into a plurality of blocks, a search section for searching for a region on the input frame in which an error between each of the plurality of blocks and the input frame becomes a minimum, and a setting section for setting figures surrounding a plurality of regions searched out on the input frame. With this arrangement, an optimal new figure for an input frame as a target can be set regardless of the shape or size of the initially set figure.

The present invention further comprises a prediction section for predicting a position or shape of the object on the current frame from a frame from which an object region has already been extracted, and a selector section for selecting the first and second reference frames to be used by the background region determination section on the basis of the position or shape of the object on the current frame which is predicted by the prediction section.

By selecting proper frames as reference frames to be used in this manner, a good extraction result can always be obtained.

Letting $O_i$, $O_j$, and $O_{curr}$ be objects on reference frames $f_i$ and $f_j$ and a current frame $f_{curr}$ as an extraction target, optimal reference frames $f_i$ and $f_j$ for the proper extraction of the shape of the object are frames that satisfy $$(O_i \cap O_j) \subseteq O_{curr}$$

That is, frames $f_i$ and $f_j$ whose objects $O_i$ and $O_j$ have an intersection belonging to the object $O_{curr}$.

In addition, the present invention is characterized in that a plurality of object extraction sections for performing object extraction by different methods are prepared, and object extraction is performed while these object extraction sections are selectively switched. This apparatus preferably uses a combination of first object extraction sections for performing object extraction by using the deviations between the current frame and at least two reference frames that temporally differ from the current frame and second object extraction sections for performing object extraction by predicting an object region on the current frame from a frame having undergone object extraction using inter-frame prediction. With this arrangement, even if the object is partially still, and no difference between the current frame and each reference frame can be detected, compensation for this situation can be made by the object extraction section using inter-frame prediction.

When a plurality of object extraction sections are prepared, it is preferable that this apparatus further comprise an extraction section for extracting a feature value of a picture in at least a partial region of the current frame as the object extraction target from the current frame, and switch the plurality of object extraction sections on the basis of the extracted feature value.

If, for example, it is known in advance whether a background moves or not, the corresponding property is preferably used. If there is a background motion, background motion compensation is performed. However, perfect compensation is not always ensured. Almost no compensation may be given for a frame exhibiting a complicated motion. Such a frame can be detected in advance in accordance with the compensation error amount in background motion compensation, and hence can be excluded from reference frame candidates. If, however, there is no background motion, this processing is not required. This is because if another object moves, wrong background motion compensation may be performed, or even an optimal frame for reference frame selection conditions may be excluded from reference frame candidates, resulting in a decrease in extraction precision. In addition, one picture may include various properties. The object motions and textures partly differ. For these reasons, the object may not be properly extracted by using the same tracking/extracting method and apparatus and the same parameter. It is therefore preferable that the user designate a portion of a picture which has a special property, or a difference in a picture be automatically detected as a feature value, and tracking/extracting methods be partly switched in units of, e.g., blocks in each frame to perform object extraction or the parameter be changed on the basis of the feature value.

If a plurality of object extraction sections are switched on the basis of the feature value of a picture in this manner, the shapes of objects in various pictures can be accurately extracted.

Assume that the first object extraction section using the deviations between the current frame and at least two reference frames that temporally differ from the current frame and the second object extraction section using inter-frame prediction are used in combination. In this case, the first and second object extraction sections are selectively switched and used on the basis of the prediction error amount in units of blocks in each frame as follows. When the prediction error caused by the second object extraction section falls within a predetermined range, the extraction result obtained by the second object extraction section is used as an object region. When the prediction error exceeds the predetermined range, the extraction result obtained by the first object extraction section is used as an object region.

The second object extraction section is characterized by performing inter-frame prediction in a sequence different from an input frame sequence such that a frame interval between a reference frame and the current frame as the object extraction target is set to a predetermined number of frames or more. With this operation, since the motion amount between frames increases as compared with a case wherein inter-frame prediction is sequentially performed in the input frame sequence, the prediction precision can be increased, resulting in an increase in extraction precision.

In some cases, an object motion is too small or complicated to be coped with by the shape prediction technique using inter-frame prediction depending on the frame intervals. If, for example, a shape prediction error exceeds a threshold value, the prediction precision can be increased by increasing the interval between a target frame and the extracted frame used for prediction. This leads to an increase in extraction precision. In addition, if there is a background motion, reference frame candidates are used to obtain the background motion relative to the extracted frame to perform motion compensation. However, the background motion may be excessively small or complicated depending on the frame intervals, and hence background motion compensation may not be performed with high precision. In this case as well, the motion compensation precision can be increased by increasing the frame intervals. If the sequence of extracted frames is adaptively controlled in this manner, the shape of an object can be extracted more reliably.

In addition, according to the present invention, there is provided an object extraction apparatus for receiving moving picture data and shape data representing an object region on a predetermined frame of a plurality of frames constituting the moving picture data, comprising a readout section for reading out moving picture data from a storage unit in which the moving picture data is stored, and performing motion compensation for the shape data, thereby generating shape data in units of frames constituting the readout moving picture data, a generator section for generating a background picture of the moving picture data by sequentially overwriting picture data in a background region of each frame, determined by the generated shape data, on a background memory, and a readout section for reading out the moving picture data again from the storage unit on which the moving picture data is recorded, obtaining a difference between each pixel of each frame constituting the readout moving picture data and a corresponding pixel of the background picture stored in the background memory, and determining a pixel exhibiting a difference whose absolute value is larger than a predetermined threshold value as a pixel belonging to the object region.

In this object extraction apparatus, in the first scanning processing of reading out the moving picture data from the storage unit, a background picture is generated in the background memory. The second scanning processing is then performed to extract an object region by using the background picture completed by the first scanning. Since the moving picture data is stored in the storage unit, an object region can be extracted with a sufficiently high precision from the start of the moving picture sequence by scanning the moving picture data twice.

The present invention further comprises an output section for selectively outputting one of an object region determined by shape data of each of the frames and an object region determined on the basis of an absolute value of a difference from the background picture as an object extraction result. Depending on the picture, the object region determined by the shape data obtained by the first scanning is higher in extraction precision than the object region obtained by the second scanning using the difference from the background picture. The extraction precision can therefore be further increased by selectively outputting the object region obtained by the first scanning and the object region obtained by the second scanning.

Furthermore, according to the present invention, there is provided an object extraction apparatus for receiving moving picture data and shape data representing an object region on a predetermined frame of a plurality of frames constituting the moving picture data, and sequentially obtaining shape data of the respective frames by using frames for which the shape data have already been provided or from which shape data have already been obtained as reference frames, comprising a division section for segmenting a currently processed frame into a plurality of blocks, a search section for searching for a similar block, for each of the blocks, which is similar in figure represented by picture data to the currently processed block and is larger in area than the currently processed block, from the reference frame, a paste section for pasting shape data obtained by extracting and reducing shape data of each similar block from the reference frame on each block of the currently processed frame, and an output section for outputting the pasted shaped data as shape data of the currently processed frame.

This object extraction apparatus performs search processing in units of blocks in the current frame as an object extraction target to search for a similar block that is similar in graphic figure represented by picture data (texture) to the currently processed block and larger in area than the currently processed block. The apparatus also pastes the data obtained by extracting and reducing the shape data of each similar block searched out on the corresponding block of the currently processed frame. Even if the contour of an object region, given by shape data, deviates, the position of the contour can be corrected by reducing and pasting the shape data of each similar block larger than the currently processed block in this manner. If, therefore, the data obtained when the user approximately traces the contour of an object region on the first frame with a mouse or the like is input as shape data, object regions can be accurately extracted from all the subsequent input frames.

Moreover, according to the present invention, there is provided an object extraction apparatus for receiving picture data and shape data representing an object region on the picture, and extracting the object region from the picture data by using the shape data, comprising a setting section for setting blocks on a contour portion of the shape data, and searching for a similar block, for each of the blocks, which is similar in graphic figure represented by the picture data to each block and is larger than the block, from the same picture, a replace section for replacing the shape data of each of the blocks with shape data obtained by reducing the shape data of each of the similar blocks, a repeat section for repeating the replacement by a predetermined number of times, and an output section for outputting shape data obtained by repeating the replacement as corrected shape data.

The position of the contour provided by shape data can be corrected by performing replacement processing using similar blocks based on block matching within a frame. In addition, since the block matching is performed within a frame, a search for similar blocks and replacement can be repeatedly performed for the same blocks. This can further increase the correction precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 13 is a view for explaining an object prediction method used by the object tracking/extracting apparatus according to the second embodiment;

FIGS. 14A and 14B are views for explaining a reference frame selection method used by the object tracking/extracting apparatus according to the second embodiment;

FIG. 15 is a view showing an example of the object extraction result obtained by switching the first and second object extraction sections in the object tracking/extracting apparatus according to the second embodiment;

FIG. 31 is a block diagram showing an edge correction circuit using a background palette and used in the object extraction apparatus according to the fourth embodiment;

FIG. 32 is a block diagram showing an image synthesizing apparatus applied to the object extraction apparatus according to the fourth embodiment;

FIG. 33 is a view for explaining the principle of edge correction using separation degrees and used in the object extraction apparatus according to the fourth embodiment;

FIG. 34 is a view showing the overall processing image to be processed by the object extraction apparatus according to the fourth embodiment;

FIG. 35 is a view showing the contour drawn by an operator and used in the fourth embodiment;

DETAILED DESCRIPTION OF THE INVENTION

Figure 1:
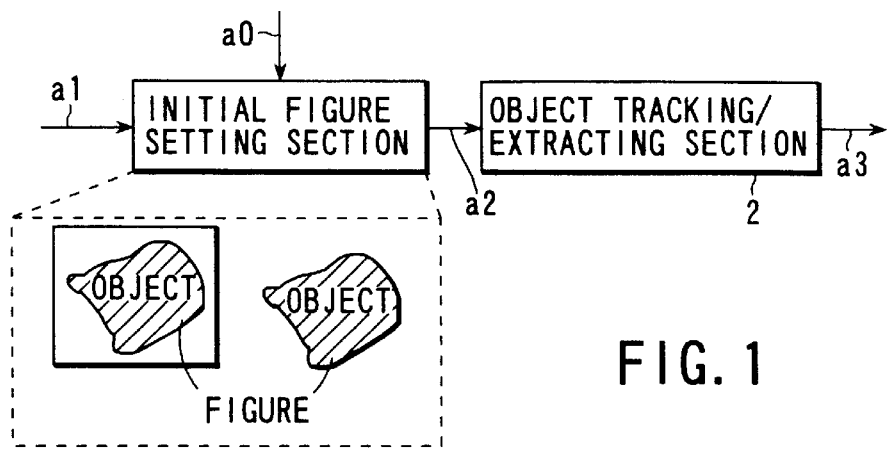
FIG. 1 is a block diagram showing the basic arrangement of an object tracking/extracting apparatus for moving picture according to the first embodiment of the present invention.

FIG. 1 shows the overall arrangement of an object tracking/extracting apparatus for moving picture according to the first embodiment of the present invention. This object tracking/extracting apparatus is designed to track the motion of a target object from an input video signal, and comprises an initial figure setting section 1 and an object tracking/extracting section 2. The initial figure setting section 1 is used to initially set a figure that surrounds a target object to be tracked/extracted with respect to an input video signal a1 on the basis of an externally input initial figure setting indication signal a0. A figure having an arbitrary shape such as a rectangular, circular, or elliptic shape is set on the initial frame of the input video signal a1 so as to surround the target object on the basis of the initial figure setting indication signal a0. As a method of inputting the initial figure setting indication signal a0, the following method can be used: a method of allowing the user to directly write, with a pointing device such as a pen or mouse, a figure on the screen on which the input video signal a1 is displayed; or a method of designating the position and size of an input figure by using such a pointing device. With this operation, an object to be tracked/extracted can be easily designated from outside on the initial frame picture on which the target object appears.

Initial figure setting can also be realized by detecting, for example, the contours of the face or body of a person or animal by general frame picture analysis processing and automatically setting a figure to surround the object, instead of figure input operation performed by the user.

The object tracking/extracting section 2 tracks/extracts the object with reference to the image inside figure set by the initial figure setting section 1. In this case, in moving object tracking/extracting processing, attention is focused on the object designated by the figure, and the motion of the object is tracked. The target moving object can therefore be extracted/tracked without any influences of the unnecessary motions of neighboring objects other than the target moving object.

Figure 2:
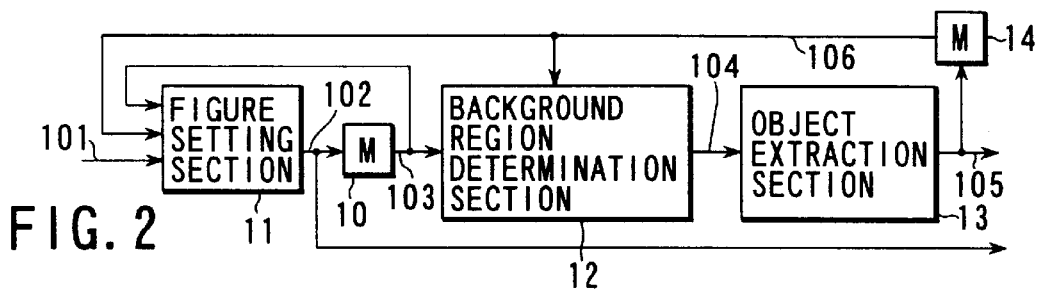
FIG. 2 is a block diagram showing the first example of the arrangement of the object tracking/extracting apparatus according to the first embodiment.

FIG. 2 shows a preferable arrangement of the object tracking/extracting section 2.

As shown in FIG. 2, this object tracking/extracting section comprises memories (M) 10 and 14, a figure setting section 11, a background region determination section 12, and an object extraction section 13.

The figure setting section 11 is used to sequentially set figures for input frames by using arbitrary frames input and subjected to figure setting in the past as reference frames. The figure setting section 11 receives a current frame picture 101, an image inside figure of a reference frame, its position 103, and an object extraction result 106 of the current frame, and outputs image data 102 inside an arbitrary figure of the current frame. More specifically, in the figure setting processing performed by the figure setting section 11, a region on the current frame picture which exhibits the minimum error with respect to the image 103 inside figure of the reference frame is searched out on the basis of the correlation between the image 103 inside figure of the reference frame and the current frame picture 101, and a figure that surrounds the region is set for the current frame picture. The figure to be set may be any one of the following shapes: a rectangle, a circle, an ellipse, a region surrounded by an edge, and the like. For the sake of simplicity, a rectangle is taken as an example in the following case. The detailed arrangement of the figure setting section 11 will be described with reference to FIG. 5. Note that if any figure that surrounds an object is not to be used, the entire image is an image inside figure, and any position need not be input and output.

The memory 10 saves at least three frames that have been already input and undergone already figure setting. The saved information includes the pictures of the figure-set frames, the positions and shapes of the set figures, images inside figures, and the like. The memory 10 may save only the intra-frame pictures instead of the overall pictures of the input frames.

The background region determination section 12 uses at least two arbitrary frames of the frames that temporally differ from a current frame as reference frames for each current frame as an object extraction target, and obtains the difference between each reference frame and the current frame, thereby determining a background region common to each reference frame and the current frame. The background region determination section 12 receives an image inside arbitrary figure of the current frame, its position 102, images inside arbitrary figures of at least two frames, and their positions 103, which are saved in the memory 10, together with the object extraction result 106 obtained from at least two frames, and outputs background regions 104 common to the images inside figures of the current frames and at least two frames. More specifically, when first and second frames are to be used as reference frames, a first background region commonly used as a background region in both the current frame and the first reference frame is determined from the first difference image obtained by calculating the inter-frame difference between the current frame and the first reference frame. In addition, a second background region commonly used as a background region in both the current frame and the second reference frame is determined from the second difference image obtained by calculating the inter-frame difference between the current frame and the second reference frame.

The detailed arrangement of the background region determination section 12 will be described later with reference to FIG. 4. A method of obtaining a common background by using a background memory is also available.

Note that if any figure that surrounds an object is not to be used, the entire image is an image inside figure, and any position need not be input and output.

The object extraction section 13 is used to extract only an object region from the image inside figure of the current frame by using the common background region determined by the background region determination section 12. The object extraction section 13 receives the background regions 104 common to the current frame and at least two frames, and outputs the object extraction result 106 associated with the current frame. Since the object region on the current frame is commonly included in both the first and second difference images, the object region on the current frame can be extracted by detecting a region, of the regions that do not belong to the first and second common background regions, which is included in the image inside figure of the current frame. This operation is based on the fact that regions other than common background regions become object region candidates. More specifically, a region other than the first common background region on the first difference image becomes an object region candidate, and a region other than the second common background region on the second difference image becomes an object region candidate. Therefore, a region where the two object region candidates overlap can be determined as the object region of the current frame. As the object extraction result 106, information indicating the position and shape of the object region can be used. In addition, the picture in the object region may actually be extracted from the current frame by using the information.

The memory 14 saves at least two object extraction results, and is used to feed back the already extracted results so as to increase the extraction precision.

An object extraction/tracking processing method used in this embodiment will be described below with reference to FIG. 8.

Assume that three temporally continuous frames f(i−1), f(i), and f(i+1) are used to extract an object from the current frame f(i).

First of all, figure setting processing is performed by the figure setting section 11. Figure setting processing is performed by respectively using arbitrary reference frames for the three frames f(i−1), f(i), and f(i+1) to set rectangles R(i−1), R(i), and R(i+1) so as to surround the objects on the respective frames. Note that the rectangular figures R(i−1), R(i), and R(i+1) are pieces of information about positions and shapes, but are not present as images.

A common background region is then determined by the background region determination section 12.

In this case, first of all, the inter-frame difference between the current frame f(i) and the first reference frame f(i−1) is calculated to obtain a first difference image fd(i−1, i). Likewise, the inter-frame difference between the current frame f(i) and the second reference frame f(i+1) is calculated to obtain a second difference image fd(i, i+1).

When the first difference image fd(i−1, i) is obtained, since the pixel values of portions of the current frame f(i) and first reference frame f(i−1) which are common in pixel value are canceled out, the difference value between the pixels becomes zero. If, therefore, the frames f(i−1) and f(i) have substantially the same background, an image corresponding to the OR of the image inside figure of the rectangle R(i−1) and the image inside figure of the rectangle R(i) basically remains in the first difference image fd(i−1, i). As shown in FIG. 8, the figure surrounding this remaining image is a polygon Rd(i−1, i)=R(i−1) or R(i). The background region common to the current frame f(i) and the first reference frame f(i−1) is the entire region other than the actual object region (the region in the form of the number 8 obtained by overlapping two circles in this case) in the polygon Rd(i−1, i).

In the second difference image fd(i, i+1) as well, an image corresponding to the OR of the image inside figure of the rectangle R(i) and the image inside figure of the rectangle R(i+1) remains. The figure surrounding this remaining image becomes a polygon Rd(i, i+1)=R(i) or R(i+1). The background region common to the current frame f(i) and the second reference frame f(i+1) is the entire region other than the actual object region (the region in the form of the number 8 obtained by overlapping two circles in this case) in the polygon Rd(i, i+1).

Subsequently, the background region common to the current frame f(i) and the first reference frame f(i−1) is determined from the first difference image fd(i−1, i).

There is required a difference value as a threshold value to be used for determining a common background region/object region. This value may be input by the user or may be automatically set by detecting picture noise and properties. In this case, one threshold value need not be determined for one frame but may be determined partially in accordance with the properties of a portion of a picture. The properties of a picture include edge intensity, difference pixel dispersion, and the like. In addition, a threshold value may be obtained by using a figure for tracking an object.

In this case, a difference value serving as a threshold value for determining a common background region/object region is obtained, and the region of a pixel having a difference value equal to or smaller than the threshold value is determined as a common background region. This threshold value can be determined by using the histogram of the difference values of the respective pixels along one outer line of the polygon Rd(i−1, i) of the first difference image fd(i−1, i), i.e., the contour of the polygon Rd(i−1, i). The abscissa of the histogram represents the pixel values (difference values); and the ordinate, the numbers of pixels having the respective pixel values. For example, a difference value corresponding to the half of the total number of pixels on the contour of the polygon Rd(i−1, i) is determined as the above threshold value. In this manner, a threshold value can be easily determined without checking the distribution of pixel values throughout the first difference image fd(i−1, i).

By using this threshold value, the common background region in the polygon Rd(i−1, i) of the first difference image fd(i−1, i) is determined. A region other than the common background region is an object region including an occlusion. With this operation, the region in the polygon Rd(i−1, i) is divided into the background region and the object region. The pixel values of the background and object regions are respectively converted into binary images of "0" and "1".

Similar processing is performed for the second difference image fd(i, i+1). The background region common to the current frame f(i) and the second reference frame f(i+1) is determined, and the region in the polygon Rd(i, i+1) is converted into a background region having a pixel value of "0" and an object region having a pixel value of "1".

After this processing, object extraction is performed by the object extraction section 13.

In this case, AND processing for the binary image in the polygon Rd(i−1, i) and the binary image in the polygon Rd(i, i+1) is performed in units of pixels. With this processing, the intersection of the objects including the occlusions is obtained, thereby extracting an object O(i) on the current frame f(i).

In this case, all the regions other than the object regions in the frame difference images are obtained as common background regions. However, only the image inside figure may be extracted from each frame, and the difference between the respective images inside figures may be calculated in consideration of the positions of the images inside figures on the frames. In this case, only the common background regions in the polygon Rd(i−1, i) and the polygon Rd(i, i+1) are determined.

As described above, in this embodiment, object extraction is performed by the ORAND method in consideration of images inside figures as follows:

1) obtaining the difference images between the current frame and at least two reference frames, i.e., the first and second reference frames, which temporally differ from the current frame, thereby obtaining the OR of the images inside figures of the current and first reference frames and the OR of the images inside figures of the current and second reference frames, and 2) extracting the target object region from the image inside figure of the current frame by AND processing for the difference images obtained by OR processing for these images inside figures.

In addition, the temporal relationship between the current frame and the two reference frames is not limited to that described above. For example, two frames f(i−m) and f(i−n) temporally preceding the current frame f(i) may be used as reference frames, or two frames f(i+m) and f(i+n) temporally following the current frame f(i) may be used as reference frames.

Figure 8:
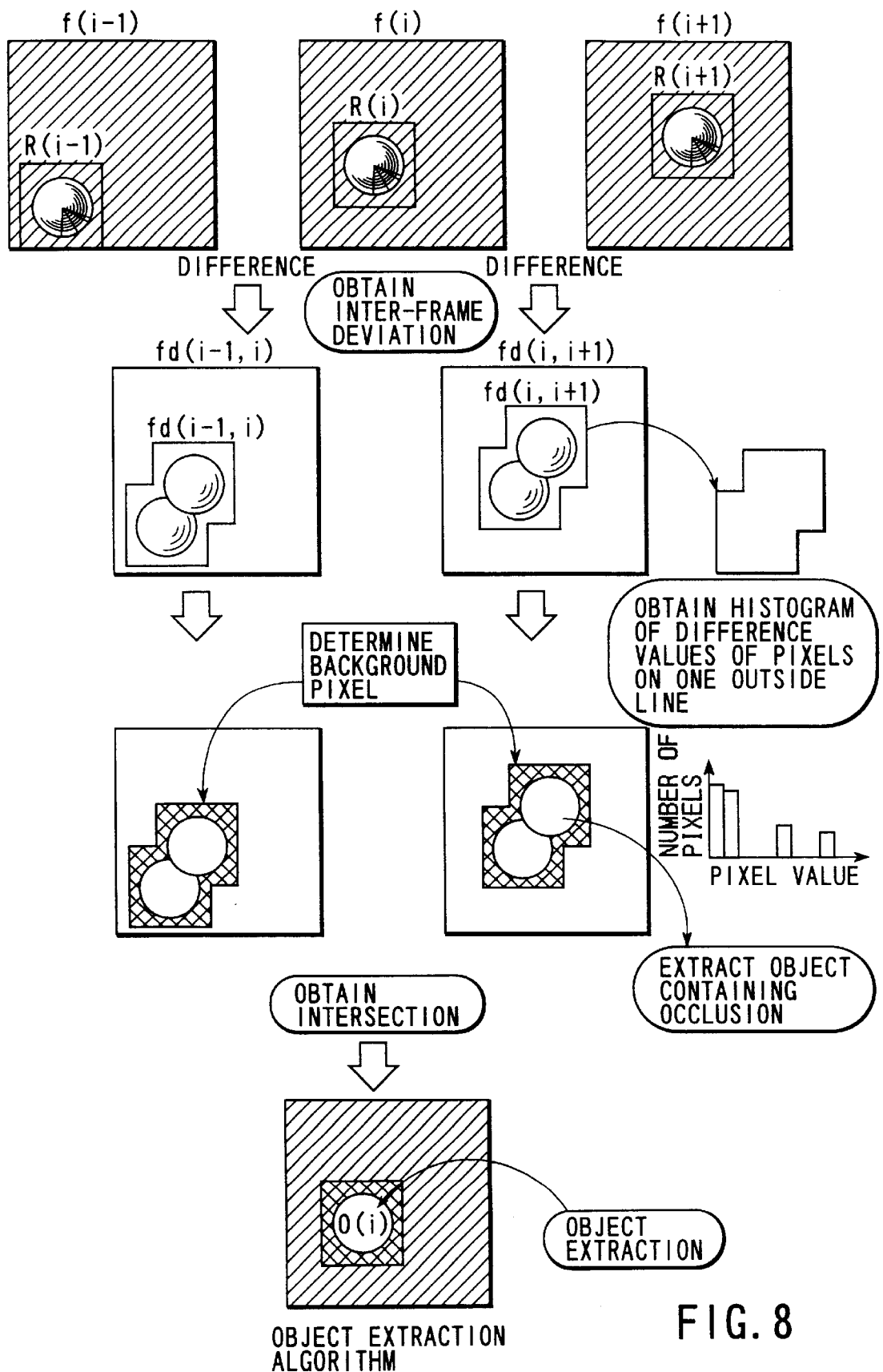
FIG. 8 is a view for explaining the operation of the object tracking/extracting apparatus according to the first embodiment.

Referring to FIG. 8, assume that the frames f(i−1) and f(i) are used as reference frames, and the same processing as that described above is performed for the difference images between the reference frames and the frame f(i+1). In this case, the object can be extracted from the frame f(i+1).

Figure 3:
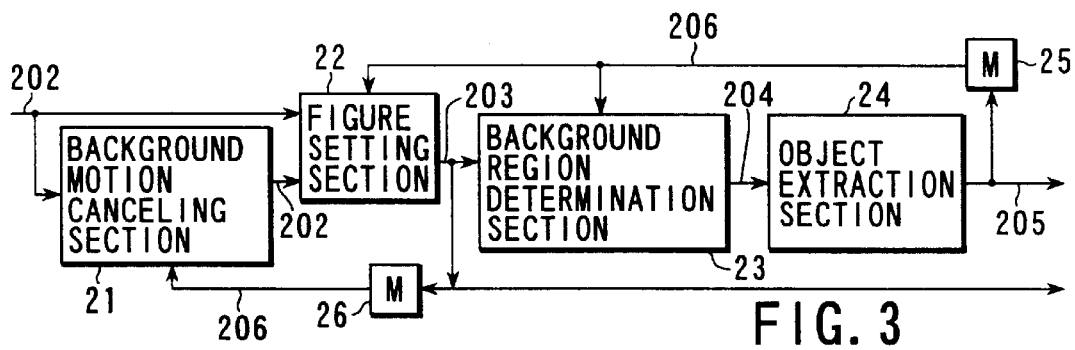
FIG. 3 is a block diagram showing the second example of the arrangement of the object tracking/extracting apparatus according to the first embodiment.

FIG. 3 shows the second example of the arrangement of the object tracking/extracting section 2.

The main difference from the arrangement shown in FIG. 2 is to additionally arrange a background motion canceling section 21. The background motion canceling section 21 serves to correct the motions of the backgrounds of each reference frame and the current frame so as to cancel out their motions.

The apparatus shown in FIG. 3 will be described in detail below.

The background motion canceling section 21 receives images inside arbitrary figures of at least two frames that temporally differ from a current frame 201, together with positions 206 of the images inside figures, and outputs pictures 202 obtained by canceling the motions of the backgrounds of these two frames. The detail arrangement of the background motion canceling section 21 will be described later with reference to FIG. 6.

A figure setting section 22 corresponds to the figure setting section 11 in FIG. 2. The figure setting section 22 receives the current frame 201, at least the two pictures 202 obtained by canceling the motions of the backgrounds, and object extraction results 206 based on the pictures 202, and outputs images 203 representing the inside of the regions of the current frame and at least the two pictures 202 which are surrounded by arbitrary figures.

A memory 26 holds the images inside arbitrary figures and their positions.

The background region determination section 23 corresponds to the background region determination section 12 in FIG. 2. The background region determination section 23 receives the images inside arbitrary figures and their positions 203, and the object extraction results 206 based on the pictures 202, and outputs background regions 204 common to the current frame and at least the two pictures 202. An object extraction section 24 corresponds to the object extraction section 13 in FIG. 2. The object extraction section 24 receives the background regions 204 common to the current frame and at least the two pictures, and outputs an object extraction result 205 based on the current frame. A memory 25 saves at least two object extraction results. The memory 25 corresponds to the memory 14 in FIG. 2.

With this background motion canceling section 21, even if background moving picture gradually changes between continuous frames as in the case wherein a camera is panned, the pseudo background moving picture can be made constant between the frames. Therefore, when the difference between the current frame and a reference frame is obtained, the backgrounds of these frames can be canceled out. This allows common background region detection processing and object region extraction processing without any influences of changes in background.

Note that the background motion canceling section 21 may be connected to the input stage of a background region determination section 23 to eliminate the motion of the background of each reference frame in accordance with the current frame.

Figure 4A:
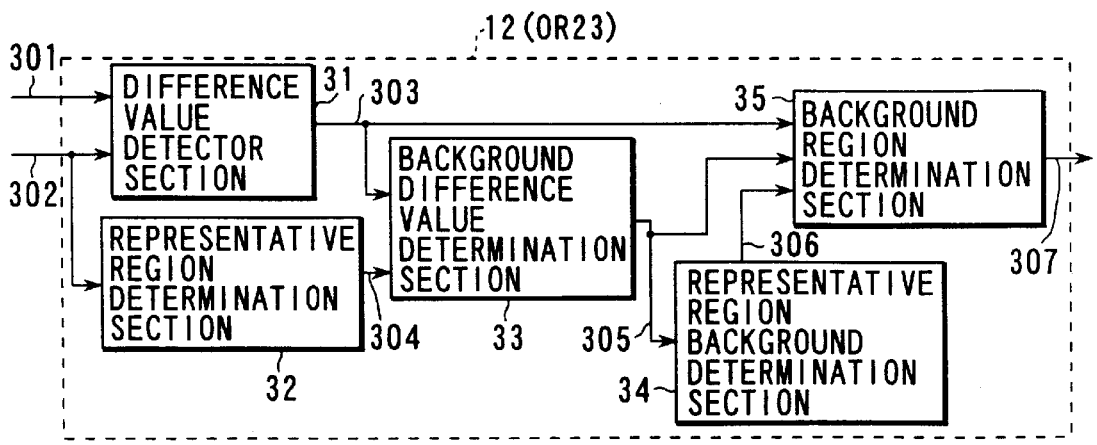
FIGS. 4A and 4B are block diagrams each showing an example of the detailed arrangement of a background region determination section incorporated in the object tracking/extracting apparatus according to the first embodiment.

FIG. 4A shows an example of the detailed arrangement of the background region determination section 12 (or 23).

A difference value detector section 31 is used to obtain the difference between the current frame and the first and second reference frames described above. The difference value detector section 31 receives images inside arbitrary figures of frames that temporally differ from the current frame and their positions 302, and object extraction results 301 based on the frames that temporally differ from the current frame, and outputs a difference value 303 between the images inside arbitrary figures of the frames that temporally differ from the current frame. As this difference value, for example, the luminance difference between the frames, color variation, optical flow, or the like can be used. By using the object extraction results based on the frames that temporally differ from the current frame, an object can be extracted even if the object does not change between the frames. Assume that an inter-frame difference is used as a difference value.

In this case, a portion belonging to the object and exhibiting zero inter-frame difference indicates that the object is standing still. Therefore, the same results as the object extraction results based on the frames that temporally differ from the current frame can be obtained.

A representative region determination section 32 receives an image inside arbitrary figure of the current frame and its position 302, and outputs the background of the image inside arbitrary figure as a representative region 304. As this representative region, a region that is expected to contain the most background in the image inside arbitrary figure is selected. For example, a belt-like region on the outermost portion of the image inside figure, like the contour of the figure on the difference image described with reference to FIG. 8, is set. Since the figure is set to surround the object, the possibility that the figure is a background is high.

A background difference value determination section 33 receives the representative region 304 and the difference value 303, and outputs a difference value for determining a background. A background difference value is determined as follows. As described with reference to FIG. 8, the histogram of the difference values of the difference values in the representative region is formed. Then, for example, a region having a difference value, i.e., a difference value, corresponding to the number of pixels equal to or more than the half (majority) of the total number of pixels is determined as a background region.

A representative region background determination section 34 receives the background difference value 305, determines a representative region background 306, and outputs it. The background region of the representative region is determined depending on whether the region corresponds to the background difference value determined in advance. A background region determination section 35 receives the difference value 303, the background determination threshold value 305, and the representative region background 306, and outputs a background 307 of a region other than the representative region. The background region other than the representative region is determined by a growth method based on the representative region. If, for example, an undetermined pixel adjacent to a determined pixel in the inward direction of the figure coincides with the background difference value, the undetermined pixel is determined as a background pixel. Pixels that are not adjacent to the background and pixels that do not coincide with the background difference value are determined as pixels other the background. Alternatively, a pixel may be simply determined depending on whether it corresponds to the background difference value determined in advance. By performing determination inwardly from the contour of a figure on a difference image, the extent to which the background region inwardly extends in the image inside figure can be determined.

In contrast to this, an object region protruding outwardly from the contour of the figure is detected. If, for example, an undetermined pixel adjacent to a pixel determined as a pixel other than a background in the direction of the outside of the figure does not coincide with the background difference value, this pixel is determined as a pixel other than the background. A pixel which is not adjacent to a pixel other than the background or coincides with the background difference value is determined as a background pixel. By performing pixel determination outwardly from the contour of the figure on the difference image in this manner, the extent to which an image outside the figure extends as a region outside the background can be determined. In this case, a difference value must also be obtained outside the figure. For this reason, an arbitrary figure may be increased in size by several pixels to set a new figure that can reliably surround the object, and a difference value may be obtained only within the figure, or a difference value may be simply obtained in an overall frame. Alternatively, a difference value may be obtained in advance only within the figure, and the above processing may be performed while a difference value is sequentially obtained in performing determination outside the figure. Obviously, when the object does not protrude from the figure, for example, when no pixel is present except for background pixels on the contour, processing outside the figure need not be performed.

If an object or a part thereof is standing still between the current frame and a reference frame, the difference between the current frame and the reference frame cannot be detected so that the shape of the object may not be properly extracted. A method of detecting an object on the current frame by using already extracted reference frames will therefore be described with reference to FIG. 4B.

Figure 4B:
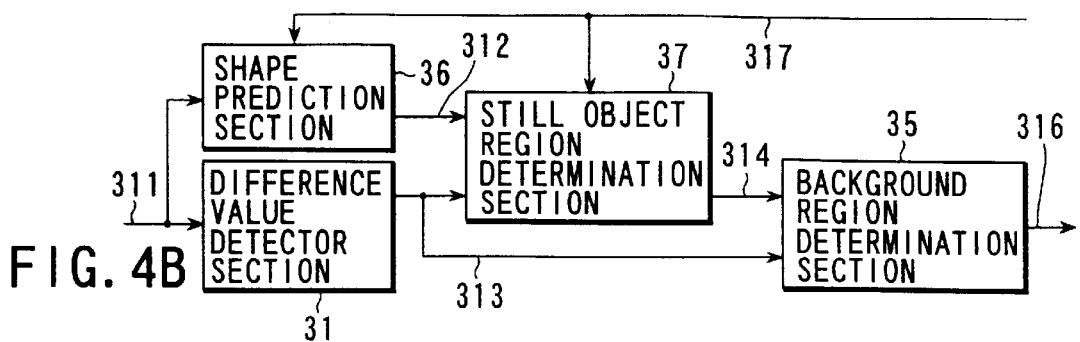

FIG. 4B shows a background region determination section 12 (or 23) having a still object region detector section 37. According to this section, a difference value detector section 31 receives an image inside figure and its position on the current frame and images inside figures and their positions 311 on at least two temporally different frames, and detects difference values 313 between the images inside figures of the current and reference frames.

A shape predicting section 36 receives the image inside figure and its position on the current frame, the images inside figures and their positions 311 on at least the two temporally different frames, and an image and its position 317 on an already extracted frame, predicts an object shape 312 on a frame, of the frames temporally different from the current frame, from no object has been extracted yet, and outputs the predicted shape.

A still object region detector section 37 receives the predicted object shape 312, the difference values 313 between the reference frames and the current frame, and the object shape 317 of the already extracted frame, and determines an object region 314 that is still with respect to the current frame from at least the two frames.

A background region determination section 35 receives the object region 314 with respect to the current frame, which is associated with at least the two frames and the difference values 313 between the reference frames and the current frame, determines a background region 316 common to at least the two frames and the current frame, and outputs it.

Assume that an object has been extracted from a reference frame. Consider a region of the current frame in which the inter-frame difference with respect to the reference frame zero. If the same position on the reference frame is part of the object, the corresponding region on the current frame can be extracted as part of the still object. In contrast to this, if this region on the reference frame is part of a background, the corresponding region on the current frame is a background.

If, however, no object has been extracted from the reference frame, a still object or part of an object cannot be extracted by the above method. In this case, an object shape on the reference frame from which no object has been extracted can be predicted by using another frame from which an object has already been extracted, and it can be determined that the corresponding portion is part of the object. As a prediction method, for example, the block matching method or affine transform method which is often used to code a picture.

For example, the block matching method shown in FIG. 13 can be conceived. By predicting the shape of the object in this manner, a region where no inter-frame difference is detected can be determined as part of a still object or background.

If any figure that surrounds an object is not to be used, the entire image is an image inside figure, and any position need not be input and output. This shape prediction can be performed by using the same method as that used to select a reference frame. In addition, in an embodiment in which a given object extraction method is switched to another object extraction method, the object shape obtained by another object extraction method can be used.

Figure 5:
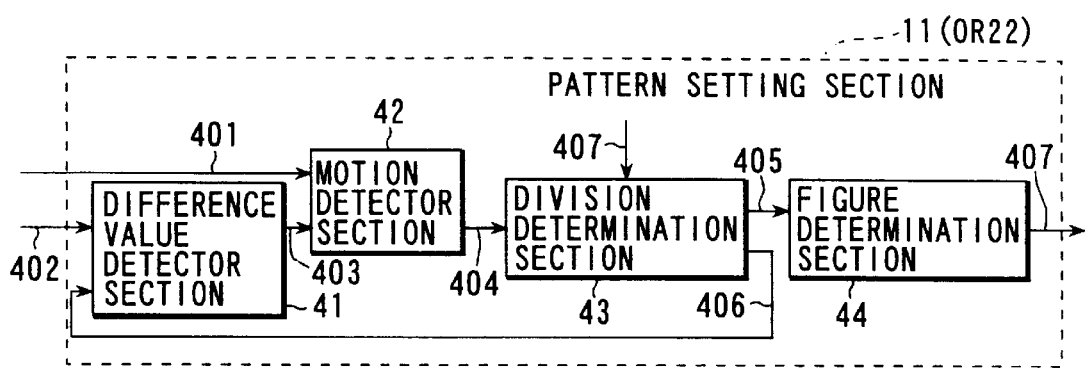
FIG. 5 is a block diagram showing an example of the detailed arrangement of a figure setting section incorporated in the object tracking/extracting apparatus according to the first embodiment.

FIG. 5 shows an example of the detailed arrangement of the figure setting section 11 (or 22).

A division section 41 receives an image inside arbitrary figure of a frame that temporally differs from the current frame and its position 402, and outputs segmented pictures 403. The image inside arbitrary figure may be segmented into two or four equal parts. Alternatively, edges may be detected to segment the image. Assume that the image is divided into two equal figures, the divided figures will be referred to as blocks. A motion detector section 42 receives the segmented image inside arbitrary figure and its position 403, and the image inside arbitrary figure of the current frame and its position 401, and outputs the motion of the segmented image and an error 404. In this case, the position of each block which corresponds to the current frame is searched out to minimize the error, thereby obtaining the motion and the error. A division determination section 43 receives the motion, the error 404, and an object extraction result 407 based on the frame that temporally differs from the current frame, and outputs a determination result 406 indicating whether to segment the image inside arbitrary figure of the frame that temporally differs from the current frame. If it is determined that the image is not segmented, the division determination section 43 outputs a motion 405. In this case, if the object extraction result based on the frame that temporally differs from the current frame is not contained in a given segmented block, the block is eliminated from the figure. In another case, if the obtained error is equal to or larger than a threshold value, the block is further segmented to obtain the motion again. Otherwise, the motion of the block is determined. A figure determination section 44 receives the motion 405, and outputs the image inside figure of the current frame and its position 407. In this case, the figure determination section 44 obtains the positional correspondence between each block and the current frame, and determines a new figure to contain all the blocks at the corresponding positions. The new figure may be a rectangle or circle that is effective for the unity of all the blocks and contains all of them.

In this manner, the image inside figure of each reference frame is segmented into a plurality of blocks, a region where the error between each block and the current frame is minimized is searched out, and a figure surrounding a plurality of regions that are searched out is set for the current frame. This allows a new figure having an optimal shape to be set for the input frame subjected to figure setting regardless of initially set figure shapes and sizes.

It suffices if a reference frame to be used for figure setting is a frame for which a figure has already been set and which temporally differs from the current frame. A frame temporally following the current frame may be used as a reference frame for figures setting as in the case wherein forward prediction and backward prediction are used in general coding techniques.

Figure 6:
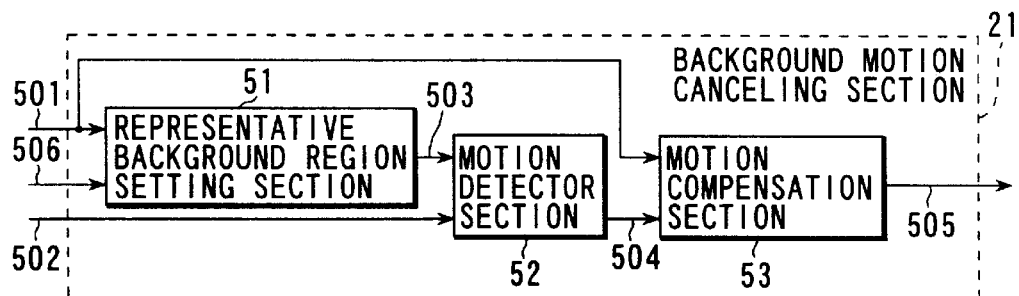
FIG. 6 is a block diagram showing an example of the detailed arrangement of a background motion canceling section incorporated in the object tracking/extracting apparatus according to the first embodiment.

FIG. 6 shows an example of the detailed arrangement of the background motion canceling section 21.

Figure 7:
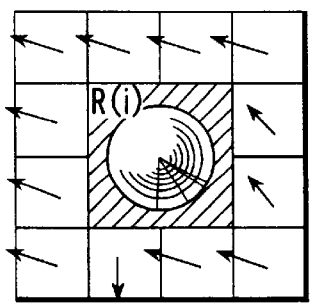
FIG. 7 is a view showing an example of a representative background region used by the background motion canceling section incorporated in the object tracking/extracting apparatus according to the first embodiment.
Figure 7:
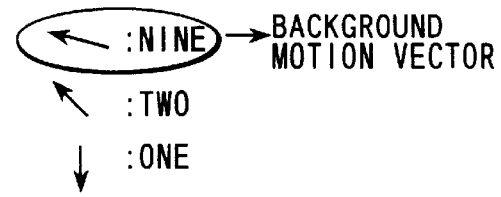

A representative background region setting section 51 receives a temporally different image inside arbitrary figure and its position 501, and outputs a representative background region 503. The representative background region is a region representing the global motion in an arbitrary figure, i.e., representatively represents the motion of the background in the figure. If, for example, an arbitrary figure is a rectangle, a belt-like frame region having a width corresponding to several pixels is set to surround a rectangle, as shown in FIG. 7. Alternatively, several pixels outside the figure may be used. A motion detector section 52 receives a current frame 502 and the representative background region 503, and outputs a motion 504. In the above case, the motion of the belt-like frame region around the rectangle with respect to the current frame is detected. The frame region may be detected as one region. Alternatively, as shown in FIG. 7, the frame region may be divided into a plurality of blocks, and the averaged motion of the respective blocks may be output, or a motion representing the majority may be output.

A motion compensation section 53 receives the temporally different frame 501 and the motion 504, and outputs a motion compensated picture 505. The motion of the temporally different frame is eliminated by using the motion obtained in advance in accordance with the current frame. Motion compensation may be block matching motion compensation or motion compensation using affine transform.

As described above, in this embodiment, a target object can be accurately extracted/tracked by relatively simple processing without any influences of unnecessary motions other than the motion of the target object as follows: (1) tracking the object by using a figure approximately surrounding the object instead of a contour of the object, (2) setting an arbitrary figure for the current frame, determining background regions common to the images inside figures of the current frame and at least the two frames, and extracting the object of the current frame, (3) canceling the motions of the backgrounds of at least the two temporally different frames, (4) detecting the difference value of the images inside arbitrary figures, determining a representative region, determining a difference value corresponding to the images inside figures of the current frame and at least the two frames and the backgrounds at their positions, and determining a background on the basis of the relationship between the difference value and the representative region, (5) segmenting each image inside figure, detecting the motion of the image inside arbitrary figure or part of the segmented image inside figure, determining whether to segment the image inside arbitrary figure or part of the segmented image inside figure, and determining the image inside arbitrary figure and its position of the current frame, and (6) setting a region representing the background, detecting the motion of the background, and forming a picture by canceling the motion of the background of each of the temporally different frames.

In addition, a procedure for object extracting/tracking processing of this embodiment can be implemented by software control. In this case as well, the basic procedure is the same as that described above. After initial figure setting is performed, figure setting processing may be sequentially performed for each input frame. Concurrently with or after this figure setting processing, background region determination processing and object extraction processing may be performed.

The second embodiment of the present invention will be described next.

The first embodiment includes only one object extraction section based on the ORAND method. In some case, however, satisfactory extraction performance may not be obtained by using this section alone depending on input pictures. According to the ORAND method in the first embodiment, a common background is set on the basis of the difference between the current frame subjected to object extraction and the first reference frame that temporally differs from the current frame. In addition, a common background is set on the basis of another current frame and the second reference frame that temporally differs from another current frame. A method of selecting these first and second reference frames is not specifically limited. Depending on the selected first and second reference frames, the object extraction results greatly vary, and any satisfactory result may not be obtained.

The second embodiment is obtained by improving the first embodiment to extract an object with high precision regardless of input pictures.

The first example of the arrangement of an object tracking/extracting apparatus according to the second embodiment will be described first with reference to the block diagram of FIG. 9.

Only the arrangement corresponding to the object tracking/extracting section 2 of the first embodiment will be described below.

A figure setting section 60 is identical to the figure setting section 11 in the first embodiment described with reference to FIG. 2. The figure setting section 60 receives a frame picture 601 and a FIG. 602 set for an initial frame or another input frame, sets a figure for the frame picture 601, and outputs it. A switching section 61 receives a result 605 of object extraction that has already been performed, and outputs a signal 604 for switching to the object extraction section to be used on the basis of the result.

Figure 9:
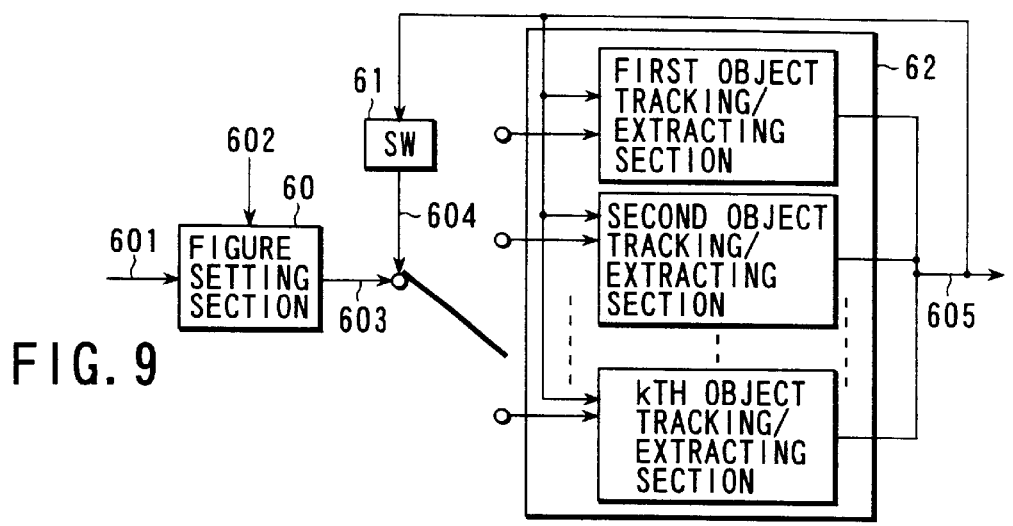
FIG. 9 is a block diagram showing the first object tracking/extracting apparatus for moving picture according to the second embodiment of the present invention.

An object tracking/extracting section 62 is made up of first to Kth object tracking/extracting sections, as shown in FIG. 9. These object tracking/extracting sections perform object extraction by different methods. The object tracking/extracting sections 62 include at least a section using the ORAND method described in the first embodiment. As object tracking/extracting sections using other methods, a section using a shape predictive method based on block matching, a section using an object shape predictive method based on affine transform, and the like can be used. In these shape predictive methods, the position or shape of an object region on the current frame is predicted by inter-frame prediction between a frame having undergone object extraction and the current frame, and the object region is extracted from an image inside FIG. 603 of the current frame on the basis of the prediction result.

FIG. 13 shows an example of how shape prediction is performed by block matching. The image inside figure of the current frame is segmented into blocks having the same size. Each block that is most similar in texture to a corresponding block of the current frame is searched out from a reference frame from which the shape and position of an object have already been extracted. Shape data representing an object region on this reference frame has already been created. The shape data is obtained by expressing the pixel value of each pixel belonging to the object region as "255"; and the pixel value of each of the remaining pixels as "0". Shape data corresponding to the searched out block is pasted to the corresponding position on the current frame. Such a texture search and shape data pasting processing are performed for all the blocks constituting the image inside figure of the current frame to fill the image inside figure of the current frame with shape data for discriminating the object region from the background region. By using this shape data, therefore, a picture (texture) corresponding to the object region can be extracted.

Assume that when operation similar to that of the first object tracking/extracting section is performed, the extraction precision is high. In this case, the switching section 61 operates to select the first object tracking/extracting section. Otherwise, the switching section 61 operates to select another object tracking/extracting section. If, for example, the first object tracking/extracting section is an object shape predicting section based on block matching, switching of the object tracking/extracting sections may be controlled in accordance with the magnitude of a matching error. If this section is an object shape predicting section based on affine transform, the object tracking/extracting sections can be switched in accordance with the magnitude of the estimation error of an affine transform coefficient. The switching operation of the switching section 61 is not performed in units of frames but is performed in units of small regions in each frame, e.g., blocks or regions segmented on the basis of luminances or colors. With this operation, the object extraction methods to be used can be selected more finely, and hence the extraction precision can be increased.

Figure 10:
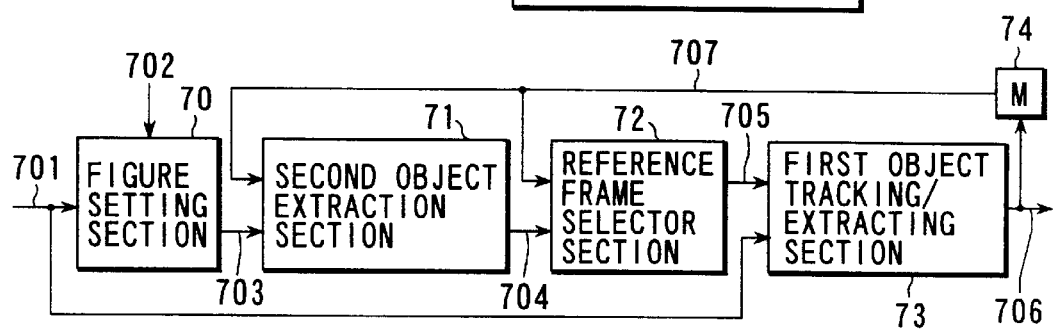
FIG. 10 is a block diagram showing the second object tracking/extracting apparatus for moving picture according to the second embodiment.

FIG. 10 shows the second example of the moving object tracking/extracting apparatus according to the second embodiment.

A figure setting section 70 is identical to the figure setting section 11 in the first embodiment described with reference to FIG. 2. The figure setting section 70 receives a picture 701 and a FIG. 702 set for an initial frame or another input frame, sets a figure for the frame picture 701, and outputs it.

A second object extraction section 71 is used to extract an object region by shape prediction using the block matching method or affine transform. The second object extraction section 71 receives an image inside FIG. 703 of the current frame which is input from the figure setting section 70 and the shape and position 707 of an object on another reference frame having undergone extraction processing, and predicts the shape and position of the object from the image inside FIG. 703 of the current frame.

A reference frame selector section 72 receives the predicted shape and position 704 of the object on the current frame which are predicted by the second object extraction section 71 and the shape and position 707 of the object that have already been extracted, and selects at least two reference frames. A method of selecting reference frames will be described below.

Reference symbols $O_i$, $O_j$, and $O_{curr}$ denote objects on frames i, j, and a currently extracted frame curr, respectively. Deviations $d_i$ and $d_j$ between two temporally different reference frames $f_i$ and $f_j$ are calculated, and these deviations are ANDed to extract an object from a current frame $f_{curr}$. As a result, the overlap between the objects $O_i$ and $O_j$ is extracted by AND processing for the temporally different frames, in addition to the desired object $O_{curr}$. Obviously, if $O_i \cap O_j = \phi$, i.e., if there is no overlap between the objects $O_i$ and $O_j$, and the overlap between the objects $O_i$ and $O_j$ becomes an empty set, no problem arises.

If, however, there is an overlap between the objects $O_i$ and $O_j$ and the overlap is located outside the object to be extracted, $O_{curr}$ and $O_i \cap O_j$ remain as extraction results.

In this case, as shown in FIG. 14A, no problem is posed when there is no region common all to the background region ($O_{curr}^-$) of the object $O_{curr}$ and the objects $O_i$ and $O_j$ $\{O_{curr}^- \cap (O_i \cap O_j) = \phi\}$. If, however, as shown in FIG. 14B, there is a region common all to the background region ($O_{curr}^-$) of the object $O_{curr}$ and the objects $O_i$ and $O_j$ $\{O_{curr}^- \cap (O_i \cap O_j) \neq \phi\}$, the object $O_{curr}$ is extracted in a wrong shape, as indicated by the hatching.

The optimal reference frames $f_i$ and $f_j$ for extraction of an object in a correct shape are frames that satisfy $$(O_i \cap O_j) \cap O_{curr} \qquad (1)$$

That is, they are the frames $f_i$ and $f_j$ that make the overlap between the objects $O_i$ and $O_j$ belong to the object $O_{curr}$ (FIG. 14A).

In addition, when two or more reference frames are to be selected, $$(O_i \cap O_j \cap \ldots \cap Ok) \cap O_{curr} \qquad (2)$$

The shape of an object can therefore be reliably extracted by selecting reference frames that satisfy expression (1) or (2) on the basis of the prediction result on the position or shape of the object on the current frame subjected to object extraction.

A first object tracking/extracting section 73 receives at least two reference frames 705 selected by the reference frame selector section 72 and the current picture 701, extracts an object by the ORAND method, and outputs its shape and position 706.

A memory 74 holds the shape and position 706 of the extracted object.

Figure 11:
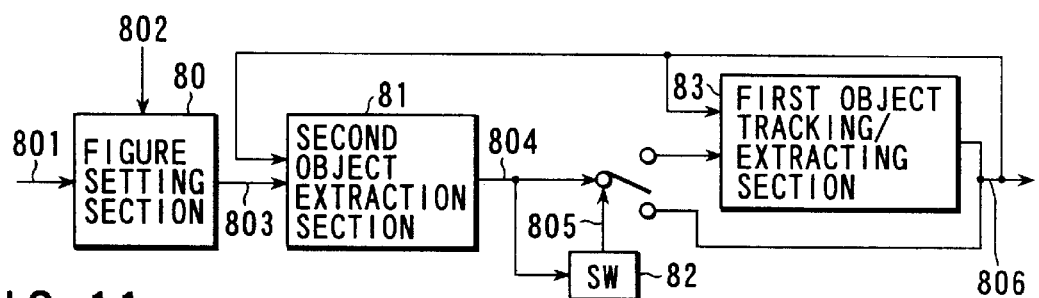
FIG. 11 is a block diagram showing the third object tracking/extracting apparatus for moving picture according to the second embodiment.

FIG. 11 shows the third example of the arrangement of the object tracking/extracting apparatus according to the second embodiment.

As shown in FIG. 11, this object tracking/extracting apparatus comprises a figure setting section 80, a second object extraction section 81, a switching section 82, and a first object extraction section 83. The figure setting section 80, the second object extraction section 81, and the first object extraction section 83 respectively correspond to the figure setting section 70, the second object extraction section 71, and the first object tracking/extracting section 73 in FIG. 10. In this case, with the switching section 82, the extraction results obtained by the second object extraction section 81 and the first object extraction section 83 are selectively used.

More specifically, the figure setting section 80 receives a picture 801 and the shape and position 802 of an initial figure, and outputs the shape and position 803 of the figure. The second object extraction section 81 receives the shape and position 803 of the figure and the shape and position 806 of an already extracted object, predicts the predicted shape and position 804 of an object that has not been extracted, and outputs them. The switching section 82 receives the shape and position 804 of the object which are predicted by the second object extraction section 81, and outputs a signal 805 for switching or not switching to the first object extraction section 83. The first object extraction section 83 receives the shape and position 806 of the already extracted object and the predicted shape and position 804 of the object that has not been extracted, determines the shape and position 805 of the object, and outputs them.

The switching operation of the switching section 82 may be performed in units of blocks as in the above case, or may be performed in units of regions segmented on the basis of luminances or colors. For example, switching may be determined on the basis of the predictive error in object prediction. More specifically, if the predictive error in the second object extraction section 81 that performs object extraction by using inter-frame prediction is equal to or smaller than a predetermined threshold value, the switching section 82 operates to use the predicted shape obtained by the second object extraction section 81 as an extraction result. If the predictive error in the second object extraction section 81 exceeds the predetermined threshold value, the switching section 82 operates to make the first object extraction section 83 perform object extraction by the ORAND method. The extraction result is then output to an external unit.

FIG. 15 shows examples of the extraction results obtained when the extraction sections to be used are switched for each block as a unit of prediction on the basis of a matching error.

In this case, each crosshatched portion indicates the object shape predicted by the second object extraction section 81, and the hatched portion indicates the object shape obtained by the first object extraction section 83.

Figure 12:
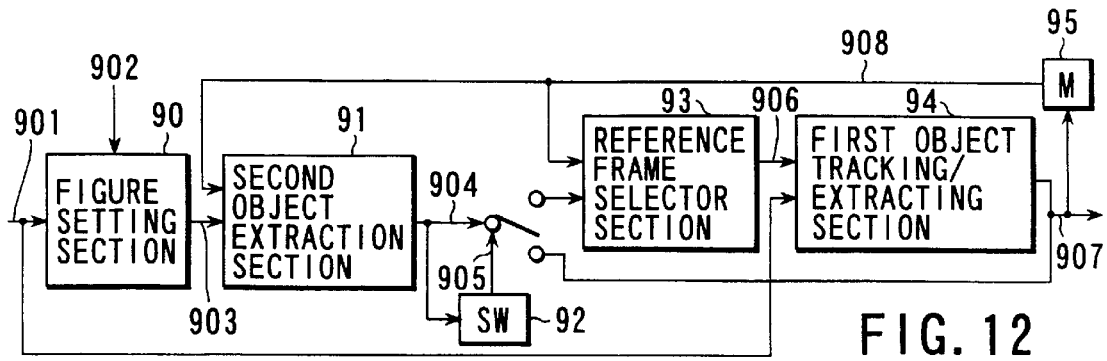
FIG. 12 is a block diagram showing the fourth object tracking/extracting apparatus for moving picture according to the second embodiment.

FIG. 12 shows the fourth example of the arrangement of the moving object tracking/extracting apparatus according to the second embodiment.

This object tracking/extracting apparatus has the reference frame selecting section shown in FIG. 10 in addition to the arrangement in FIG. 11.

A figure setting section 90 receives a picture 901 and the shape and position 902 of an initial figure, and outputs the shape and position 903 of the figure. A second object extraction section 91 receives the shape and position 903 of the figure and the shape and position 908 of an already extracted object, and predicts the shape and position 904 of an object that has not been extracted. A switching section 92 receives the predicted shape and position 904 of the object, checks whether the precision of the predicted object is satisfactorily high, and outputs a switch signal 905 for switching the object extraction output obtained by the second object extraction section. A reference frame selector section 93 receives the predicted shape and position 904 of the object that has not been extracted, selects the shape and position 906 of an object based on at least two reference frames or those of a predicted object, and outputs them. An object tracking/extracting section 94 receives the current picture 901 and the shape and position 906 of the object based on at least the two reference frames or the predicted object, extract an object, and outputs the shape and position 907 of the object. A memory 95 holds the shape and position 907 of the extracted object or the shape and position 904 of the predicted object.

Figure 16:
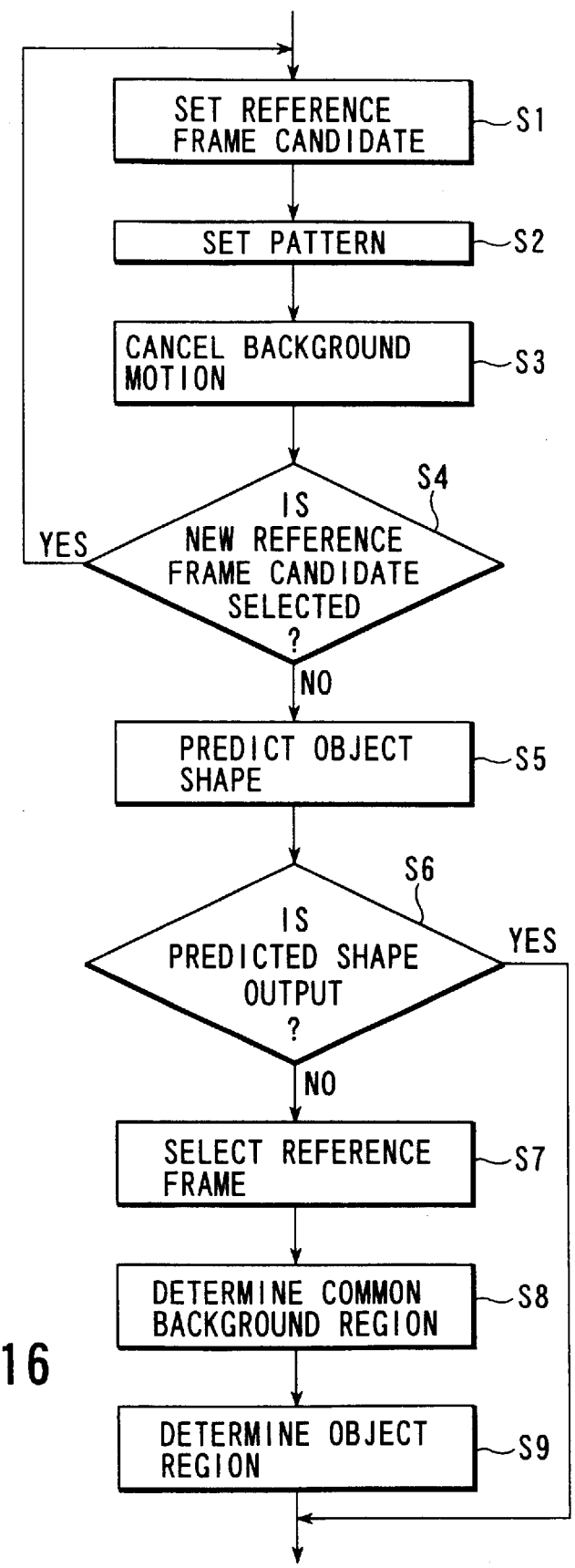
FIG. 16 is a flow chart for explaining the flow of object tracking/extracting processing for moving picture using the object tracking/extracting apparatus according to the second embodiment.

A procedure for an object tracking/extracting method in this case will be described below with reference to FIG. 16.
(Step S1)

As reference frame candidates, frames that temporally differ from the current frame are set in advance. These candidates may be all the frames other than the current frame or may be several frames preceding/following the current frame. For example, reference frame candidates are limited to a total of five frames, i.e., the initial frame, the three frames preceding the current frame, and the one frame following the current frame. If, however, the number of previous frames is less than three, the number of future frames as candidates is increased accordingly. If there is no frame following the current frame, four frames preceding the current frames are set as candidates.
(Step S2)

First of all, the user sets a figure, e.g., a rectangle, on the initial frame in which the object to be extracted is drawn. A figure is set on each subsequent frame by dividing the initially set figure into blocks, matching the blocks, and pasting each block to the corresponding position. The object is tracked by setting a new rectangle to surround all the pasted blocks. Figures for object tracking are set on all the reference frame candidates. If an object tracking figure for each future frame is obtained by using the object every time the object is extracted, an extraction error can be prevented more effectively. In addition, the user inputs the shape of the object on the initial frame.

Assume that the frame from which the object is to be extracted is the current frame, and the object has already been extracted from each previous frame, but no object has been extracted from the future frame.
(Step S3)

A proper region is set around the figure on each reference frame candidate. The motion of the background with respect to the current frame is detected to eliminate the background in the figure on the reference frame. The motion of the background is detected by the following method. A region having a width corresponding to several pixels is set around the figure. This region is matched with the current frame. A motion vector exhibiting the minimum matching error is detected as the motion of the background.
(Step S4)

An extraction error caused when the background motion is not properly eliminated can be prevented by removing any reference frame that exhibits a large motion vector detection error in canceling the background motion from the candidates. In addition, if the number of reference frame candidates decreases, new reference frame candidates may be selected again. If figure setting and background motion elimination have not been performed for a new reference frame candidate, figure setting and background motion elimination must be performed.
(Step S5)

The shape of the object on the current frame from which the object has not been extracted and the shape of the object on each reference frame candidate preceding the current frame are predicted. The rectangle set on the current frame or the preceding reference frame candidate is segmented into, e.g., blocks, and block matching is performed with a frame (previous frame) from which the object has already been extracted, and the corresponding object shape is pasted, thereby predicting the object shape. An extraction error can be prevented more effectively by predicting the object on each future frame by using the object every time it is extracted.
(Step S6)

At this time, any block exhibiting a small prediction error outputs the predicted shape as an extraction result without any change. If an object shape is predicted in units of blocks, block distortion may occur owing to matching errors. In order to prevent this, the video signal may be filtered to smooth the overall object shape.

Rectangle segmentation in object tracking and object shape prediction may be performed in a fixed block size, or may be performed by hierarchial block matching with a matching threshold value.

The following processing is performed for each block exhibiting a large prediction error.
(Step S7)

Temporary reference frames are set from the reference frame candidates, and each set of reference frames that satisfy expression (1) or (2) is selected. If any set of all the reference frame candidates does not satisfy either expression (1) or (2), a set having the minimum number of pixels in $O_i \cap O_j$ may be selected. Reference frame candidates are preferably combined to select frames that minimize motion vector detection errors in canceling the motion of the background. More specifically, if there are reference frame sets that satisfy expression (1) or (2), for example, a set that exhibits a smaller motion vector detection error in canceling the motion of the background may be selected. Assume that two frames are selected as reference frames in the following description.

(Step S8)

When reference frames are selected, the inter-frame difference between each reference frame and the current frame is obtained, and attention is given to the inter-frame difference in the set figure. The histogram of the absolute values of the deviations of one-line pixels outside the set figure is obtained, and the absolute value of a majority difference is set as the difference value of the background region, thereby determining the background pixels of the one-line pixels outside the set figure. A search is performed inwardly from the background pixels of the one-line pixels outside the set figure to determine any pixel having the same difference value as that of the adjacent background region as a background pixel. This search is sequentially performed until no pixel is determined as a background pixel. This background pixel is a background region common to the current frame and one reference frame. At this time, since the boundary between the background region and the remaining portions may become unnatural, the video signal may be filtered to smooth the boundary or eliminate excess or noise regions.

(Step S9)

When background regions common to the respective reference frames are obtained, a region that is not contained in the two common background regions is detected and extracted as an object region. This result is output for a portion that does not use the object shape predicted in advance to output the overall object shape.

If there is no matching between the portion using the shape obtained from the common backgrounds and the portion using the predicted object shape, filtering can make the output result look nice.

As described above, according to the second embodiment, an object can be accurately extracted regardless of input pictures, or reference frames suitable for object extraction can be selected.

The third embodiment of the present invention will be described next.

The first example of an object tracking/extracting apparatus according to the third embodiment will be described first with reference to the block diagram of FIG. 17.

In this arrangement, the feature value of a picture in at least a partial region is extracted from the current frame subjected to object extraction, and a plurality of object extraction sections are switched on the basis of the feature value.

Figure 17:
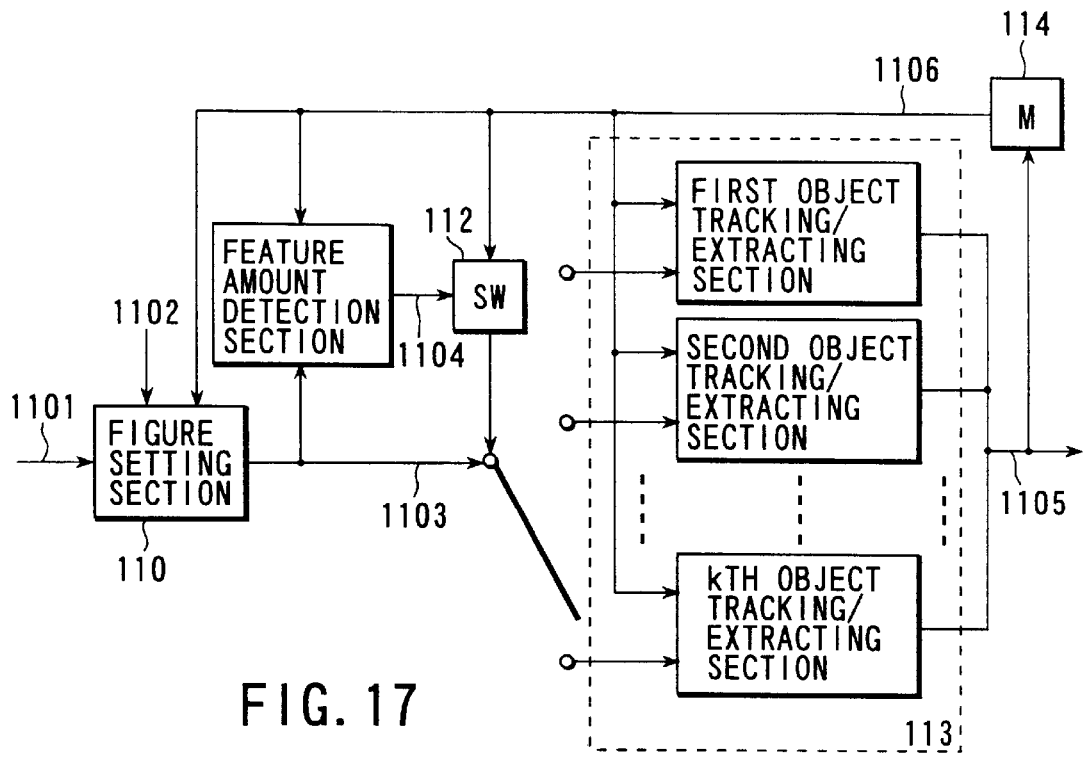
FIG. 17 is a block diagram showing the first object tracking/extracting apparatus for moving picture according to the third embodiment of the present invention.

As shown in FIG. 17, this object tracking/extracting apparatus comprises a figure setting section 110, a feature value extraction section 111, a switching section 112, a plurality of object tracking/extracting sections 113, and a memory 114. The figure setting section 110, the switching section 112, and the plurality of object tracking/extracting sections 113 respectively correspond to the figure setting section 60, the switching section 61, and the plurality of object tracking/extracting sections 62 in the second embodiment in FIG. 9. This apparatus differs from that of the second embodiment in that the object tracking/extracting sections to be used are switched on the basis of the feature value of the picture of the current frame which is extracted by the feature value extraction section 111.

The figure setting section 110 receives an extracted frame 1101, an initial FIG. 1102 set by the user, and an extraction result 1106 based on the already extracted frame, sets a figure for the extracted frame, and outputs the figure. The figure may be a geometrical figure such as a rectangle, circle, or ellipse, or the user may input an object shape to the figure setting section 110. In this case, the figure may not have a precise shape but may have an approximate shape. The feature value extraction section 111 receives an extracted frame 1103 in which a figure is set and the extraction result 1106 based on the already extracted frame, and outputs a feature value 1104. The switching section 112 receives the feature value 1104 and the extraction result 1106 based on the already extracted frame, and controls inputting the extraction result 1106 based on the already extracted frame to the object tracking/extracting section.

Upon reception of the feature value of the overall picture, the switching section 112 detects the properties of the picture, and can use them for control on inputting of the picture to a proper object tracking/extracting section. The portion inside a figure is segmented into portions each having a proper size, and the feature value may be applied in units of segmented figure portions. The feature value includes a dispersion, luminance gradient, edge intensity, and the like. In this case, these values can be automatically calculated. Alternatively, the user may visually perceive the properties of the object and input them to the switching section 112. If, for example, a target object is a person, his/her hair exhibiting unclear edges may be designated to specially select a parameter for extraction, and extraction may be performed after edge correction is performed as pre-processing.

The feature value may be associated with a portion (background portion) outside the set figure as well as portions (object and its surrounding) inside figure.

Each of the plurality of (first to kth) object tracking/extracting sections 113 receives the extracted frame 1103 in which the figure is set and the extraction result 1106 based on the already extracted frame, and outputs a result 1105 obtained by tracking/extracting the object.

The plurality of object tracking/extracting sections 113 include a section for extracting an object by using the ORAND method, a section for extracting an object by using chromakeys, a section for extracting an object by block matching or affine transform, and the like.

In the first embodiment, a background pixel is determined by using the histogram of the inter-frame differences of the pixel values around the set figure. However, a pixel corresponding to an inter-frame difference equal to or smaller than a threshold value may be simply determined as a background pixel. In addition, in the first embodiment, background pixels (corresponding to difference values equal to or smaller than the predetermined value) are sequentially determined inwardly from the set figure. However, object pixels (corresponding to difference values equal to or larger than the predetermined value) may be sequentially determined outwardly from the figure, or an arbitrary operation sequence may be employed.

The memory 114 receives the result 1105 obtained by tracking/extracting the object, and saves it.

The reason why a better extraction result can be obtained by switching the tracking/extracting methods in accordance with the feature value indicating the properties of a picture will be described below.

If, for example, it is known in advance whether a background moves or not, the corresponding property is preferably used. When the background moves, the motion of the background is compensated, but perfect compensation may not be attained. Almost no motion compensation can be performed for a frame exhibiting a complicated motion. Such a frame can be known in advance from a background motion compensation error, and hence can be excluded from reference frame candidates. If, however, there is no background motion, this processing is not required. If another object is moving, erroneous background motion compensation may be performed. Alternatively, the corresponding frame may be excluded from reference frame candidates. Even if, therefore, this frame is optimal for reference frame selection conditions, the frame is not selected, resulting in a decrease in extraction precision.

In addition, one picture includes various properties. The motion and texture of an object may partly vary, and hence the object may not be properly extracted by the same tracking/extracting method and apparatus and the same parameters. For this reason, the user preferably designates a portion of a picture which has a special property. Alternatively, differences in a picture may be automatically detected as feature values to extract an object by partly switching tracking/extracting methods, or the parameters may be changed.

When the plurality of object tracking/extracting sections are switched in this manner, the shapes of objects in various pictures can be accurately extracted.

The second example of the moving object tracking/extracting apparatus according to the third embodiment will be described next with reference to the block diagram of FIG. 18.

A figure setting section 120 receives an extracted frame 1201, an initial FIG. 1202 set by the user, and an extraction result 1207 based on the already extracted frame, sets a figure for the extracted frame, and outputs the figure. A second object tracking/extracting section 121 is used to extract an object region by shape prediction such as the block matching method or affine transform. The second object tracking/extracting section 121 receives an extracted frame 1203 in which a figure is set and the extraction result 1207 based on the already extracted frame, and outputs an object tracking/extracting result 1204.

A feature value extraction section 122 receives the object tracking/extracting result 1204, and outputs a feature value 1205 of the object to a switching section 123. The switching section 123 receives the feature value 1205 of the object, and controls inputting the object tracking/extracting result 1204 to the first object tracking/extracting section. Assume that the second object tracking/extracting section 121 tracks/extracts an object shape by the block matching method. In this case, a feature value is regarded as a matching error, and the second object tracking/extracting section 121 outputs a portion exhibiting a small matching error as a predicted shape extraction result. Other feature values include parameters (fractal dimension and the like) representing the luminance gradient or dispersion of each block and texture complicity. When luminance gradient is to be used, input control is performed on the first object tracking/extracting section to use the result obtained by a first object tracking/extracting section 124 using the ORAND method with respect to a block having almost no luminance gradient. In addition, when an edge is detected to use information indicating the presence/absence or intensity of the edge as a feature value, input control is performed on the first object tracking/extracting section so as to use the result obtained by the first object tracking/extracting section 124 with respect to a portion having no edge or having a weak edge. In this manner, switching control can be changed in units of blocks or regions as portions of a picture. Adaptive control can be realized by increasing/decreasing the threshold value for switching.

The first object tracking/extracting section 124 receives the extracted frame 1201, the object tracking/extracting result 1204, and the extraction result 1207 based on the already extracted frame, and outputs a tracking/extracting result 1206 based on the already extracted frame to a memory 125. The memory 125 receives the tracking/extracting result 1206 based on the extracted frame and saves it.

Figure 19:
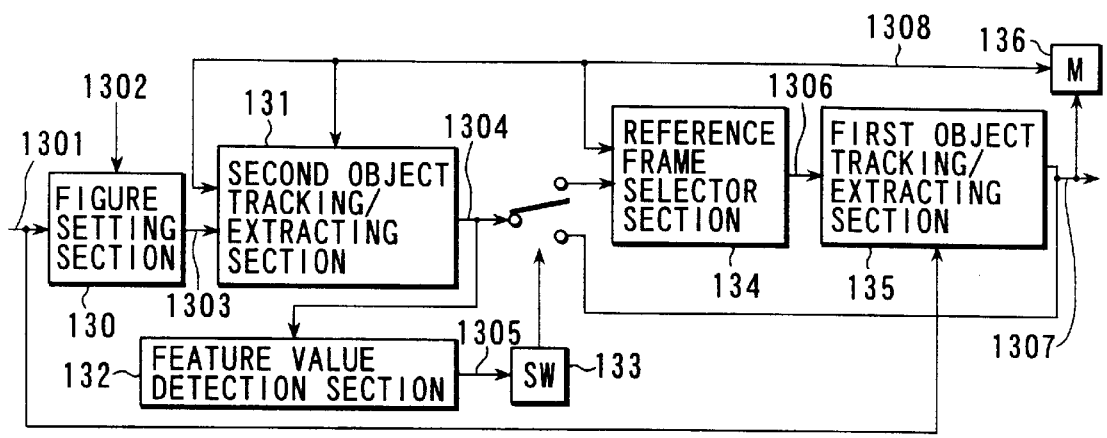
FIG. 19 is a block diagram showing the third object tracking/extracting apparatus for moving picture according to the third embodiment.

The third example of the arrangement of the object tracking/extracting apparatus according to the third embodiment will be described next with reference to the block diagram of FIG. 19.

Figure 18:
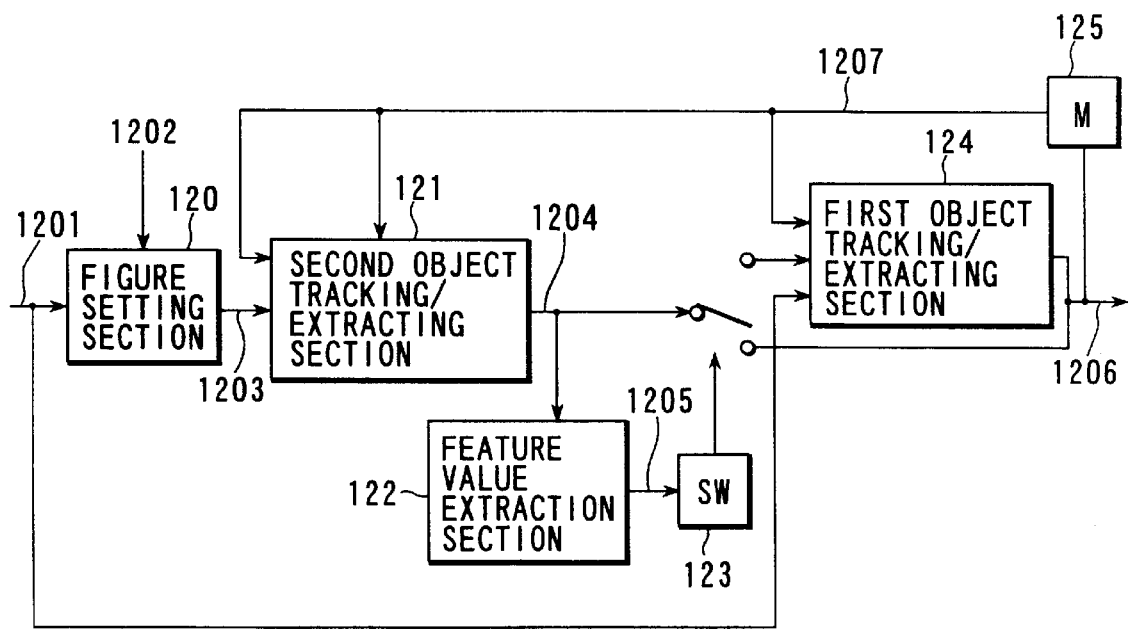
FIG. 18 is a block diagram showing the second object tracking/extracting apparatus for moving picture according to the third embodiment.

This object tracking/extracting apparatus includes the reference frame selecting section described in the second embodiment in addition to the arrangement shown in FIG. 18. As shown in FIG. 19, the object tracking/extracting apparatus comprises a figure setting section 130, a second object tracking/extracting section 131, a feature value extraction section 132, a switching section 133, a reference frame selector section 134, a first object tracking/extracting section 135, and a memory 136.

The figure setting section 130 receives an extracted frame 1301, an initial FIG. 1302 set by the user, and an extraction result 1308 based on the already extracted frame, sets a figure for the extracted frame, and outputs the figure. The second object tracking/extracting section 131 is used to extract an object region by shape prediction such as the block matching method or affine transform. The second object tracking/extracting section 131 receives an extracted frame 1303 in which a figure is set and the extraction result 1308 based on the already extracted frame, and outputs an object tracking/extracting result 1304.

The feature value extraction section 132 receives the object tracking/extracting result 1304, and outputs a feature value 1305 of the object. The switching section 133 receives the feature value 1305 of the object, and controls inputting the object tracking/extracting result 1304 to the first object tracking/extracting section 135.

The reference frame selector section 134 receives the object tracking/extracting result 1304 to be sent to the first object tracking/extracting section 135 and the extraction result 1308 based on the already extracted frame, and outputs a reference frame 1306.

An example of the features of an object is motion complexity. When the object is to be tracked/extracted by the second object tracking/extracting section 131 using the block matching method, the first object extraction result is output with respect to a portion exhibiting a large matching error. If a portion of the object exhibits a complicated motion, the matching error corresponding to the portion increases. As a result, the portion is extracted by the first object tracking/extracting section 135. Therefore, the reference frame selecting methods to be used by the first object tracking/extracting section 135 are switched in accordance with this matching error as a feature value. More specifically, a reference frame selecting method is selected for only the portion to be extracted by the first object tracking/extracting section 135 instead of the overall object shape so as to satisfy expression (1) or (2) as a selection condition described in the second embodiment.

An example of the feature value of a background includes, for example, information indicating 1) a picture with a still background, 2) zooming operation, and 3) panning operation. The user may input this feature value, or the parameter obtained from the camera may be input as a feature value. The feature value of a background includes a background motion vector, the precision of a picture having undergone background motion compensation, the luminance distribution of the background, texture, edge, and the like. For example, reference frame selecting methods can be controlled in accordance with the precision of a picture having undergone background motion compensation which is obtained as a feature value from the averaged difference between the picture having undergone background motion compensation and the picture before correction. For example, control is performed such that when the averaged difference is large, the corresponding frame may be excluded from reference frame candidates or a lower priority is assigned to the frame in frame selection. If the background is still or background motion compensation is perfectly performed for all the frames, the difference becomes zero. The same reference frame selecting method as that in the second embodiment can be used.

The first object tracking/extracting section 135 receives the extracted frame 1301, the reference frame 1306, and the extraction result 1308 based on the already extracted frame, and outputs a tracking/extracting result 1307 obtained from the extracted frame by the ORAND method to the first object tracking/extracting section 135. The memory 136 receives the tracking/extracting result 1307 based on the extracted frame, and holds it.

Figure 22:
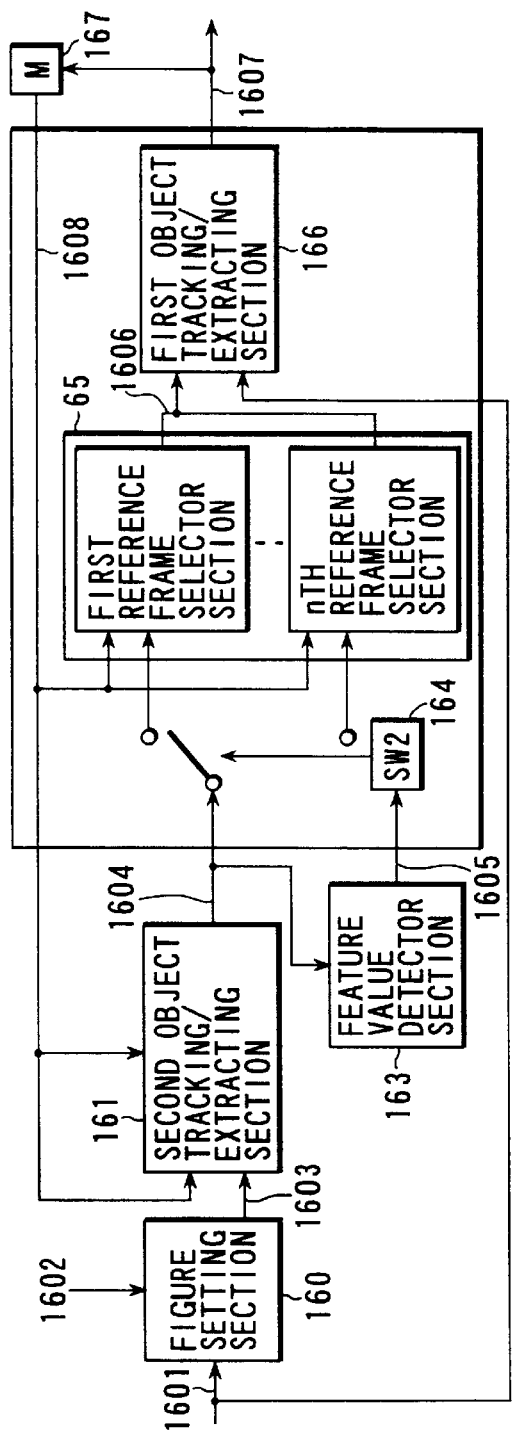
FIG. 22 is a block diagram showing the fourth object tracking/extracting apparatus for moving picture according to the third embodiment.
Figure 23:
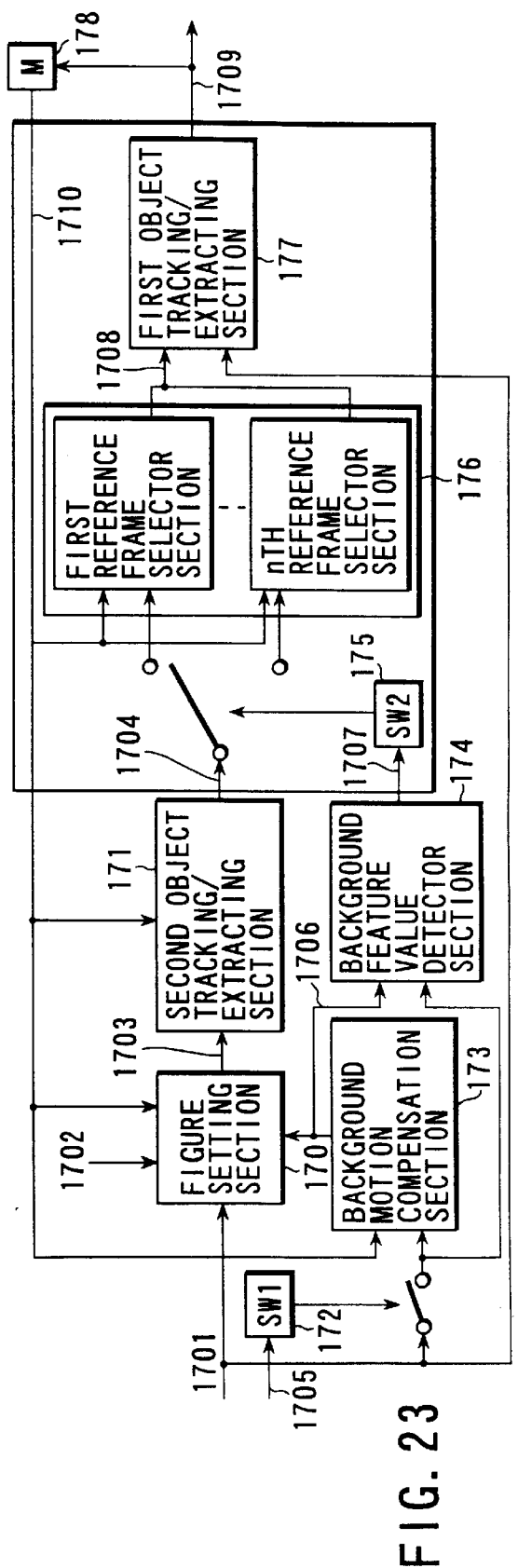
FIG. 23 is a block diagram showing still another example of the arrangement of the object tracking/extracting apparatus for moving picture according to the third embodiment.

Of the above examples, the arrangement in which a plurality of reference frame selecting sections are switched in accordance with the feature value obtained from the output from the second object tracking/extracting section will be described as the fourth example of the arrangement of this apparatus with reference to FIG. 22.

A figure setting section 160 receives an extracted frame 1601, an initial FIG. 1602 set by the user, and a frame 1608 from which an object has already been extracted, and outputs a set FIG. 1603. A second object tracking/extracting section 161 is used to extract an object region by shape prediction such as the block matching method or affine transform. The second object tracking/extracting section 161 receives the frame 1608 from which the object has already been extracted, and outputs an object tracking/extracting result 1604. A feature value detector section 163 receives the object tracking/extracting result 1604, and outputs a feature value 1605 to a switching section 164. The switching section 164 receives the feature value 1605, and controls inputting the object tracking/extracting result 1604 to the reference frame selecting section.

Each of a plurality of reference frame selector sections 165 receives the object tracking/extracting result 1604 and the frame 1608 from which the object has already been extracted, and outputs at least two reference frames 1606.

A first object tracking/extracting section 166 is used to extract an object by the ORAND method. The first object tracking/extracting section 166 receives the reference frames 1606 and the extracted frame 1601, and outputs an object tracking/extracting result 1607 to a memory 167. The memory 167 receives the object tracking/extracting result 1607 and holds it.

Of the above cases, the case in which background information is obtained, and input control is performed on a plurality of reference frame selecting sections in accordance with the background motion compensation error will be described next.

A figure setting section 170 receives an extracted frame 1701, an initial FIG. 1702 set by the user, and a frame 1710 from which an object has already been extracted, and outputs a set FIG. 1703. A second object tracking/extracting section 171 receives the set FIG. 1703 and the frame 1710 from which the object has already been extracted, and outputs an object tracking/extracting result 1704. A switching section 172 receives background information 1705 designated by the user, and controls inputting the extracted frame 1701 to a background motion compensation section 173.

The background motion compensation section 173 receives the extracted frame 1701 and the frame 1710 from which the object has already been extracted, and outputs a frame 1706 having undergone background motion compensation.

A background feature value detector section 174 receives the extracted frame 1701 and the frame 1706 having undergone background motion compensation, and outputs a background feature value 1707 to a switching section 175. The switching section 175 receives the background feature value 1707, and controls inputting the object tracking/extracting result 1704 to a reference frame selector section 176. The reference frame selector section 176 receives the object tracking/extracting result 1704 and the frame 1710 from which the object has already been extracted, and outputs at least two reference frames 1708.

A first object tracking/extracting section 177 receives at least the two reference frames 1708 and the extracted frame 1701, and outputs an object tracking/extracting result 1709 to a memory 178. The memory 178 receives and holds the object tracking/extracting result 1709.

Figure 20:
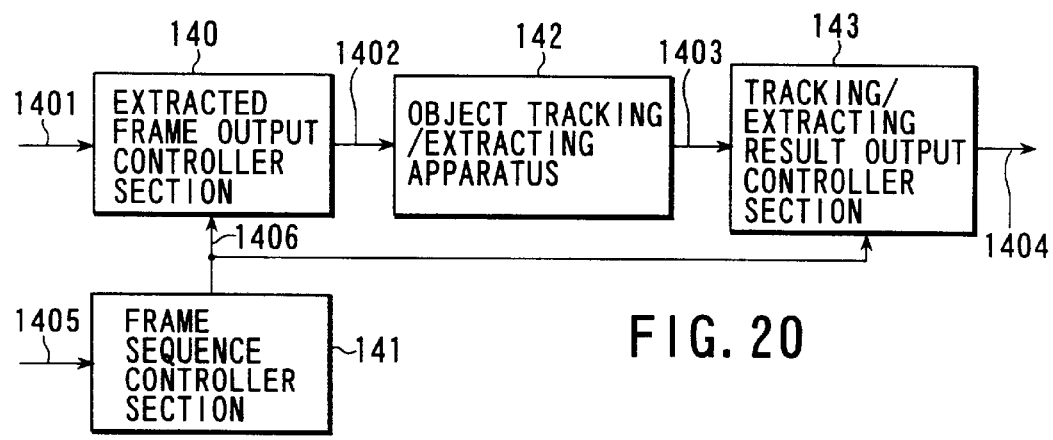
FIG. 20 is a block diagram showing the fifth object tracking/extracting apparatus for moving picture according to the third embodiment.

The fifth example of the arrangement of the object tracking/extracting apparatus according to the third embodiment will be described next with reference to the block diagram of FIG. 20.

An extracted frame output controller section 140 receives a picture 1401 and a sequence 1405 of frames to be extracted, and outputs an extracted frame 1402. A frame sequence controller section 141 receives the information 1405 about the frame sequence input by the user, and outputs a frame sequence 1406. An object tracking/extracting apparatus 142 is an object tracking/extracting method and apparatus for extracting/tracking a target object from a moving picture signal. The object tracking/extracting apparatus 142 receives the extracted frame 1402 and outputs a tracking/extracting result 1403 to a tracking/extracting result output controller section 143. The tracking/extracting result output controller section 143 receives the tracking/extracting result 1403 and the frame sequence 1406, rearranges the frame sequence to match with the picture 1401, and outputs the result.

A frame sequence may be input by the user or may be adaptively determined in accordance with the motion of the object. A frame interval at which the motion of the object can be easily detected is determined to extract the object. More specifically, the frame sequence is controlled to perform object extraction processing in a sequence different from the input frame sequence in such a manner that the frame interval between each reference frame and the current frame subjected to object extraction becomes two or more frames. With this operation, the prediction precision can be increased as compared with the case wherein shape prediction based on inter-frame prediction or ORAND computation is performed in the input fame sequence. In the case of the ORAND method, the extraction precision can be increased by selecting proper reference frames. Therefore, this method is especially effective for a shape prediction method based on inter-frame prediction using block matching or the like.

Depending on the frame interval, the motion becomes too small or complicated to be properly coped with by using the shape prediction method based on inter-frame prediction. If, therefore, a shape prediction error is not equal to or smaller than a threshold value, the prediction precision can be increased by increasing the interval between the current frame and the extracted frame used for prediction. As a result, the extraction precision can also be increased. If there is a background motion, the background motion between each reference frame and the extracted frame is obtained and compensated. Depending on the frame interval, however, the background motion becomes too small or complicated to accurately perform background motion compensation. In this case as well, the motion compensation precision can be increased by increasing the frame interval. An object shape can be extracted more reliably by adaptively controlling the frame extraction sequence in this manner.

Figure 21:
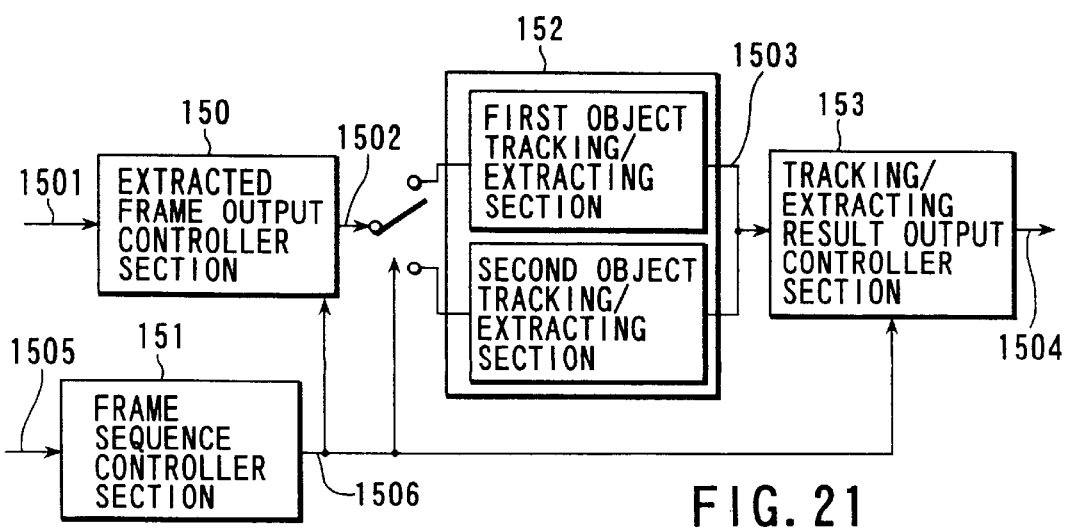
FIG. 21 is a block diagram showing the sixth object tracking/extracting apparatus for moving picture according to the third embodiment.

The sixth example of the arrangement of the object tracking/extracting apparatus according to the third embodiment will be described next with reference to the block diagram of FIG. 21.

An extracted frame output controller section 150 receives a picture 1501 and a frame extraction sequence 1505, and outputs an extracted frame 1502. A frame sequence controller section 151 receives information 1505 about the frame sequence input by the user, and outputs a frame sequence 1506. That is, the frame sequence controller section 151 receives the frame interval and determines a frame extraction sequence. Each of a plurality of object tracking/extracting apparatuses 152 is an object tracking/extracting method and apparatus for extracting/tracking a target object from a moving picture signal. Inputting of the extracted frame 1502 to each object tracking/extracting apparatus 152 is controlled in accordance with the frame sequence 1506, and the apparatus outputs a tracking/extracting result 1503. A tracking/extracting result output controller section 153 receives the tracking/extracting result 1503 and the frame sequence 1506, rearranges the frame sequence to match with the picture 1501, and outputs the result.

Skipped frames may be interpolated from already extracted frames, or may be extracted by the same algorithm upon changing the method of selecting reference frame candidates.

An example of the processing performed by the object tracking/extracting apparatus in FIG. 21 will be described below with reference to FIG. 25.

Figure 25:
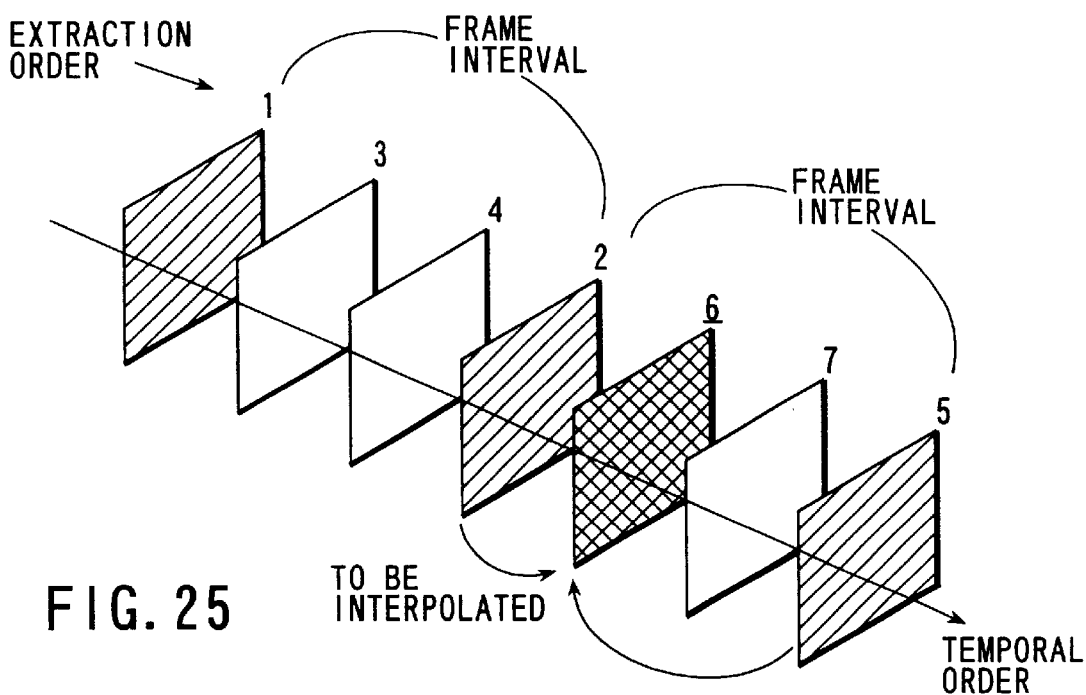
FIG. 25 is a view for explaining an example of an extracted frame sequence based on frame sequence control applied to the object tracking/extracting apparatus for moving picture according to the third embodiment.

Referring to FIG. 25, the frames indicated by the hatching are future frames to be extracted at two-frame intervals. Skipped frames are extracted by the second object tracking/extracting apparatus. As shown in FIG. 25, after two frames on the two sides of a skipped frame are extracted, the skipped frame may be interpolated on the basis of the extraction result on the two frames, thereby obtaining an object shape. In addition, a parameter such as a threshold value may be changed, or these frames on the two sides of the skipped frame may be added to reference frame candidates to extract the skipped frame by the same method as that used for the frames on the two sides.

Figure 24:
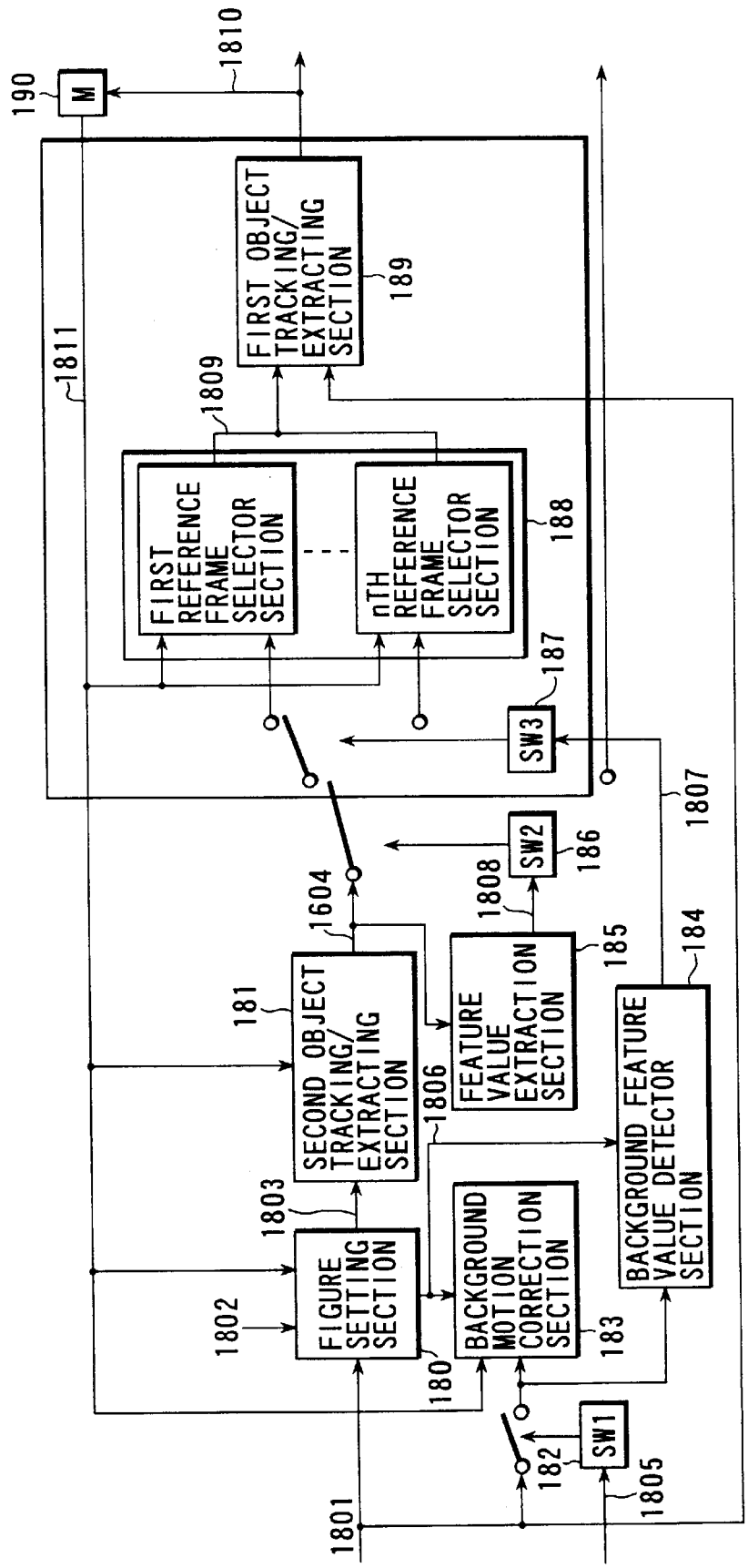
FIG. 24 is a block diagram showing still another example of the arrangement of the object tracking/extracting apparatus for moving picture according to the third embodiment.

Another arrangement of the object tracking/extracting apparatus will be described next with reference to the block diagram of FIG. 24.

A switching section 182 receives background information 1805 designated by the user, and controls inputting an extracted frame 1801 to a background motion correction section 183. The background motion correction section 183 receives the extracted frame 1801 and a frame 1811 from which an object has already been extracted, and outputs a frame 1806 having undergone background motion compensation to a frame 1806. A background feature value detector section 184 receives the extracted frame 1801 and the frame 1806 having undergone background motion compensation, and outputs a feature value 1807. A switching section 187 receives the background feature value 1807, and controls inputting a tracking/extracting result 1804 to a reference frame selector section 188. A figure setting section 180 receives the extracted frame 1801, the frame 1811 from which the object has already been extracted, and an initial FIG. 1802 set by the user, and outputs an extracted frame 1803 on which a figure is set. A second object tracking/extracting section 181 receives the extracted frame 1803 on which the figure is set and the frame 1811 from which the object has already been extracted, and outputs the tracking/extracting result 1804. A feature value detector section 184 receives the tracking/extracting result 1804, and outputs a feature value 1808. A switching section 186 receives the feature value 1808, and controls inputting the tracking/extracting result 1804 to the reference frame selector section 188. The reference frame selector section 188 receives the object tracking/extracting result 1804 and the frame 1811 from which the object has already been extracted, and outputs at least two reference frames 1809.

A first object tracking/extracting section 189 receives at least the two reference frames 1809 and the extracted frame 1801, and outputs an object tracking/extracting result 1810 to a memory 190. The memory 190 holds the object tracking/extracting result 1810.

The following is the flow of processing.

The user roughly surrounds an object to be extracted on an initial frame. A rectangle on a subsequent frame is set by expanding the rectangle surrounding the already extracted object by several pixels in all directions. This rectangle is segmented into a blocks, and each block is matched with a corresponding block of the already extracted block. Then, the shape of the already extracted object is pasted at the corresponding position. The object shape (predicted object shape) obtained by this processing represents an approximate object. If the prediction precision is not equal to or smaller than the threshold value, the prediction precision may be increased by performing prediction again by using another frame.

If the prediction precision is high, all or part of the predicted shape is output as an extraction result without any change. This method can allow both tracking and extraction of the object.

In forming blocks in object tracking and object shape prediction, a rectangle may be segmented in a fixed block size, or hierarchical block matching based on a matching threshold value may be performed. Alternatively, a frame may be segmented in a fixed size, and only the blocks including the object may be used.

In consideration of a case wherein the prediction precision is low, the predicted object shape is expanded by several pixels to correct irregular portions and holes due to prediction errors are corrected. Predicted object shapes are set on all the reference frame candidates by this method. Every time an object is extracted, an object tracking figure for a future frame is newly obtained by using the extracted object, thereby preventing any extraction error. Note that this tracking figure is set to surround the object.

Assume that an object has already been extracted from a frame preceding each extracted frame, and no object has been extracted from the future frame.

Assume that reference frame candidates are five frames that temporally differ, at predetermined intervals, from and precede/follow each frame to be extracted at predetermined intervals. More specifically, reference frame candidates are limited to a total of five frames, e.g., the initial frame, the three frames preceding the current frame, and one frame following the current frame. If, however, the number of previous frames is less than three, the number of future frames is increased accordingly. If there is no future frame, four previous frames are set as candidates.

A proper region is set around an object on each reference frame candidate. The motion of a background between this region and the current frame is detected to eliminate the background in the figure on the reference frame. The background motion is detected by the following method. Matching is performed between the entire region excluding the object and the current frame. A motion vector exhibiting the minimum matching error is determined as the background motion.

Any reference frame exhibiting a large motion vector detection error in canceling a background motion is excluded from candidates to prevent any extraction error that is caused when elimination of a background motion is not proper. In addition, if the number of reference frame candidates decreases, new reference frame candidates may be selected again. If figure setting and background motion elimination have not been performed for a new reference frame candidate, figure setting and background motion elimination must be performed.

If it is known in advance that there is no background motion, this processing is not performed.

Temporary reference frames are set from the reference frame candidates, and each set of reference frames that satisfy expression (1) or (2) in the second embodiment is selected. If any set of all the reference frame candidates does not satisfy either expression (1) or (2), a set having the minimum number of pixels in $O_i \cap O_j$ may be selected.

Reference frame candidates are preferably combined to select frames that minimize motion vector detection errors in canceling the motion of the background. More specifically, if there are reference frame sets that satisfy expression (1) or (2), for example, a set that exhibits a smaller motion vector detection error in canceling the motion of the background may be selected. If there is no multi-electron beam exposure motion, a frame on which an inter-frame difference can be satisfactorily detected is preferentially selected.

Assume that the object prediction precision is high, and part of the object is output without any change. In this case, a frame that satisfies the condition given by expression (1) or (2) is selected with respect to only a region where an object prediction result is not used as an extraction result.

The processing to be performed when two reference frames are selected will be described below.

When a reference frame is selected, the inter-frame difference between an extracted frame and the reference frame is obtained, and attention is paid to the inter-frame difference in the set figure.

The inter-frame difference is binarized with a set threshold value. The threshold value used for binarization may be constant with respect to a picture, may be changed in units of frames in accordance with the precision of background motion compensation. For example, if the precision of background motion compensation is low, since many unnecessary deviations are produced in the background, the threshold value for binarization is increased. Alternatively, this threshold value may be changed in accordance with the partial luminance gradient or texture of an object or edge intensity. For example, the threshold value for binarization is decreased for a relatively flat region, e.g., a region where the luminance gradient is small or a region wherein the edge intensity is low. In addition, the user may set a threshold value in consideration of the properties of an object.

Any pixel that is located outside the object tracking figure and has a difference value corresponding to an adjacent background region is determined as a background pixel. At the same time, any pixel that is located inside the object tracking figure and has not a difference value corresponding to an adjacent background region is determined as a pixel other than a background pixel.

No inter-frame difference can be detected in a still region of an object. If, therefore, the inter-frame difference with respect to a frame used for prediction is zero, and the pixel of interest is located inside the object on the frame used for prediction, the pixel is determined as a still region pixel but is not added as a background pixel.

This background pixel corresponds to a background region common to the current frame and one reference frame. At this time, since the boundary between the background region and the remaining portions may become unnatural, the video signal may be filtered to smooth the boundary or eliminate unnecessary noise regions.

When background regions common to the respective reference frames are obtained, a region that is not contained in the two common background regions is detected and extracted as an object region. This result is output for a portion that does not use the object shape predicted in advance to extract the overall object shape. If there is no matching between the portion using the shape obtained from the common backgrounds and the portion using the predicted object shape, filtering can make the output result look nice.

Finally, the extraction sequence is rearranged into the input frame sequence, and the extraction object region is output.

Figure 26:
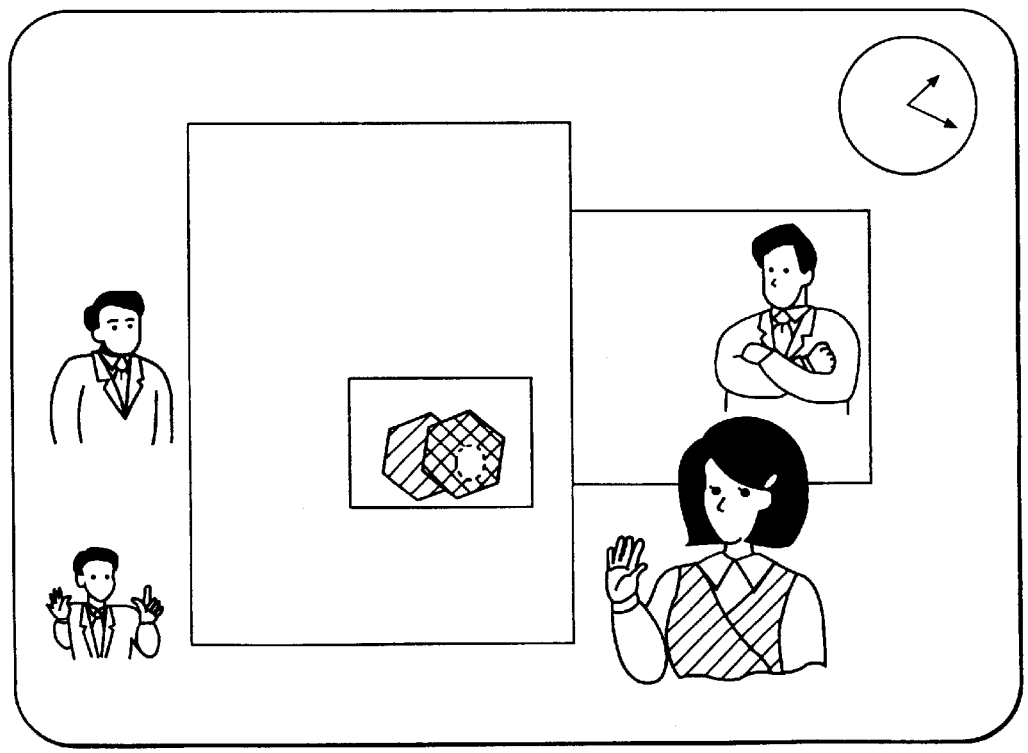
FIG. 26 is a view showing an application of the object tracking/extracting apparatus for moving picture according to the third embodiment.

The object shape extraction method and apparatus of the present invention can be used as an input means for object coding in MPEG-4 that has almost been standardized. For example, this MPEG-4 and object extraction technique are applied to a display system for displaying an object shape in the form of a window. Such a display system can be effectively applied to a multipoint conference system. Space savings can be achieved by displaying each person in the form of a person as shown in FIG. 26 rather than by displaying a text material and the person who is taking part in the conference at each point on a display with a limited size using rectangular windows. With the function of MPEG-4, only the person who is speaking can be enlarged and displayed, or the persons who are not speaking can be made translucent, thus making the user feel nice in using the system.

According to the third embodiment of the present invention, unnecessary processing can be omitted and stable extraction precision can be obtained by selecting an object using a method and apparatus in accordance with the properties of a picture. In addition, by removing the limitation associated with a temporal sequence, sufficient extraction precision can be obtained regardless of the motion of an object.

The third embodiment is designed to improve the performance of the first and second embodiments, and each of the arrangements of the first and second embodiments can be properly combined with the arrangement of the third embodiment.

Figure 27:
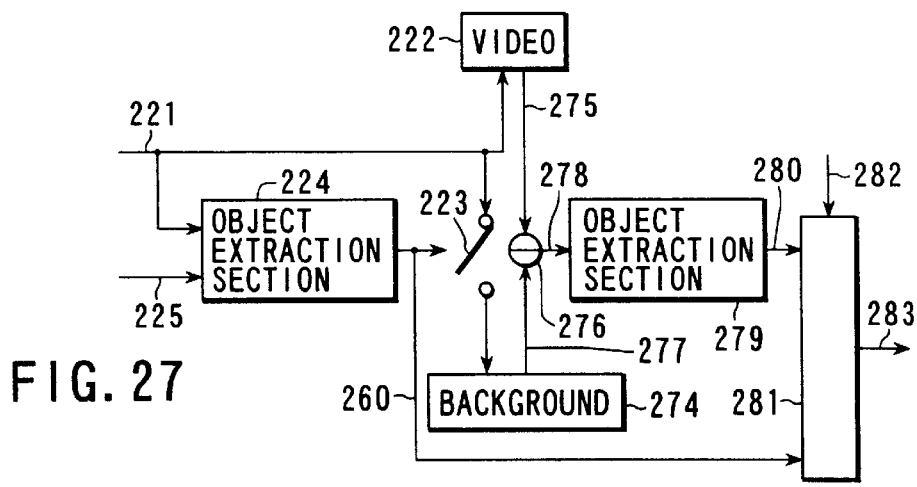
FIG. 27 is a block diagram showing an object extraction apparatus according to the fourth embodiment of the present invention.

FIG. 27 shows the first example of the arrangement of an object extraction apparatus according to the fourth embodiment of the present invention.

A texture picture 221 sensed by an external camera or read out from a storage medium such as a video disk and input to this object extraction apparatus is input to a recorder unit 222, a switching section 223, and an object extraction circuit 224 using motion compensation. The recorder unit 222 holds the input texture picture 221. For example, the recorder unit 222 is a hard disk or photomagnetic disk used for a personal computer. The recorder unit 222 is required to use the texture picture 221 again afterward. If the texture picture 221 is recorded on an external storage medium, the recorder unit 222 need not be prepared, and the storage medium is used as the recorder unit 222. In this case, the texture picture 221 need not be input again to the recorder unit 222. A texture picture is generally called a video signal, which is formed by arranging pixels having luminances (Y) expressed as the values "0" to "255" in the raster order (from the upper left pixel of the picture to the right, and from the uppermost line to the lowermost line). This picture is called a texture picture to be discriminated from a shape picture (to be described later). For a texture picture, color differences (U, V, and the like) or colors (R, G, B, and the like) may be used instead of luminances.

On the first frame, a shape picture 225 on which a desired object to be extracted has been independently extracted by the user is input to the object extraction circuit 224 based on motion compensation. The shape picture is generated by arranging pixels in the raster order as in the case of a texture picture, with the pixel value of each pixel belonging to the object being expressed as "255" and the picture value of each of the remaining pixels being expressed as "0".

An embodiment in which a shape picture 25 on the first frame is generated will be described in detail below with reference to FIG. 34.

Assume that there are graphic figures in the background and foreground, and the operator wants to extract an object 226 in the form of a house. The operator traces a contour of the object 226, with a mouse or pen, on a picture 227 displayed on a monitor. A shape picture is obtained by substituting "255" for each pixel inside the contour and "0" for each pixel outside the contour. If the operator draws this scontour with great care, the precision of this shape picture becomes high. Even if this precision becomes low to some degree, the precision can be increased by applying a method described in Takashi Ida and Yoko Sambonsugi, "SELF-AFFINE MAPPING SYSTEM FOR OBJECT CONTOUR EXTRACTION (SUMMARY)", Research and Development Center, Toshiba corporation.

FIG. 35 shows a line 228 drawn by the operator and a contour 229 of the object 226. Obviously, in this stage, the correct position of the contour 229 has not been extracted yet, but the contour 229 is shown to indicate the positional relationship with the line 228.

Figure 36:
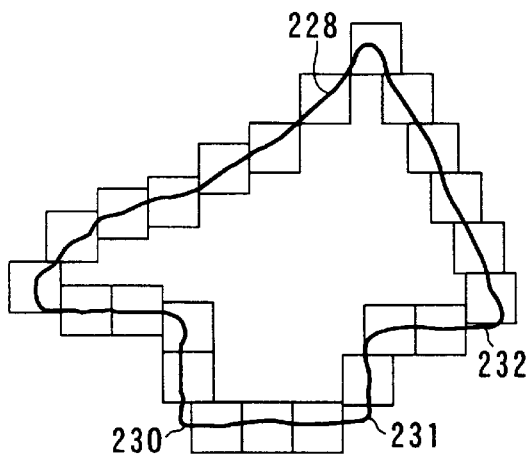
FIG. 36 is a view showing the state of block setting (first scanning) used in the fourth embodiment.
Figure 37:
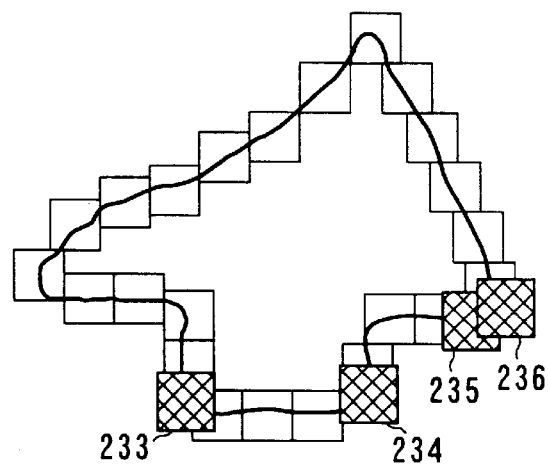
FIG. 37 is a view showing the state of block setting (second scanning) used in the fourth embodiment.

First of all, a block is allocated to contain the line 228. More specifically, when the frame is scanned in the raster order, and the line 228 is detected, i.e., the difference between a pixel value in the shape picture defined by the line 228 and an adjacent pixel value is detected, a block having a predetermined size is set around the corresponding pixel. In this case, if the current block overlaps an already set block, scanning is continued without setting the current block. As a result, blocks can be set such that the respective blocks touch each other without overlapping, as shown in FIG. 36. With this operation alone, portions 230, 231, and 232 are not contained in blocks. For this reason, scanning is performed again to detect contour portions that are not contained in blocks. If such a portion is detected, a block is set around the corresponding pixel. In the second scanning operation, however, even if the current block overlaps an already set block, the current block is set as long as the pixel serving as the center is not contained in the already set block. Referring to FIG. 37, blocks 233, 234, 235, and 236 indicated by the crosshatching are the blocks set by the second scanning operation. The block size may be fixed. However, if the number of pixels surrounded by the line 228 is large, a large block size may be set, and vice versa. In addition, if the line 228 has few irregular portions, a large block size may be set, and vice versa. Alternatively, a large block size may be set for a picture having a flat graphic figure, and a small block size may be set for a picture having fine graphic figure.

When a block is set at an end of a screen, the block may protrude from the screen. In this case, an end of only this block is cut to form a rectangular block to prevent it from protruding the screen. In this case, a similar block is also set in the form of a rectangle.

The above method is a method of setting blocks on a shape picture.

Figure 39:
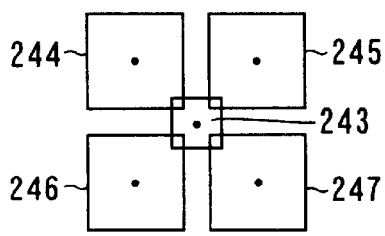
FIG. 39 is a view for explaining a search range of similar blocks used in the fourth embodiment.
Figure 40:
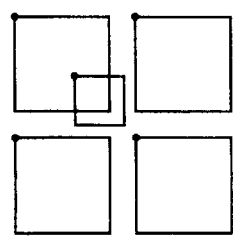
FIG. 40 is a view for explaining another search range of similar blocks used in the fourth embodiment.

Subsequently, similar blocks are searched out in units of blocks by using the texture picture. In this case, it is defined that given blocks having different block sizes are similar when one of the blocks is enlarged or reduced to have the same block size as that of the other block, the number of pixels of one block becomes almost equal to that of the corresponding pixels of the other block. For example, a block 238 has a texture picture similar in shape to that of a block 237 in FIG. 38. Likewise, a block 240 is similar to a block 239, and a block 242 is similar to a block 241. In this embodiment, a similar block is set to be larger than a block set on the contour. In searching for similar blocks, it suffices if a search is performed within a given range having four corners defined by blocks 244, 245, 246, and 247 near a block 243, as shown in FIG. 39, instead of the entire screen. FIG. 39 shows a case wherein the centers of the respective blocks are set as start points, and the start points of the blocks 244, 245, 246, and 247 are moved by a predetermined pixel width in all directions with respect to the start point of the block 243. FIG. 40 shows a case wherein a start point is set on the upper left corner of each block.

Any similar block that partly protrudes from a screen is excluded from search targets even if it is located in a search range. If a block is located at an end of a screen, all the similar blocks in a search range may be excluded from search targets. In this case, the search range is shifted to the inside of the screen for the block on the end of the screen.

Similar blocks can be searched out by a multi-step-search with a small computation amount. In this multi-step-search method, a search is performed to check errors first at discrete start points instead of searching the entire search range while shifting the start point in unit of pixels of half pixels. Then, start points only around a start point exhibiting a small error are shifted relatively finely to check errors. This operation is repeated to approach the position of the similar block.

In a search for a similar block, if the similar block is reduced every time, a long processing time is required. If, therefore, the entire picture is reduced in advance, and the resultant data is held in another memory, the above operation can be done by only reading out the data of a portion corresponding to the similar block from the memory.

Figure 38:
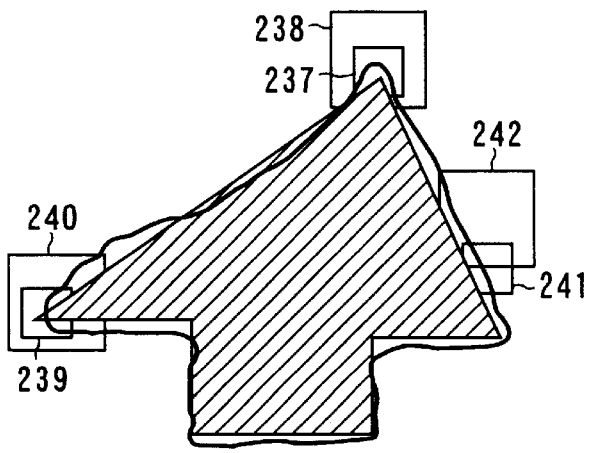
FIG. 38 is a view for explaining similar blocks used in the fourth embodiment.

FIG. 38 shows only the similar blocks for only the three blocks 237, 239, and 241. In practice, however, similar blocks are obtained for all the blocks shown in FIG. 37. The above description is about the method of searching for similar blocks. It should be noted that a search for similar blocks is performed by using a texture picture instead of a shape picture. Considering primary conversion of transferring a similar block to a block within a frame, the contour of the texture picture remains unchanged in this primary conversion.

A method of performing correction to match the contour of a shape picture with that of a texture picture by using the positional relationship between each block and a corresponding similar block will be described next.

Figure 41:
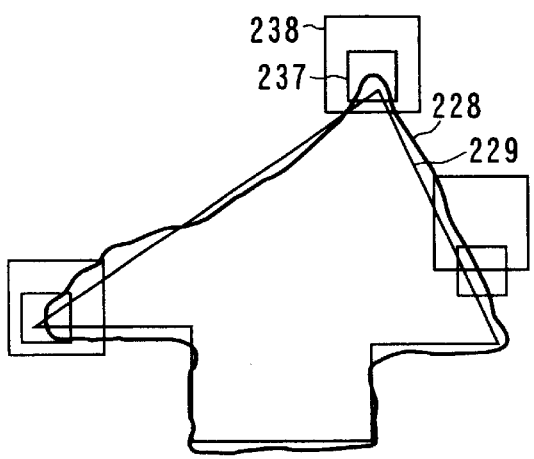
FIG. 41 is a view showing the state of a shape picture before replacement/conversion, which is used in the fourth embodiment.
Figure 42:
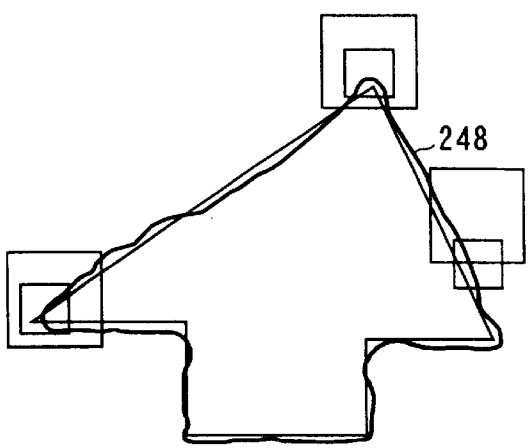
FIG. 42 is a view showing the state of shape picture after replacement/conversion, which is used in the fourth embodiment.
Figure 43:
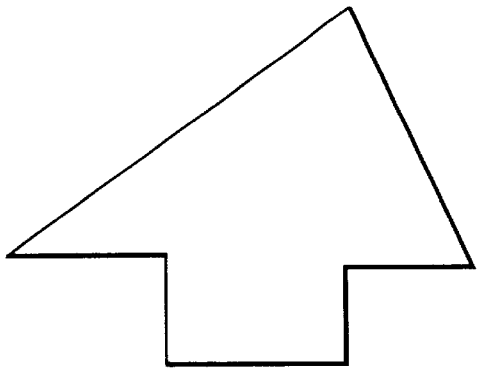
FIG. 43 is a view showing an extracted contour in the fourth embodiment.

Referring to FIG. 41, a contour 228 is the line drawn by the user. It suffices if this line is approximated to a correct contour 229. For this purpose, a portion of the shape picture which corresponds to a similar block 238 is read out, the portion is reduced to the same size as that of a block 237, thereby replacing the corresponding portion of the shape picture which corresponds to the block 237. Since this operation makes the contour approach an invariant set including the fixed point of primary conversion from the similar block to the block, the contour 228 approaches the contour 229. When one side of the similar block is twice as long as one side of the block, one replacing operation reduces the gap between the contour 228 and the correct contour 229 to almost ½. FIG. 42 shows a contour 248 obtained by performing this replacing operation once for all the blocks. If this block replacement is repeated, the contour 248 further approaches the correct contour. Eventually, as shown in FIG. 43, the contour 248 coincides with the correct contour. In practice, since there is no need to reduce the gap between the two contours to a value smaller than the distance between pixels, replacing operation is terminated after replacement is performed a certain number of times. This technique is effective when the contour of a texture picture is contained in a (N×N)-pixel block set on a shape picture. In this case, the maximum distance between the contour of the shape picture and that of the texture picture is about N/2. If the length of one side of a similar block is A times larger than that of one side of a corresponding block, the distance between the two contours is reduced to 1/A per replacement. Letting x be the number of times replacement is performed, a state wherein the distance becomes smaller than one pixel can be expressed as follows:

$$(N/2) \times (1/A)^x < 1$$

where ^ represents the power, i.e., (1/A) is multiplied by x times. From the above inequality, $$x \log (2/N)/\log(1/A)$$

If, for example, N=8 and A=2

$$x > 2$$

It therefore suffices if replacement is performed three times.

Figure 30:
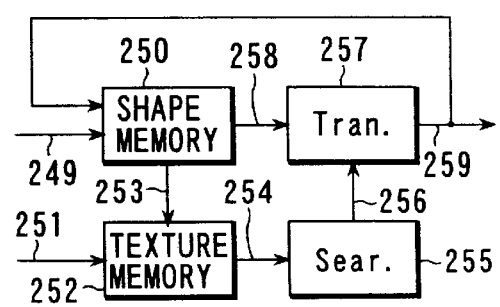
FIG. 30 is a block diagram showing an example of the arrangement of an object extraction section based on reduced block matching which is applied to the object extraction apparatus according to the fourth embodiment.

FIG. 30 is a block diagram showing this object extraction apparatus. First of all, a shape picture 249 input by the operator is recorded on a shape memory 250. In the shape memory 250, blocks are set in the manner described with reference to FIGS. 36 and 37. Meanwhile a texture picture 251 is recorded on a texture memory 252. The texture memory 252 sends a texture picture 254 of a block to a search circuit 255 upon referring to position information 253 of the block sent from the shape memory 250. At the same time, similar block candidates are also sent from the texture memory 252 to the search circuit 255, as described with reference to FIGS. 39 and 40. The search circuit 255 reduces each similar block candidate, calculates the error between each candidate and the corresponding block, and determines a candidate exhibiting the minimum error as a similar block. An example of this error is the absolute value sum of luminance value deviations or the value obtained by adding the absolute value sum of color difference deviations thereto. If color differences are also used, the precision can be increased as compared with a case wherein only luminances are used, even though the computation amount increases. This is because, even if the luminance difference is small at the contour of an object, a similar block can be properly determined when the color difference is large. Information 256 about the position of the similar block is sent to a reduction conversion circuit 257. A shape picture 258 on the similar block is also sent from the shape memory 250 to the reduction conversion circuit 257. The reduction conversion circuit 257 reduces the shape picture of the similar block. The reduced similar block is sent back to the shape memory 250 as a shape picture 259 whose contour has been corrected. The shape picture of the corresponding block is then overwritten. When this replacement in the shape memory 250 is performed a predetermined number of times, the corrected shape picture 259 is output to an external unit. The contents of the shape memory 250 may be overwritten in units of blocks. Alternatively, memories corresponding to two frames may be prepared. After the shape picture on the entire frame is copied from one memory to the other memory, the respective blocks on the contour portion may be replaced with the blocks obtained by reducing similar blocks.

This object extraction method will be described with reference to the flow chart of FIG. 48.

(Object Extraction Method Based On Matching of Reduced Blocks in Frames)

In step S31, blocks are set on the contour portion of shape data. In step S32, a similar block having picture data representing a graphic figure that is similar to that of the currently processed block is detected from the same picture data. In step S33, the shape data of the currently processed block is replaced with the data obtained by reducing the shape data of the similar block.

If it is determined in step S34 that the number of processed blocks reaches a predetermined number, the flow advances to step S35. Otherwise. the flow returns to step S32 upon setting the next block as a processing target.

If it is determined in step S35 that the number of times of replacement reaches a predetermined number of times, the flow advances to step S36. Otherwise, the flow returns to step S31 upon setting replaced shaped data as a processing target. In step S36, the shape data having undergone repetitive replacement is output as an object region.

This method is effective when an edge of a block matches with an edge of a similar block. If, therefore, a block has a plurality of edges, the edges do not properly match with each other in some case. Such a block is not replaced, and the input edges are held with any change. More specifically, the shape picture of each block is scanned horizontally and vertically in units of lines. Any block that has at least a predetermined number of lines each having two or more points at each of which a change from "0" to "255" or from "255" to "0" occurs is not replaced. In addition, even on the boundary between an object and a background, the luminance or the like may be uniform depending on the portion. In such a case as well, since no edge correction effect can be expected, any block in which the dispersion value of the texture picture is equal to or smaller than a predetermined value is not replaced, and the input edge is held without being changed.

If the error between a similar block and a corresponding block cannot be reduced to a predetermined value, an attempt to reduce the block may be abandoned, and the similar block may be obtained without any change in size. In this case, a similar block should be selected while the chance of overlapping of blocks is minimized. Although no edge correction effect can be expected from only blocks that are not reduced, when the edges of reduced blocks, whose edges have been corrected by reduction, are copied, the edges of even the blocks that have not been reduced can be indirectly corrected.

Figure 48:
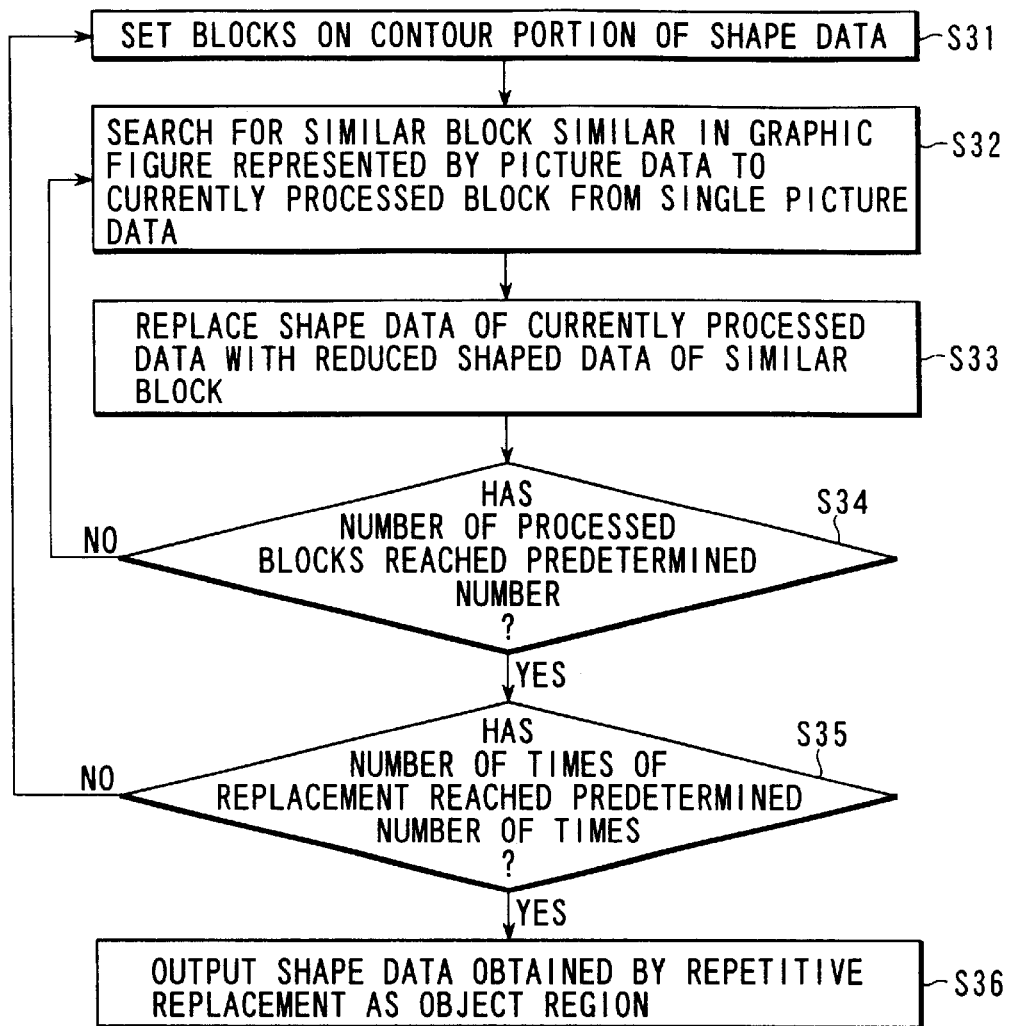
FIG. 48 is a flow chart showing an object extraction method using reduced block matching within frames in the fourth embodiment.

The flow chart of FIG. 48 shows the case wherein a shape picture is replaced immediately after a similar block is detected. A method of searching all blocks for similar blocks, and replacing a shape picture in all the blocks by holding the position information about the similar blocks of all the blocks will be described with reference to the flow chart of FIG. 50.

In this case, shape picture replacement can be repeated a plurality of number of times per search for similar blocks.

In step S41, blocks are set on the contour portion of shape data. In step S42, a similar block having picture data representing a graphic figure that is similar to that of the currently processed block is detected from the same picture data. If it is determined in step S43 that the similar block search processing is complete for all the blocks, i.e., the number of processed blocks reaches a predetermined number, the flow advances to step S44. Otherwise, the flow returns to step S42. In step S44, the shape data of the currently processed data is replaced with the data obtained by reducing the shape data of the similar block.

If it is determined in step S45 that replacement processing is complete for all the blocks, i.e., the number of processed blocks reaches a predetermined number, the flow advances to step S46. Otherwise, the flow returns to step S44. If it is determined in step S46 that the number of times all the blocks are replaced reaches a predetermined number of times, the flow advances to step S47. Otherwise, the flow returns to step S44. In step S47, the shape data obtained by repeating replacement/conversion is output as an object region.

A block setting method that can increase the edge correction precision will be described next.

Figure 51:
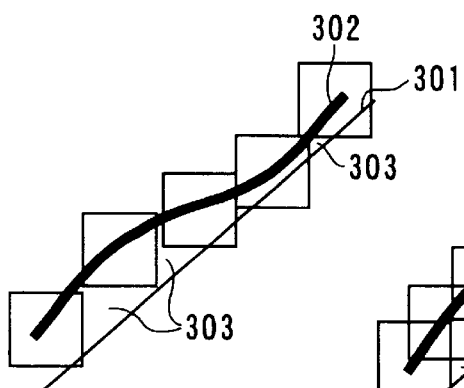
FIG. 51 is a view showing an example of block setting.
Figure 52:
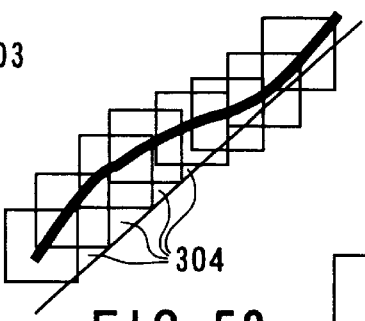
FIG. 52 is a view showing another example of block setting.

As described above, in the method of setting blocks around the contour of a shape picture, a portion of a correct contour 301 may not be contained in any block, as shown in FIG. 51. In this case, a contour 302 of the shape picture is indicated by the thick line. Assume that an object is located on the lower right side of the contour, and a background is located on the upper left side of the contour. In this case, although a portion 303 that belongs to the background is erroneously set as an object portion, there is no possibility that the portion 303 be corrected, because it is not contained in any block. As described above, if there is a gap between a block and a correct contour, the corresponding portion cannot be properly corrected.

To reduce the gap between a block and a correct contour, a method of overlapping blocks to some extent may be used. In this method, since the number of blocks increases, a gap 304 decreases even though the computation amount increases. The extraction precision therefore increases. In this case, however, the gap is not completely eliminated.

Figure 53:
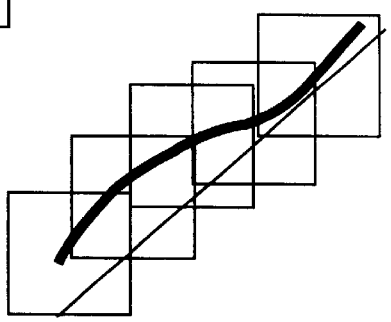
FIG. 53 is a view showing still another example of block setting.

The gap can also be reduced effectively by increasing the block size, as shown in FIG. 53. In this case, the above method of overlapping blocks is also used. In this case, the gap is completely eliminated by this method.

As described above, the contour correction range can be effectively increased by increasing the block size. If, however, the block size is excessively large, the shape of a contour contained in blocks is complicated, resulting in difficulty in detecting similar blocks. Such a case is shown in FIGS. 54A to 54D.

Figure 54A:
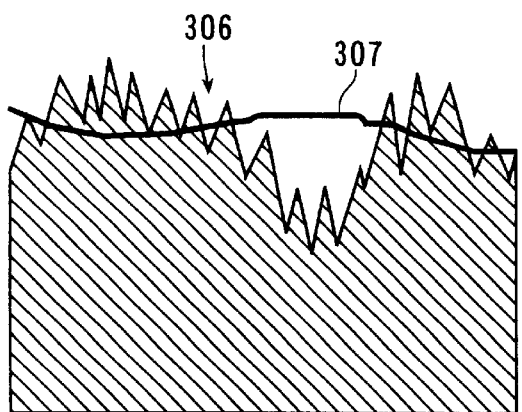
FIGS. 54A to 54D are views showing the process of searching for the contour of an object region.
Figure 54B:
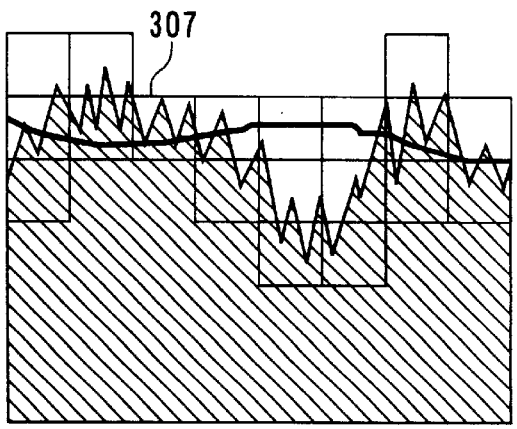
Figure 54C:
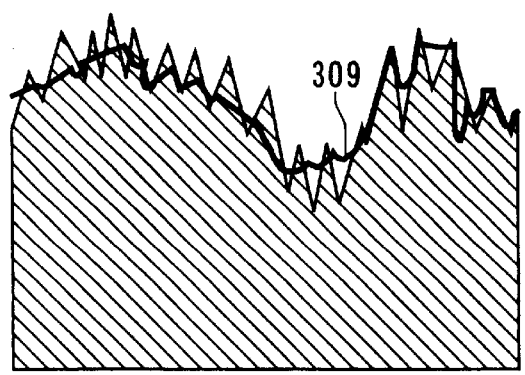

Referring to FIG. 54A, a hatched portion 305 represents an object region, and a white portion 306 represents a background region. A contour 307 of an input shape picture is indicated by the black line. As shown in FIG. 54A, the contour 307 of the shape picture is greatly away from the correct contour, and the correct contour has irregular portions. In contrast to this, FIG. 54B shows the result obtained by arranging blocks by a method different from that described above. In this case, the picture is segmented into rectangular blocks such that the respective blocks do not overlap each other and produce no gap. The dispersion values in the texture picture are calculated in units of blocks. Any block that exhibits a dispersion value smaller than a predetermined value is canceled. In the case shown in FIG. 54B, therefore, only blocks exhibiting dispersion values larger than the predetermined value are left. A similar blocks is obtained for each of these blocks. For example, near a block 308, there is no graphic figure that is twice as large in the vertical and horizontal directions as the block 308. This applies to many other blocks. Even if, therefore, a portion exhibiting the minimum error is selected as a similar block, and the shape picture is repeatedly replaced/converted by using the positional relationship with the selected block, the resultant contour does not match with the correct contour, as shown in FIG. 54C. However, as compared with the contour 307 of the shape picture in FIG. 54A, the irregular portions of the contour of the texture picture is approximately reflected in a contour 309 of the shape picture in FIG. 54C after edge correction (to the extent that a valley is formed between left and right peaks). In this case, if the block size is decreased, even this approximate correction cannot be attained.

Figure 54D:
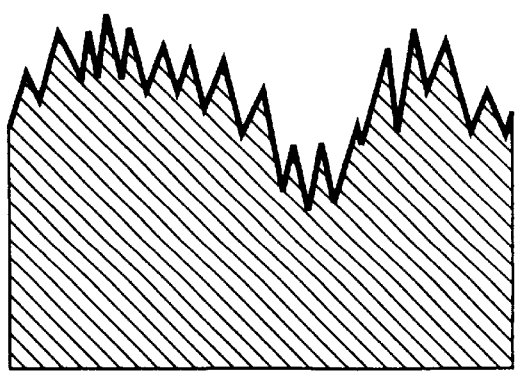

As described above, if a large block size is set to extend the correction range, the shape of a contour contained in blocks is complicated, resulting in difficult in detecting similar blocks. Consequently, only approximate edge correction can be performed. In such a case, edge correction is performed first with a large block size, and then edge correction performed upon decreasing the block size in accordance with the correction result. This operation can increase the correction precision. FIG. 54D shows the result obtained by performing correction upon reducing the block size to ½ that in FIG. 54C in the vertical and horizontal directions, and further performing correction upon reducing the block size to ¼.If correction is repeated while the block size is gradually decreased in this manner, the correction precision can be increased.

Figure 55:
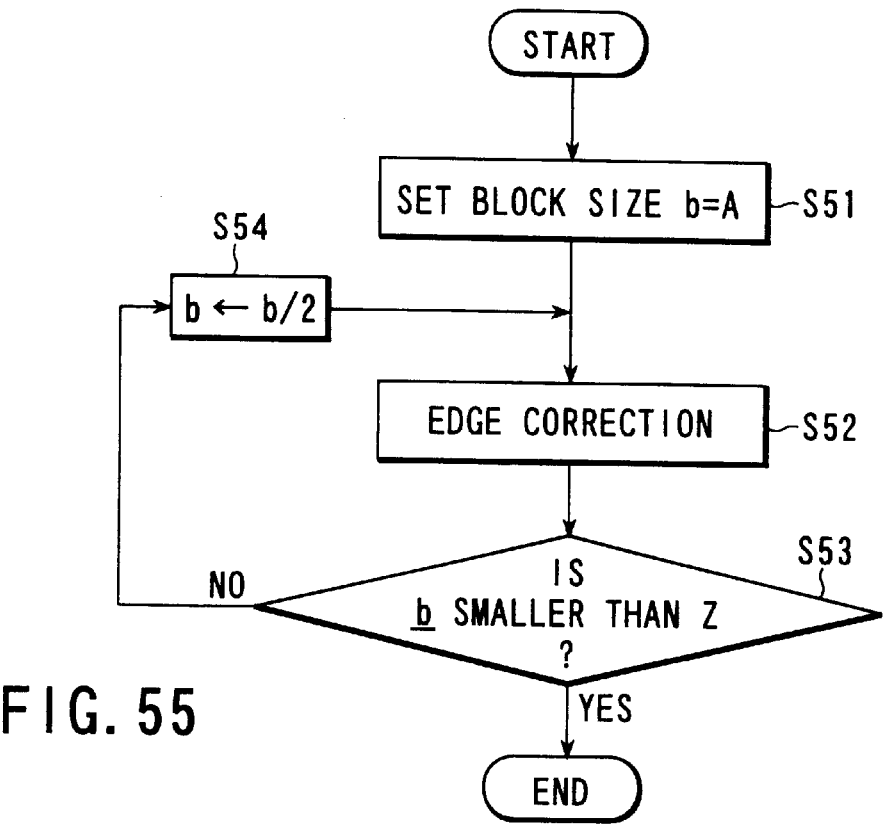
FIG. 55 is a flow chart for explaining a method of gradually reducing a block size.

A method of gradually decreasing the block size will be described with reference to the flow chart of FIG. 55.

Figure 50:
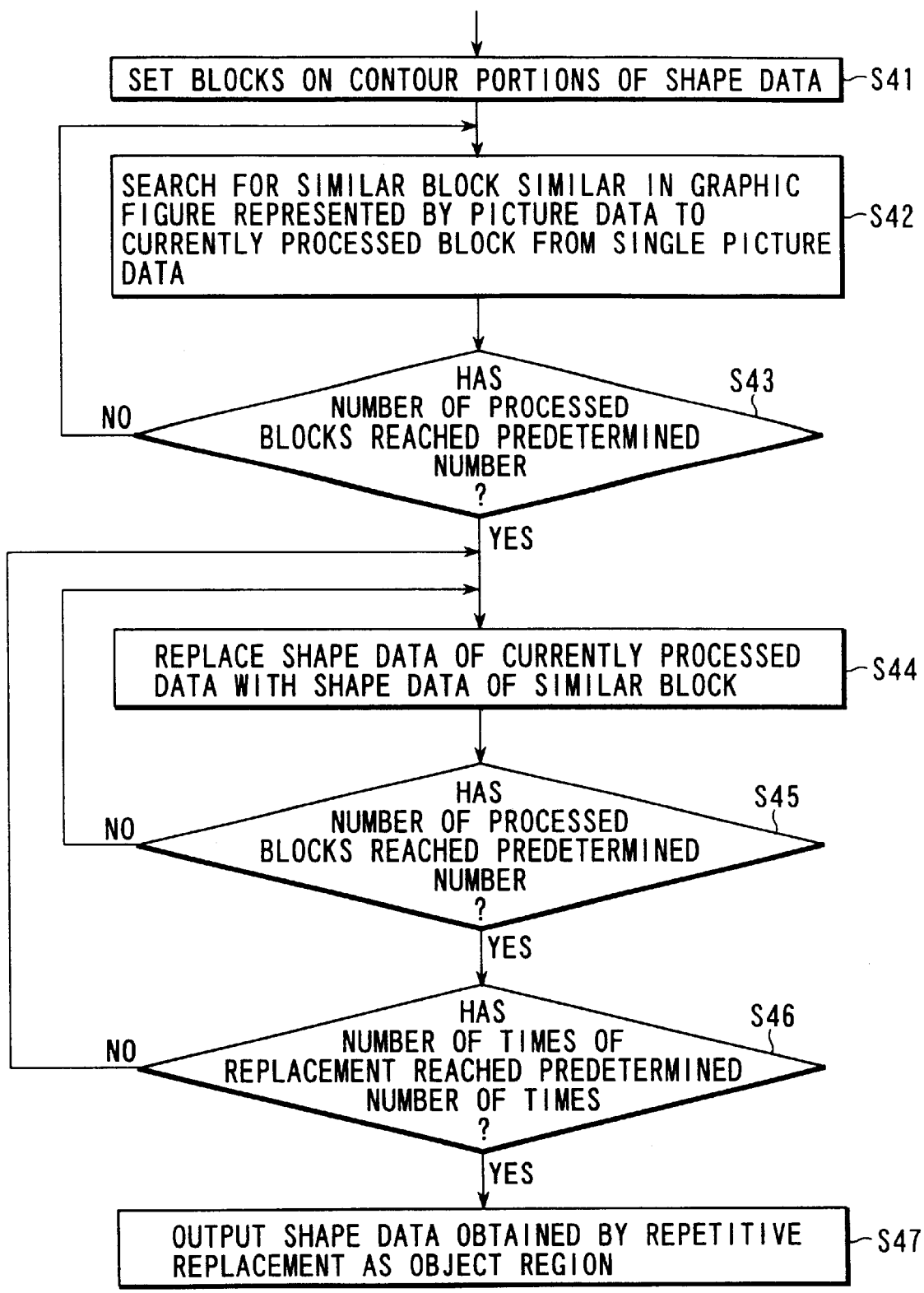
FIG. 50 is a flow chart for explaining edge correction.

In step S51, block size b=A is set. In step S52, edge correction similar to the edge correction shown in FIG. 48 or 50 is performed. In step S53, the block size b is checked. If the block size b becomes smaller than Z (<A), this processing is terminated. If the block size b is equal to or larger than Z, the flow advances to step S54. In step S54, the block size b is reduced to half, and the flow advances to step S52.

In the above case, a relatively large block size is set first, and correction is repeated while the block size is gradually decreased, thereby increasing the correction precision.

Figures 56, 57:
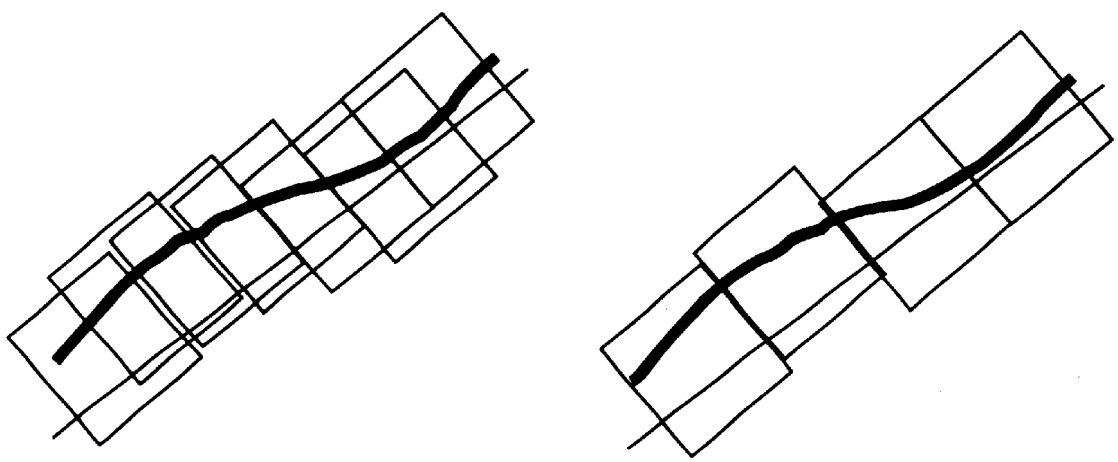
FIG. 56 is a view showing still another example of block setting.
FIG. 57 is a view showing still another example of block setting.

FIG. 56 shows a case wherein each block is tilted through 45° to hinder a gap from being formed between each block and a correct contour. As shown in FIG. 56, if the contour is inclined, the correct contour can be covered with the blocks by tilting the blocks without increasing the block size as much as in the case shown in FIG. 53. In this case, as shown in FIG. 56, the correct contour can be covered without any overlap between the blocks. By tilting sides of the blocks in the same direction as that of the contour of the shape picture in this manner, formation of gaps between the blocks and the correct contour can be suppressed. More specifically, when the inclination of the contour of an alpha picture is detected, and the contour is close to a horizontal or vertical line, the blocks are directed as shown in FIG. 53. Otherwise, the blocks are tilted as shown in FIG. 56. Whether the contour is close to a horizontal or vertical line is determined by comparing the inclination with a threshold value.

The above description is about object extraction processing for the first frame. This technique is not limited to the first frame of moving picture and can be generally used for still picture. If block setting and a search for similar blocks are performed after each replacement such that when first replacement is performed for a shape picture, block setting and a search for similar blocks are performed again, and second replacement is performed, a better correction effect can be obtained although the computation amount increases.

Since it is preferable that the similar blocks are selected from the portion adjacent thereto, the range in which the similar blocks are searched for had better be changed in accordance with the block size. In other words, when the block size is large, the block searching range is widened. When the block size is small, the block searching range is narrowed.

In the present method, small holes or independent small regions are appeared in the shaping data as errors in the replacement processing for the shaping data. Thus, if the small holes or independent small regions are deleted from the shaping data before the steps S34, S35, S36, S45, S46, S47, S53, the correction accuracy is improved. A method of deleting the small holes or independent small regions can use a process for combining expansion and reducing or a decision-by-majority filter, which is described in Takagi and Shimoda, "Image Analysis Handbook" Tokyo University Press, January 1991, pp. 575–576 and pp. 677.

Figure 49:
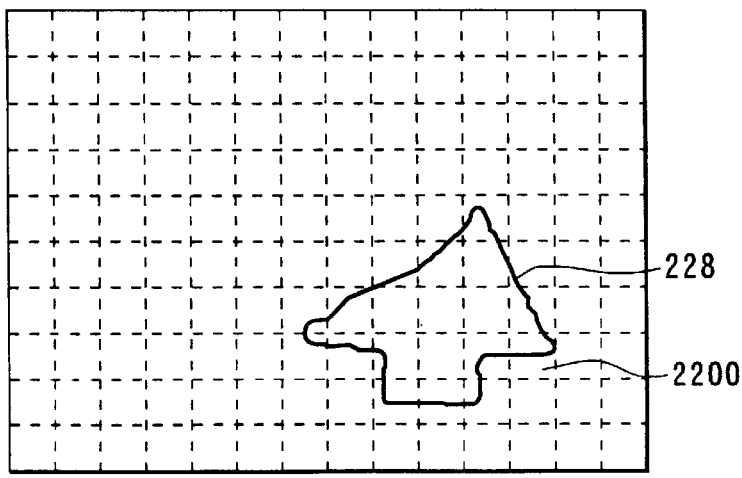
FIG. 49 is a view showing another example of block setting used in the fourth embodiment.

Alternatively, blocks may be set more easily, as shown in FIG. 49. That is, a frame is simply segmented into blocks, and a search for similar blocks and replacement processing are performed for only blocks containing a contour 228, e.g., a block 2200.

If an input texture picture has been compressed by fractal coding ("PICTURE REGION SEGMENTATION METHOD AND APPARATUS" in Jpn. Pat. Appln. KOKOKU Publication No. 08-329255), the compressed data contains information about similar blocks for the respective blocks. If, therefore, the compressed data is used for the similar blocks for the blocks containing the contour 228, there is no need to search for similar blocks.

The description of the object extraction apparatus for extracting an object from a picture will be continued by referring back to FIG. 27.

An object extraction circuit 242 based on motion compensation generates a shape picture 260 of each of the subsequent frames from the shape picture 25 of the first frame by using the motion vector detected from the texture picture 221.

Figure 29:
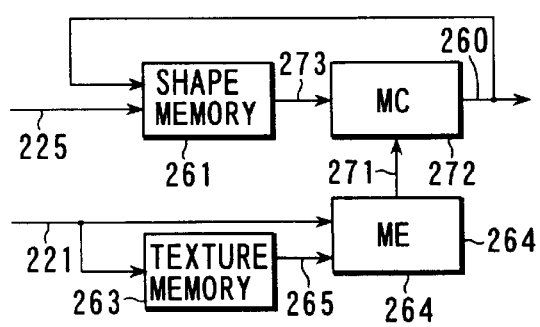
FIG. 29 is a block diagram showing an example of the arrangement of a motion compensation section applied to the object extraction apparatus according to the fourth embodiment.
Figure 45:
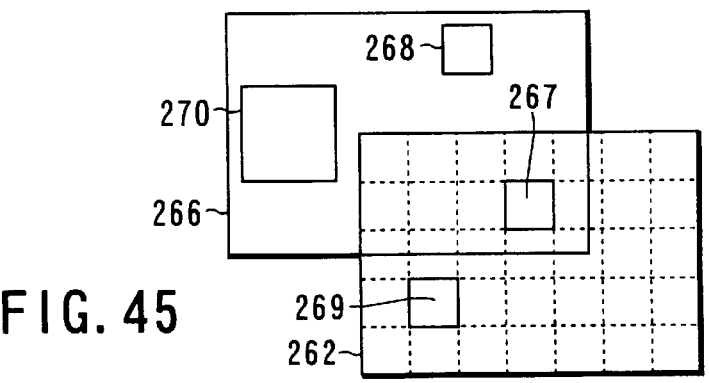
FIG. 45 is a view for explaining motion compensation used in the fourth embodiment.

FIG. 29 shows an example of the object extraction circuit 224 based on motion compensation. The shape picture 225 of the first frame is recorded on a shape memory 261. In the shape memory 261, blocks are set on the entire screen as in the case of a frame 262 in FIG. 45. The texture picture 221 is sent to a motion estimation circuit 264 and recorded on a texture memory 263. A texture picture 265 one frame ahead of the currently processed frame is sent to the motion estimation circuit 264. The motion estimation circuit 264 detects a reference block exhibiting the minimum error from a frame one frame ahead of the currently processed frame in units of the blocks of the currently processed frame. FIG. 45 shows an example of a block 267, and a reference block 268 selected from a frame 266 one frame ahead of the currently processed frame. In this case, if the error is smaller than a predetermined threshold value, the reference block is set to be larger than the corresponding block. FIG. 45 also shows an example of a reference block 70 twice as large in the vertical and horizontal directions as a block 269.

Referring back to FIG. 29, information 271 about the position of the reference block is sent to a motion compensation circuit 272. A shape picture 273 of the reference block is also sent from the shape memory 261 to the motion compensation circuit 272. In the motion compensation circuit 272, if the reference block is equal in size to the corresponding block, the shape picture of the reference block is kept unchanged. If the reference block is larger in size than the corresponding block, the shape picture of the reference block is reduced and output as the shape picture 260 of the currently processed frame. In addition, for the next frame, the shape picture 260 of the currently processed frame is sent to the shape memory 261, and the shape picture on the entire frame is overwritten.

If each reference block is larger than the corresponding block, and a contour deviates from the correct position, correction can be effectively performed, as described with reference to FIGS. 41 and 42. Therefore, objects can be accurately extracted from all the frames of the moving picture sequence, which follows the shape picture of the first input frame. The present invention therefore eliminates the conventional inconvenience of lacking precision in early frames of a moving picture sequence and when the motion of an object is small.

Figure 47:
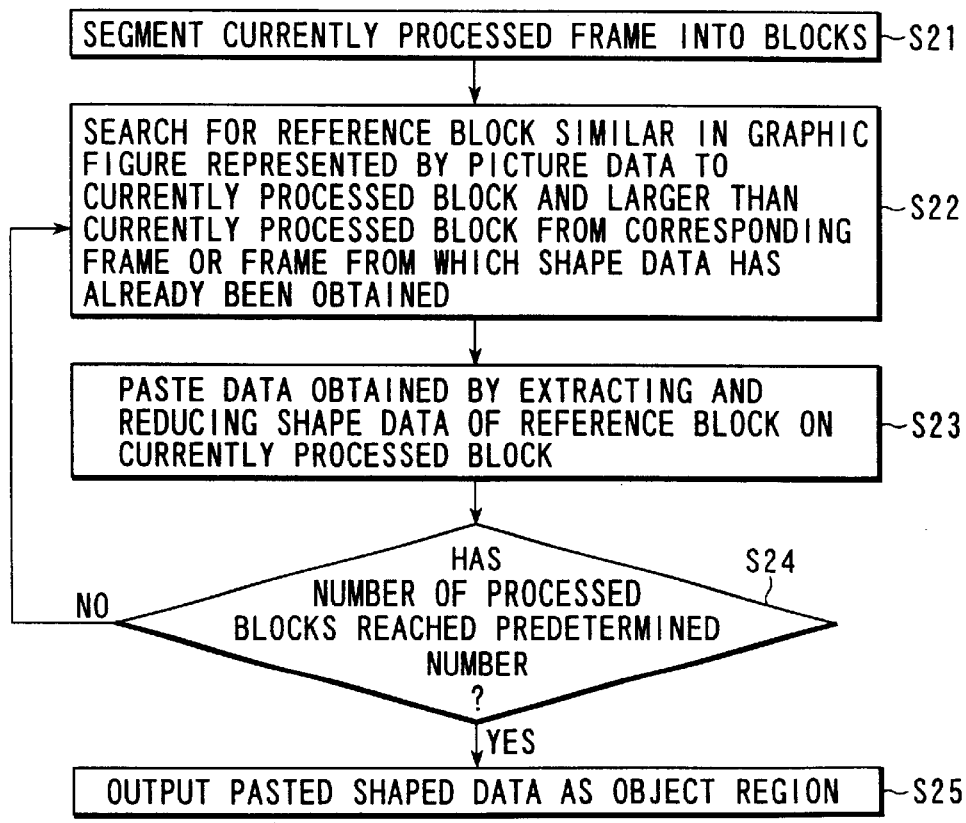
FIG. 47 is a flow chart showing an object extraction method based on motion compensation and used in the fourth embodiment.

Object extraction based on inter-frame motion compensation will be described with reference to FIG. 47.

In step S21, a currently processed frame is segmented into blocks. In step S22, a reference block that contains picture data representing a graphic figure similar to that of the currently processed block and has a size larger than that of the currently processed block is searched out from the respective frames or frames from which shape data have already been obtained. In step S23, the subblocks obtained by extracting shape data from the reference block and reducing the data is pasted on the currently processed block.

If it is determined in step S24 that the number of processed blocks reaches a predetermined number, the flow advances to step S25. Otherwise, the next block is set as a processing target, and the flow returns to step S22. In step S25, the pasted shape data is output as an object region.

In this embodiment, the respective frames are the first frames for which shape pictures are provided in advance. In addition, the reference block need not be a frame one frame ahead of the currently processed frame, and any frame from which a shape picture has already been obtained can be used, as described here.

The above description is about object extraction using motion compensation. The object extraction circuit 224 may use a method using inter-frame difference images as disclosed in "OBJECT TRACKING/EXTRACTING APPARATUS FOR MOVING PICTURE", Jpn. Pat. Appln. KOKAI Publication No. 10-001847 filed previously, as well as the method described above.

The description of the object extraction apparatus for extracting an object from moving picture according to this embodiment will be continued by referring back to FIG. 27.

The shape picture 260 is sent to a switching section 223 and a switching section 281. When the shape picture 260 is "0" (background), the switching section 223 sends the texture picture 221 to a background memory 274 to be recorded thereon. When the shape picture 260 is "255" (object), the texture picture 221 is not sent to the background memory 274. When this processing is performed for several frames, and the shape picture 260 is accurate to some degree, a picture that contains no object but contains only a background portion is generated in the background memory 274.

A texture picture 275 is sequentially read out again from the recorder unit 222, starting from the first frame, or only frames from which the object designated by the operator is to be extracted are read out and input to a difference value 276. At the same time, a background picture 277 is read out from the background memory 274 and input to the difference value 276. The difference value 276 obtains a difference value 278 between pixels of the texture picture 275 and background picture 277 which are located at the same positions within frames. The difference value 278 is then input to an object extraction circuit 279 using a background picture. The object extraction circuit 279 generates a shape picture 280. This picture is generated by regarding each pixel larger than the threshold value predetermined by the absolute value of the difference value 278 as a pixel belonging to the object to allocate the pixel value "255" to it, and regarding other pixels as pixels belonging to the background to allocate the pixel value "0" to each of them. If color difference and color are to be used for the texture picture as well as luminance, the sum of the absolute values of the deviations between the respective signals is compared with a threshold value to determine whether each pixel is an object or background pixel. Alternatively, a threshold value is determined for each luminance or color difference. If the absolute value of the difference between luminance or color difference values is larger than the threshold value, the corresponding pixel is determined as an object pixel. Otherwise, the corresponding pixel is determined as a background pixel. The shape picture 280 generated in this manner is sent to a switching section 281. In addition, a selection signal 282 determined by the operator is externally input to the switching section 281. The switching section 281 selects either the shape picture 260 or the shape picture 280 in accordance with this selection signal 282. The selected picture is output as a shape picture 283 to an external unit. The operator displays each of the shape pictures 260 and 280 on a display or the like, and selects the more accurate one. Alternatively, the processing time can be saved as follows. The operator displays the shape picture 260 when it is generated. If this picture does not have a satisfactory precision, the shape picture 280 is generated. If the shape picture 260 has a satisfactory precision, the operator outputs the shape picture 260 as the shape picture 283 to the external unit without generating the shape picture 280. Selection may be performed in units of frames or moving picture sequences.

Figure 46:
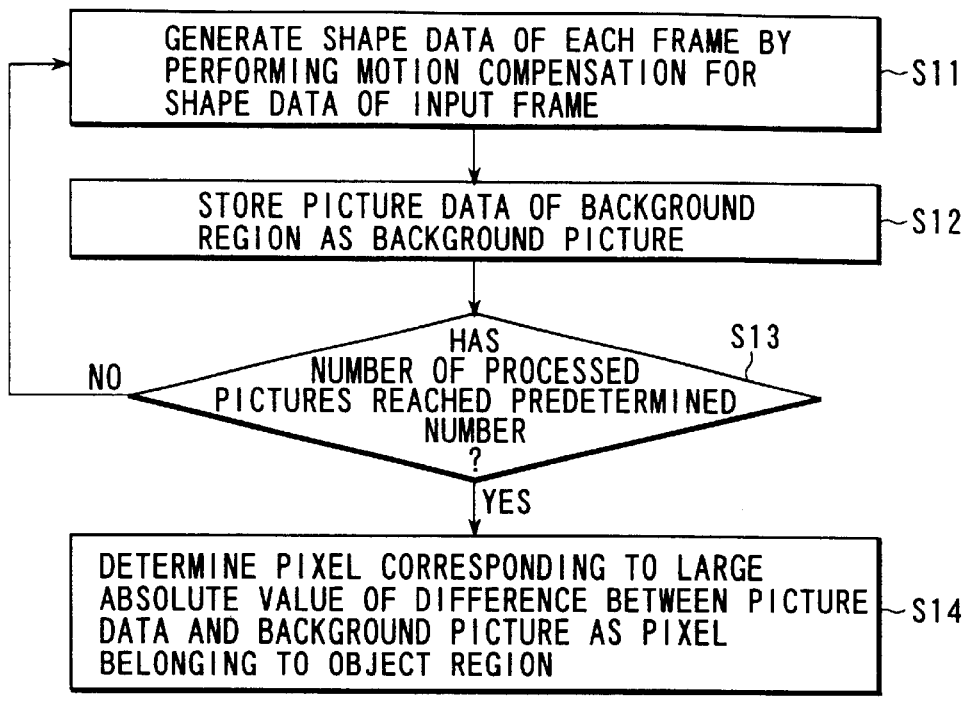
FIG. 46 is a flow chart showing an object extraction method using a background picture and used in the fourth embodiment.

An object extraction method corresponding to the object extraction apparatus in FIG. 27 will be described with reference to the flow chart of FIG. 46.

(Object Extraction Method Using Background Picture)

In step S11, motion compensation is performed for the shape data on each input frame to generate shape data on each frame. In step S12, the picture data of the background region determined by the shaped data is stored as a background picture in the memory.

If it is determined in step S13 that the number of processed frames reaches a predetermined number, the flow advances to step S14. Otherwise, the next frame is set as a processing target, and the flow returns to step S11. In step S14, each pixel where the absolute value of the difference between the picture data and the background picture is large is determined as a pixel belonging to the object region, and other pixels are determined as pixels belonging to the background region.

In this embodiment, when, for example, the camera used for image sensing moves, the background moves. In this case, the motion of the overall background (global motion vector) is detected from a previous frame. In the first scanning, the background is shifted from the previous frame by the global motion vector and stored in the background memory. In the second scanning, the portion shifted from the previous frame by the global motion vector is read out from the background memory. If the global motion vector detected in the first scanning is recorded on the memory, and is read out in the second scanning, the time required to obtain the global motion vector can be saved. In addition, if, for example, the camera is fixed, and it is known in advance that the background is still, the operator operates the switch to inhibit the detection of a global motion vector so as to keep the global motion vector zero. This can further save the processing time. When a global motion vector is to be obtained with a precision of half pixel, the pixel density of a picture input to the background memory is doubled in the vertical and horizontal directions. That is, the pixel values of an input picture are alternately written in the background memory. If, for example, the background moves by 0.5 pixel in the horizontal direction on the next frame, the pixel values are alternately written between the previously written pixels. With this operation, at the end of the first scanning, some pixels may not be written even once in the background picture. In this case, the corresponding gaps are filled with pixels interpolated from neighboring pixels that have been written.

No pixel value is recorded on the background memory to substitute for a portion that is not written even once as a background region portion throughout the moving picture sequence even at the end of the first scanning regardless of whether a half-pixel motion vector is used or not. In the second scanning, such an undefined portion is always determined as an object portion. For this operation, the operator need not prepare a memory for storing an undefined portion and determine whether a given portion is undefined or not. Instead of this, the background memory may be initialized first with a pixel value (Y, U, V)=(0, 0, 0) that is expected to rarely appear in the background, and then the first scanning may be started. Since this initial pixel value is left in an undefined pixel, the pixel is automatically determined as an object pixel in the second scanning.

According to the above description, a background picture is to be generated in the background memory, even a pixel for which a background pixel value has already been substituted is overwritten with a pixel value as long as it belongs to the background region. In this case, the pixel values of the background in the late period of the moving picture sequence are recorded on the background memory in correspondence with every background portion regardless of whether it corresponds to the early or late period of the moving picture sequence. If the pixel values of the background in the early period of the moving picture sequence are completely the same as those in the late period, no problem arises. If, however, the camera moves very slowly or the brightness of the background gradually changes, and the pixel values slightly vary among frames, the pixel values of the background in the early period of the moving picture sequence greatly differ from those in the late period. If, therefore, this background memory is used, even a background portion is erroneously detected as an object portion in early frames of the moving picture sequence. For this reason, only the pixels that have not been defined even once as pixels belonging to the background region in the previous frames and are defined as pixels belonging to the background region for the first time in the currently processed frame are written in the background memory, and the pixels for which background pixel values have already been substituted are not overwritten. With this operation, since the pixel values of the background in the early period of the moving picture sequence are recorded on the background memory, an object can be properly extracted. When the background region of the currently processed frame is overwritten in the background memory in the second scanning in accordance with the object extraction result, the background of the currently processed process and the background of the frame immediately preceding the currently processed frame, which exhibit a high correlation, are compared with each other, thereby suppressing erroneous detection of the corresponding portion as an object portion. Overwriting in the second scanning is effective when the background slightly varies. If, therefore, the operator operates a switch to indicate that there is no background motion, overwriting is not performed. This switch may be commonly used as a switch for choosing between detecting a global motion vector or not detecting it.

Since the first scanning is performed to generate a background picture, all the frames need not necessarily used. Even if skipping is performed every one or two frames, almost the same background picture can be obtained, and the processing time can be shortened.

If only the pixels, of the pixels belonging to the background region, which exhibit inter-frame differences equal to or smaller than a threshold value are recorded on the background memory, it prevents other objects entering the screen from being recorded on the background memory. If the object region detected is erroneously detected at a position closer to the object side than the actual position in the first scanning, the corresponding pixel values of the object are recorded on the background memory. For this reason, even pixels belonging to the background region are not input to the background memory if the pixels are located near the object region.

When only a background picture from which a person and the like belonging to a foreground are removed is required as in a picture photographed in a sightseeing area, the background picture recorded on the background memory is output to the external device.

The above description is about the first example of the arrangement of this embodiment. According to this example, a high extraction precision can be obtained not only in the late period of a moving picture sequence but also in the early period of the moving picture sequence. In addition, an object can be properly extracted even if the object moves little or does not move.

Figure 28:
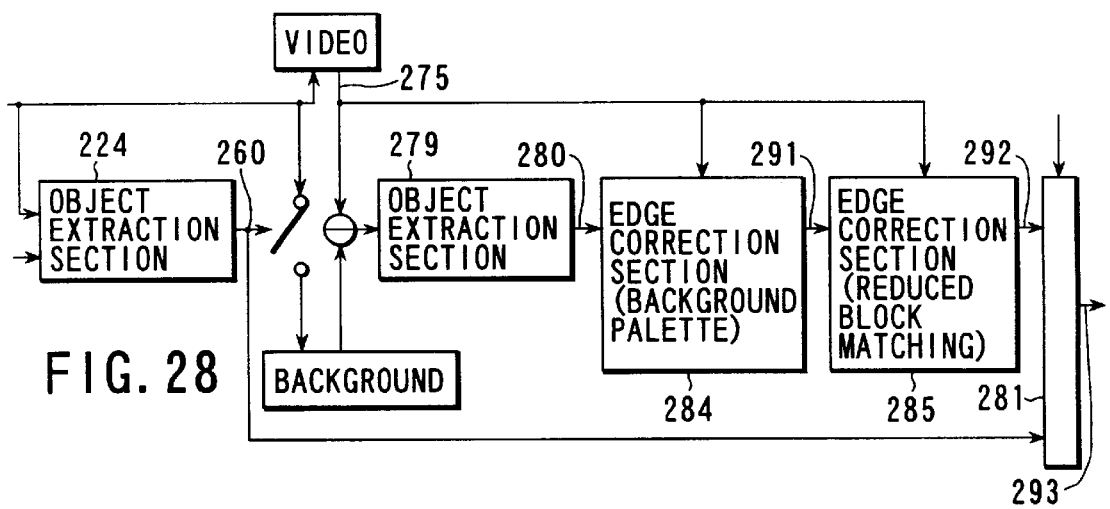
FIG. 28 is a block diagram showing an example of the arrangement of the object extraction apparatus according to the fourth embodiment to which edge correction processing is applied.

An example of how the generated shape picture 280 is corrected will be described next with reference to FIG. 28. Since this processing is the same as that described with reference to FIG. 27 up to the step of generating the shape picture 280, a description of the processing up to this step will be omitted.

The shape picture 280 is input to an edge correction circuit 284 using a background palette. In addition, the texture picture 275 is input to the edge correction circuit 284 using the background palette and an edge correction circuit 285 using reduced block matching. FIG. 31 is a block diagram showing the detailed arrangement of the edge correction circuit 284.

Referring to FIG. 31, the shape picture 280 is input to a correction circuit 286, and the texture picture 275 of the same frame is input to a comparator circuit 287. A background color 289 is read out from a memory 288 holding the background palette and input to the comparator circuit 287. In this case, the background palette is a set of combinations of luminances (Y) and color differences (U, V) existing in the background portion, i.e., vectors:

(Y1, U1, V1)
(Y2, U2, V2)
(Y3, U3, V3)
. . .

and is prepared in advance. More specifically, the background palette is a set of combinations of Y, U, and V of pixels belonging to the background region in the first frame. If, for example, Y, U, V each take 256 values, the number of combinations of these values becomes enormous, and the computation amount for the processing to be described later becomes large. For this reason, the values of Y, U, and V are quantized with a predetermined step size to limit the number of combinations. This is because some different vector values before quantization may become the same after quantization.

The comparator circuit 287 checks whether the vector obtained by quantizing Y, U, and V of each pixel of the texture picture 275 coincides with any one of the vectors sequentially sent from the memory 288 and registered in the background palette, i.e., any one of the background colors 289. A comparison result 290 obtained by checking whether the color of each pixel coincides with any of the background colors is sent from the comparator circuit 287 to the correction circuit 286. If the comparison result 290 indicates a background color, the correction circuit 286 replaces the pixel value of the pixel with "0" (background) and outputs it as a corrected shape picture 291 regardless of whether the pixel value of the corresponding pixel of the shape picture 280 is "255" (object). With this processing, when an object region protrudes into a background region in the shape picture 280 and is erroneously extracted, the background region can be properly separated. If, however, the background and the object have a common color, and this color of the object is also registered in the background palette, the portion corresponding of the object which corresponds to the registered color is also determined as a background portion. For this reason, the above palette is set as a temporary palette for the background in the first frame, and an object palette for the first frame is also generated by the same method as described above. Then, any color in the temporary palette for the background which is also included in the object palette is removed from the temporary palette for the background, and the resultant palette is used as a background palette. This can prevent any portion of the object from being determined as a background portion.

In consideration of a case wherein an error is included in a shape picture input for the first frame, pixels near the edge of the shape picture may not be used to generate a palette. In addition, the occurrence frequency of each vector may be counted, and any vector whose frequency is equal to or lower than a predetermined frequency may not be registered in the palette. If the quantization step size is excessively small, the processing time is prolonged or even a color very similar to a background color may not be determined as a background color because of the slight difference between the vector values. In contrast to this, if the quantization step size is excessively large, the number of vectors common to the background and the object increases too much. For this reason, several quantization step sizes are tried for the first frame, and a quantization step size that separates the background and object colors from each other as in the case of an input shape picture is selected.

In addition, since a new color may appear in the background or object in this process, the background palette may be updated in some frame.

Referring back to FIG. 28, the shape picture 291 is input to the edge correction circuit 285. Since the edge correction circuit 285 is identical to the circuit that receives the shape picture 249 equivalent to the shape picture 291 and the texture picture 251 equivalent to the texture picture 275 in the circuit shown in FIG. 30, a description thereof will be omitted. This circuit corrects a shape picture such that the edge of the shape picture coincides with the edge of the corresponding texture picture. A corrected shape picture 292 is sent to the switching section 281. A shape picture 293 selected from the shape pictures 292 and 260 is output from the switching section 281.

In this case, the edge correction circuits are arranged on the subsequent stage of the object extraction circuit 279. If these correction circuits are arranged on the subsequent stage of the object extraction circuit 224, the precision of the shape picture 260 can be increased.

In some rare cases, the extraction precision is decreased by edge correction. If the shape picture 280 and the shape picture 291 are also input to the switching section 281 in the circuit shown in FIG. 28 to prevent the degraded shape picture 292 from being output, the shape picture 280 for which no edge correction has been performed or the shape picture 291 for which only edge correction using a background palette has been performed can be selected.

Figure 44:
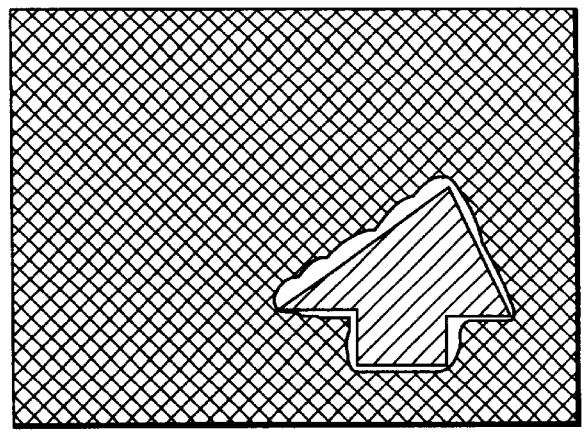
FIG. 44 is a view showing a portion of an extracted background color in the fourth embodiment.

FIG. 44 shows pixels corresponding to background colors registered in the background palette by the crosshatching. If the information in FIG. 44 is used in a search for similar blocks, which has been described with reference to FIGS. 30 and 29, the contour extraction precision can be further increased. When a graphic figure exists in a background, similar blocks may be selected along the edge of the graphic figure in the background instead of the edge between the object and the background. In such a case, in calculating the errors between the blocks and the blocks obtained by reducing the similar blocks, if both corresponding pixels have the same background color, the error between these pixels is not included in the calculation result. This prevents occurrence of an error even if the edge of the graphic figure in the background deviates. Therefore, similar blocks are properly selected such that the edge of the object matches with that of the background.

FIG. 32 shows an example of an image synthesizing apparatus incorporating an object extraction apparatus 294 of this embodiment. A texture picture 295 is input to a switching section 296 and the object extraction apparatus 294. A shape picture 2100 of the first frame is input to the object extraction apparatus 294. The object extraction apparatus 294 has the same arrangement as that shown in FIG. 27 or 28. The object extraction apparatus 294 generates a shape picture 297 of each frame and sends it to the switching section 296. A background picture 299 for synthesis is held in a recording circuit 298 in advance. The synthesis background picture 299 of the currently processed frame is read out from the recording circuit 298 and sent to the switching section 296. When a pixel of the shape picture has the pixel value "255" (object), the switching section 296 selects the texture picture 295 and outputs it as a synthetic picture 2101. When a pixel of the shape picture has the pixel value "0" (background), the switching section 296 selects the synthesis background picture 299 and outputs it as the synthetic picture 2101. With this operation, a picture is generated by synthesizing the object in the texture picture 295 with the foreground of the synthesis background picture 299.

FIG. 33 shows another example of edge correction. Assume that one of the blocks set as shown in FIG. 33 is a block 2102 in FIG. 33. In this case, blocks are separately set in the object region and the background region with a contour serving as a boundary. Blocks 2103, 2104, 2105, and 2106 are obtained by shifting this contour in the lateral direction. These blocks are shifted by different widths in different directions. The separation degree described on page 1408 in Fukui "Object Contour Extraction Based on Separation Degrees between Regions", THE TRANSACTIONS OF THE IEICE, D-II, Vol. J80-D-II, No. 6, pp. 1406–1414, June 1997 is obtained for each contour, and one of the contours corresponding to the blocks 2102 to 2106 which exhibits the maximum separation degree is used. With this operation, the contour of the shape picture matches with the edge of the texture picture.

As has been described above, according to the fourth embodiment, a high extraction precision can be obtained not only in the late period of a moving picture sequence but also in the early period. In addition, even if an object moves slightly or does not move, the object can be properly extracted. Furthermore, even if the contour of an object region input as shape data deviates, the position of the contour can be corrected by reducing the shape data of a similar block larger than the currently processed block and pasting the reduced data. With this operation, by only providing data obtained by approximately tracing the contour of the object region as shape data, object regions on all the subsequent input frames can be extracted with high precision.

Note that the first and fourth embodiments can be properly combined and used. In addition, all the procedures for the object extraction methods of the first to fourth embodiments can be implemented by software. In this case, the same effects as those of the first to fourth embodiments can be obtained by only installing computer programs for executing these procedures in a general computer through a recording medium.

As described above, according to the present invention, a target object can be accurately extracted/tracked without any influences of excess motions around the target object by tracking the object using a figure surrounding the object.

In addition, a high extraction precision can be obtained regardless of input pictures. Furthermore, a high extraction precision can be obtained not only in the late period of a moving picture sequence but also in the early period. Moreover, even if an object moves slightly or does not move, the object can be properly extracted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An object extraction apparatus for a moving picture, comprising:
   a background region determination section which determines a first background region common to a current frame and a first reference frame, and a second background region common to the current frame and a second reference frame, the current frame containing a target object to be extracted from a moving picture signal, the first reference frame being temporally different from the current frame on the basis of a difference between the current frame and the first reference frame, the second reference frame being temporally different from the current frame on the basis of a difference between the current frame and the second reference frame, and the first background region and the second background region indicating a background in the moving picture; and an extraction section which extracts a region, in a picture on the current frame, which belongs to neither the first background region nor the second background region as an object region.

2. The apparatus according to claim 1, which comprises a still object determination section which determines pixels of the current frame as the object region when pixels of one of the first and second reference frames belongs to the object region, and which determines the pixels of the current frame as the background region when the pixels of one of the first and second reference frames belongs to the background region, using a predetermined shape of the object of the one of the first and second reference frames in a case that the difference between the pixels of the current frame and the pixels of the one of the first and second reference frames is small.

3. The apparatus according to claim 2, wherein the still object determination section uses the predetermined shape of the object, when the shape of the object of the one of the first and second reference frames has already been extracted, and a shape of the object of one of the first and second reference frames which is created from the frame, from which the shape of the object has been extracted, by a block matching method, when the object region is not extracted.

4. The apparatus according to claim 1, further comprising a background correction section which corrects motion of a background on each of the first and second reference frames or the current frame such that the motion of the background between each of the first and second reference frames and the current frame becomes relatively zero.

5. The apparatus according to claim 1, wherein the background region determination section includes a determination section which determines the common background region using a predetermined threshold value.

6. The apparatus according to claim 5, wherein the background region determination section includes a setting on which sets the threshold value to a larger value than the predetermined threshold value when the difference of the current frame is larger than a predetermined value, and to a smaller value than it when the difference is smaller.

7. The apparatus according to claim 5, wherein the background region determination section includes a dividing section which divides the current frame into a plurality of regions, which measures a difference between each of the regions and each of corresponding regions of one of the first and second reference frames, and which sets the threshold value to a larger value than a predetermined value when the difference is larger than a predetermined value and to a smaller value when it is smaller.

8. The apparatus according to claim 1, further comprising a prediction section which predicts a position or shape of the object on the current frame from a frame from which the object region has already been extracted, and a selection section which selects the first and second reference frames to be used by said background region determination section on the basis of the position or shape of the object on the current frame which is predicted by said prediction section.

9. The apparatus according to claim 1, wherein said apparatus further comprises an initial figure setting section which sets a figure surrounding the target object on an initial frame of the moving picture signal, and a figure setting section which sets on one of the first and second reference frames a figure surrounding a region on each input frame of the moving picture signal which corresponds to an image inside figure of one of the first and second reference frames that temporally differs from the input frame on the basis of a correlation between the input frame and the image inside figure, and said object region extraction section extracts a region, in the image inside figure, which belongs to neither the first background region nor the second background region as an object region.

10. The apparatus according to claim 8, wherein said initial figure setting section sets a figure surrounding the target object on the basis of an external input.

11. An object extraction apparatus for a moving picture comprising:

an initial figure setting section which sets a figure surrounding a target object on an input frame of a moving picture signal;

a figure setting section which sets, on the input frame, a figure surrounding a region on the input frame of the moving picture signal and corresponding to an image inside figure of a reference frame that temporally differs from the input frame for each input frame on the basis of a correlation between the input frame and the image inside figure;

a background region determination section which determines a first background region common to a current frame as an object extraction target and a first reference frame and a second background region common to the current frame and a second reference frame, the first reference frame being temporally different from the current frame on the basis of a difference between the current frame and the first reference frame, the second reference frame being temporally different from the current frame on the basis of a difference between the current frame and the second reference frame, and the first background region and the second background region indicating a background in the moving picture;

a first object extraction section which extracts a region, in the image inside figure of the current frame, which belongs to neither the first background region nor the second background region, as an object region;

a second object extraction section which extracts an object region from the image inside figure on the current frame as the object extraction target by using a method different from that used by said first object extraction section; and a switching section which selectively switches the first and second object extraction sections.

12. The apparatus according to claim 11, which further comprises a feature extraction section which extracts a feature value of a picture in at least a partial region of the current frame as the object extraction target from the current frame, and wherein said switching section selectively switches said first and second object extraction sections on the basis of the extracted feature value.

13. The apparatus according to claim 11, wherein said second object extraction section includes a prediction section which uses a frame, from which the object region has already been extracted, as a reference frame, to predict a position or shape of the object on the current frame as the object extraction target from the reference frame.

14. The apparatus according to claim 13, wherein said first and second object extraction sections are selectively switched and used in units of blocks of each frame on the basis of a prediction error amount such that the extraction result obtained by said second object extraction section is used as an object region when the prediction error caused by said second object extraction section falls within a predetermined range, and the extraction result obtained by said first object extraction section is used as an object region when the prediction error exceeds the predetermined range.

15. The apparatus according to claim 11, wherein said second object extraction section performs inter-frame prediction in a sequence different from an input frame sequence such that a frame interval between the reference frame and the current frame as the object extraction target is set to not less than a predetermined number of frames.

16. An object extraction apparatus comprising:
- a picture input section which inputs moving picture data and shape data representing an object region on a predetermined frame of a plurality of frames corresponding to the moving picture data;
- a segmentation section which segments a current frame into a plurality of blocks;
- a search section which searches a reference frame for a similar block, for each of the blocks, which is similar in figure represented by picture data to a current block and is larger in area than the current block, the reference frame being temporally different from the current frame;
- a paste section which pastes shape data obtained by extracting and reducing shape data of each similar block from the reference frame on each block of the current frame; and
- an output section which outputs the pasted shaped data as shape data of the current frame.

17. An object extraction apparatus comprising:
- a picture input section which inputs picture data representing a picture including at least one object and a background surrounding the object and shape data representing the object;
- a setting section which sets blocks on a contour portion of the object, and searches for a similar block, for each of the blocks, which is similar in graphic figure represented by the picture data to each block and is larger than the block, from the same picture to obtain a plurality of similar blocks;
- a replacement section which replaces the shape data of each of the blocks with reduced shape data obtained by reducing the shape data of each of the similar blocks;
- a repeat section which repeats the replacement by a predetermined number of times; and
- an output section which outputs shape data obtained by repeating the replacement as corrected shape data.

18. The apparatus according to claim 17, further comprising a second repeat section which repeats the searching for the similar block and the predetermined number of replacements of the shape data by a plurality of times while decreasing a block size every repetition.

19. A method for extracting a moving object from an input moving picture, comprising the steps of:
- determining a first background region common to a current frame containing a target object to be extracted from a moving picture signal and a first reference frame that temporally differs from the current frame on the basis of a difference between the current frame and the first reference frame;
- determining a second background region common to the current frame and a second reference frame that temporally differs from the current frame on the basis of a difference between the current frame and the second reference frame; and
- extracting a region, in a picture on the current frame, which belongs to neither the first background region nor the second background region as an object region, the first background region and the second background region indicating a background in the input moving picture.

20. The method according to claim 19, which comprises a step of determining pixels of the current frame as the object region when pixels of one of the first and second reference frames belongs to the object region, and determining the pixels of the current frame as the background region when the pixels of one of the first and second reference frames belongs to the background region, using a predetermined shape of the object of one of the first and second reference frames in a case of that the difference between the pixels of the current frame and the pixels the one of the first and second reference frames is small.

21. The method according to claim 20, wherein the step of determining the pixels of the current frame uses the predetermined shape of the object, when the shape of the object of one of the first and second reference frames has already been extracted, and a shape of the block of the one of the first and second reference frames which is created from the frame, from which the shape of the object has been extracted, by a block matching method, when the object region is not extracted.

22. The method according to claim 19, further comprising a step of correcting motion of a background on one of the first and second reference frames or the current frame such that the motion of the background between each of the first and second reference frames and the current frame becomes relatively zero.

23. The method according to claim 19, wherein the background region determining step includes determining the common background region using a predetermined threshold value.

24. The method according to claim 23, wherein the background region determining step includes setting the threshold value to a larger value than the predetermined threshold value when the difference of the current frame is larger than a predetermined value, and to a smaller value than it when the difference is smaller.

25. The method according to claim 23, wherein the background region determining step includes dividing the current frame into a plurality of regions, measuring a difference between each of the regions and each of corresponding regions of one of the first and second reference frames, and setting the threshold value to a larger value than a predetermined value when the difference is larger than a predetermined value and to a smaller value when it is smaller.

26. The method according to claim 19, further comprising the step of predicting a position or shape of the object on the current frame from a frame from which the object region has already been extracted, and selecting the first and second reference frames to be used by said background region determining step on the basis of the position or shape of the object on the current frame which is predicted by said predicting step.

27. The method according to claim 19, which further comprises a step of setting a figure surrounding the target object on an initial frame of the moving picture signal, and a step of setting on one of the first and second reference frames a figure surrounding a region on each input frame of the moving picture signal which corresponds to an image inside figure of one of the first and second reference frames that temporally differs from the input frame on the basis of a correlation between the input frame and the image inside figure, and said object region extracting step extracts a region, in the image inside figure, which belongs to neither the first background region nor the second background region as an object region.

28. The method according to claim 26, wherein said setting step sets a figure surrounding the target object on the basis of an external input.

29. A method for extracting an object from an input picture comprising the steps of:

setting a figure surrounding a target object on an initial frame of a moving picture signal;

setting on an input frame a figure surrounding a region on the input frame of the moving picture signal and corresponding to an image inside figure of a reference frame that temporally differs from the input frame on the basis of a correlation between the input frame and the image inside figure;

determining a first background region common to a current frame as an object extraction target and a first reference frame that temporally differs from the current frame on the basis of a difference between the current frame and the first reference frame, and determining a second background region common to the current frame and a second reference frame that temporally differs from the current frame on the basis of a difference between the current frame and the second reference frame, the first background region and the second background region indicating a background in the input picture extracting a region, in the image inside figure of the current frame, which belongs to neither the first background region nor the second background region, as an object region;

extracting an object region from the image inside figure on the current frame as the object extraction target by using a method different from that used by said extracting steps; and selectively switching the extracting steps.

30. The method according to claim 29, further comprising the step of extracting a feature value of a picture in at least a partial region of the current frame as the object extraction target from the current frame, and wherein said switching step selectively switches said extracting steps on the basis of the extracted feature value.

31. The method according to claim 29, wherein said extracting an object region step includes predicting a position or shape of the object on the current frame as the object, using a frame, from which an object region has already been extracted, as a reference frame, to predict a position or shape of the object on the current frame as an object extraction target from the reference frame.

32. The method according to claim 31, wherein said extracting steps are selectively switched and used in units of blocks of each frame on the basis of a prediction error amount such that the extraction result obtained by said extracting an object region step is used as an object region when the prediction error caused by said extracting an object region step falls within a predetermined range, and the extraction result obtained by said extracting a region step is used as an object region when the prediction error exceeds the predetermined range.

33. The method according to claim 29, wherein said extracting an object region step performs inter-frame prediction in a sequence different from an input frame sequence such that a frame interval between a reference frame and the current frame as the object extraction target is set to not less than a predetermined number of frames.

34. A method of extracting an object from an input picture comprising the steps of:

inputting moving picture data and shape data representing an object region on a predetermined frame of a plurality of frames constituting the moving picture data;

segmenting a currently processed frame into a plurality of blocks;

searching for a similar block, for each of the blocks, which is similar in figure represented by picture data to the currently processed block and is larger in area than the currently processed block, from the reference frame;

pasting shape data obtained by extracting and reducing shape data of each similar block from the reference frame on each block of the currently processed frame; and outputting the pasted shaped data as shape data of the currently processed frame.

35. A method of extracting an object from an input picture comprising:

inputting picture data and shape data representing an object region on the picture;

setting blocks on a contour portion of the shape data;

searching for a similar block, for each of the blocks, which is similar in graphic figure represented by the picture data to each block and is larger than the block, from the same picture;

replacing the shape data of each of the blocks with shape data obtained by reducing the shape data of each of the similar blocks;

repeating the replacement by a predetermined number of times; and outputting shape data obtained by repeating the replacement as corrected shape data.

36. The method according to claim 35, further comprising a step of secondly repeating the searching for the similar block and the predetermined number of replacements of the shape data by a plurality of times while decreasing a block size every repetition.

* * * * *